United States Patent
Nanba et al.

(10) Patent No.: US 8,477,694 B2
(45) Date of Patent: *Jul. 2, 2013

(54) BASE STATION APPARATUS, WIRELESS COMMUNICATION SYSTEM, AND WIRELESS TRANSMISSION METHOD

(75) Inventors: Hideo Nanba, Chiba (JP); Yasuhiro Hamaguchi, Ichihara (JP); Shimpei To, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/474,451

(22) Filed: May 17, 2012

(65) Prior Publication Data
US 2012/0230292 A1    Sep. 13, 2012

Related U.S. Application Data

(62) Division of application No. 12/959,107, filed on Dec. 2, 2010, which is a division of application No. 11/665,569, filed as application No. PCT/JP2005/019195 on Oct. 19, 2005, now abandoned.

(30) Foreign Application Priority Data

Oct. 19, 2004 (JP) ................................. 2004-303633

(51) Int. Cl.
*H04W 72/04* (2009.01)
*H04W 88/00* (2009.01)
*H04J 3/00* (2006.01)

(52) U.S. Cl.
USPC ............................ 370/328; 370/330; 455/522

(58) Field of Classification Search
USPC .................. 455/63.1–69, 522, 561, 572–574; 370/328–338, 345–350, 498
See application file for complete search history.

(56) References Cited

U.S. PATENT DOCUMENTS

| 5,448,751 | A | | 9/1995 | Takenaka et al. |
| 5,603,093 | A | * | 2/1997 | Yoshimi et al. ............... 455/63.1 |

(Continued)

FOREIGN PATENT DOCUMENTS

| EP | 1 225 710 A2 | 7/2002 |
| EP | 1 282 241 A1 | 2/2003 |

(Continued)

OTHER PUBLICATIONS

European Search Report issued in European Patent Application No. 05795635.1 on Mar. 30, 2012.

(Continued)

*Primary Examiner* — Kashif Siddiqui
(74) *Attorney, Agent, or Firm* — Birch, Stewart, Kolasch & Birch, LLP

(57) ABSTRACT

Allocation of transmission power is carried out adaptively without affecting adjacent cells. Included are a reception part that receives information from a mobile station apparatus, a transmission power determination part that determines transmission power when transmitting a wireless signal to a mobile station apparatus based on the received information, an acquisition part that acquires information about communication environment in each time channel or each frequency channel from the received information, a scheduling part that identified a time channel or frequency channel the relationship of which between transmission power and communication environment satisfies the condition for allocation and allocates transmission data and transmission power for transmission to a mobile station apparatus to a communication slot in the time channel or frequency channel, and a transmission part that transmits a wireless signal using the communication slot to which the transmission data and the determined transmission power have been allocated.

20 Claims, 51 Drawing Sheets

U.S. PATENT DOCUMENTS

| | | | |
|---|---|---|---|
| 5,737,704 A * | 4/1998 | Jin et al. | 455/450 |
| 5,930,716 A | 7/1999 | Sonetaka | |
| 6,493,331 B1 | 12/2002 | Walton et al. | |
| 6,539,226 B1 * | 3/2003 | Furukawa et al. | 455/442 |
| 6,574,485 B1 * | 6/2003 | Salonaho et al. | 455/522 |
| 6,590,878 B1 | 7/2003 | Uchida et al. | |
| 6,940,827 B2 | 9/2005 | Li et al. | |
| 2002/0015382 A1 | 2/2002 | Fukuda | |
| 2002/0115459 A1 * | 8/2002 | Chuang et al. | 455/522 |
| 2002/0137520 A1 | 9/2002 | Dillon et al. | |
| 2002/0159422 A1 | 10/2002 | Li et al. | |
| 2003/0027588 A1 * | 2/2003 | Futakata et al. | 455/522 |
| 2003/0123425 A1 | 7/2003 | Walton et al. | |
| 2004/0097238 A1 | 5/2004 | Hwang et al. | |
| 2005/0201342 A1 * | 9/2005 | Wilkinson et al. | 370/338 |
| 2006/0067278 A1 | 3/2006 | Li et al. | |
| 2008/0051096 A1 * | 2/2008 | Rao | 455/449 |

FOREIGN PATENT DOCUMENTS

| | | |
|---|---|---|
| JP | 05-292010 A | 11/1993 |
| JP | 08-228375 A | 9/1996 |
| JP | 10-117373 A | 5/1998 |
| JP | 2001-359152 A | 12/2001 |
| JP | 2003-018091 A | 1/2003 |
| JP | 2003-048437 A | 2/2003 |
| JP | 2003-087192 A | 3/2003 |
| JP | 2004-159345 A | 8/2004 |
| JP | 2004-527166 A | 9/2004 |
| JP | 2004-527186 T | 9/2004 |
| WO | WO 98/58503 A1 | 12/1998 |
| WO | WO 01/76098 A2 | 10/2001 |

OTHER PUBLICATIONS

International Search Report issued in PCT Application No. PCT/JP2005/019195 on Dec. 27, 2005.
U.S. Notice of Allowance issued in U.S. Appl. No. 12/959,107 on Feb. 15, 2012.
U.S. Office Action issued in U.S. Appl. No. 11/665,569 on Jun. 7, 2010.
U.S. Office Action issued in U.S. Appl. No. 11/665,569 on Oct. 19, 2009.
U.S. Office Action issued in U.S. Appl. No. 12/959,107 on Nov. 3, 2011.

* cited by examiner

CELL ARRANGEMENT (a)

(b)

| Network ID | |
|---|---|
| Transmit Power of thiScontrol slot | |
| Terminal ID of slot 1 | |
| Terminal ID of slot 2 | |
| Terminal ID of slot 3 | |
| Terminal ID of slot 4 | |
| Terminal ID of slot 5 | |
| Terminal ID of slot 6 | |
| Terminal ID of slot 7 | |
| Terminal ID of slot 8 | |

(a)

(b)

| | Group 1 | Group 2 | Group 3 | Group 4 | Group 5 |
|---|---|---|---|---|---|
| Pathloss (a) | 90≦a (dB) | 80≦a<90 (dB) | 70≦a<80 (dB) | 60≦a<70 (dB) | a<60 (dB) |
| RX target SNR | 15 (dB) | 20 (dB) | 20 (dB) | 25 (dB) | 25 (dB) |

FIG. 49

BASE STATION APPARATUS, WIRELESS COMMUNICATION SYSTEM, AND WIRELESS TRANSMISSION METHOD

CROSS REFERENCE TO RELATED APPLICATIONS

This application is a Divisional of copending application Ser. No. 12/959,107 filed Dec. 2, 2010 which is a Divisional of application Ser. No. 11/665,569 filed on Apr. 17, 2007 now abandoned, which is a National Phase of PCT International Application No. PCT/JP2005/019195 filed on Oct. 19, 2005. The entire contents of all of the above applications are hereby incorporated by reference.

TECHNICAL FIELD

The present invention relates to a base station apparatus, a wireless communication system, and a wireless transmission method, which carry out the allocation of transmission power adaptively without affecting adjacent cells.

BACKGROUND ART

In our country, the service of IMT-2000 (International Mobile Telecommunication 2000) was started in October 2001 before the rest of the world, and thus the transmission and access technique in a mobile communication system is rapidly developing. In addition, the technique of HSDPA (High Speed Down-link Packet Access) and the like are standardized and the data transmission at about 10 Mbps at maximum is now being put to practical use.

On the other hand, the standardization to realize a broad band wireless Internet access that targets a transmission rate of 10 Mbps to 100 Mbps is in progress and various techniques have been proposed. The condition required to realize high transmission rate wireless communication is the improvement of frequency usage efficiency. Since the transmission rate and the used bandwidth are in a proportional relationship, a simple solution to increase the transmission rate is to widen the frequency bandwidth to be used. However, available frequency bands are in a tight situation and it is unlikely that a sufficient bandwidth is allocated when constructing a new wireless communication system. Consequently, it becomes necessary to improve the frequency usage efficiency.

In addition, another required condition is to provide service in a private area (isolated cell), such as a wireless LAN, in a seamless manner while realizing service in a communication area constituted by cells, such as a mobile phone.

Techniques having the possibility of solving these problems include a technique called one-cell reuse OFDM/(TDMA, FDMA) (Orthogonal Frequency Division Multiplexing/Time Division Multiple Access, Frequency Division Multiple Access). This is a technique in which communication is performed using the same frequency in all of the cells in a communication area constituted by cells, the modulation scheme when performing communication is the OFDM, and the access scheme uses the TDMA and FDMA. This is a communication system, without doubt, capable of realizing higher-speed data communication in an isolated cell while maintaining a common wireless interface with a cell area.

The OFDM, TDMA, and FDMA, which are constitutional techniques of the OFDM/(TDMA, FDMA), are explained briefly.

First, the OFDM is a technique used for IEEE802.11a, which is a wireless system of 5 GHz band, and a terrestrial digital broadcasting. The OFDM is a system in which tens to thousands of carriers are arranged at intervals of a minimum frequency that does not cause interference theoretically and communication is performed simultaneously. In the normal OFDM, such a carrier is called a sub-carrier and each sub-carrier is modulated when performing communication by a modulation scheme, such as the PSK, QAM, etc. Further, with an error correction technique combined, it has grate resistance to frequency selective fading. In the present specification, the number of sub-carriers used in the OFDM is assumed to be 768.

Next, the TDMA is an access system in which time is divided when transmitting/receiving data. Normally, in a communication system using the TDMA as an access system, a frame configuration is used in which there are a plurality of slots, which is a unit of communication time, and further, it is general to allocate a control slot necessary for receiving a frame at the front of the frame in the case of Down-link. In the present specification, it is assumed that a frame is composed of nine slots and the front slot is allocated as a control slot.

Next, the FDMA is an access system in which frequencies are divided when transmitting/receiving data. Normally, in a communication system using the FDMA as an access system, frequencies are divided into several bands, which are frequency bands for performing communication, and thus terminals (mobile station apparatus) that access are classified. Normally, a protective band called a guard band is prepared between divided frequency bands, however, in the OFDM/(TDMA, FDMA), no guard band is used because the frequency usage efficiency is decreased, or if used, its band is very narrow, just for accepting several sub-carries. In the present specification, 768 sub-carries used in the OFDM are divided into 12 groups, each group including 64 sub-carries, for performing the FDMA.

Next, the OFDM/(TDMA, FDMA) is explained based on the above-described introduction. FIG. 42 is a diagram showing a two-dimensional frame configuration of the OFDM/(TDMA, FDMA). In FIG. 42, the vertical axis represents the frequency and the horizontal axis represents the time. One of a plurality of rectangles shown in FIG. 42 is the minimum unit used for data transmission, composed of a plurality of OFDM symbols, and is referred to as a slot in the present specification. Among the slots, those with diagonals are control slots. In this case, the figure means that there are nine slots in the time direction and 12 slots in the frequency direction in one frame, that is, there exist a total of 108 slots (among then, 12 slots are control slots) in one frame. In addition, in the present specification, a group of slots in the direction of the frequency axis at the same time (composed of 12 slots in the case of FIG. 42) is referred to as a time channel and a group of slots in the direction of the time axis at the same frequency (composed of nine slots in the case of FIG. 42) is referred to as a frequency channel. In form, a slot is denoted by (Tn, Fm), a time channel is denoted by Tn (n is a natural number from 1 to 9), and a frequency channel is denoted by Fm (m is a natural number from 1 to 12). For example, the hatched slot in FIG. 42 is a slot denoted by (T4, F7).

Next, communication from a base station (referred to as AP or base station apparatus) to a mobile station (referred to as MT, mobile station apparatus, or simply "terminal") is considered. When an AP allocates data of 15 slots to an MT, it is assumed that the data is allocated to the slots with vertical lines in FIG. 42, although there may be various cases. In other words, the data to be received by the MT is allocated to (T2 to T4, F1), (T5 to T8, F4), and (T2 to T9, F11). Further, in order to indicate that the AP has allocated data to the MT, it is necessary to embed data indicative of the allocation to the control slot of the frequency to be used. In the case of this example, (T1, F1), (T1, F4), and (T1, F11) correspond to the control slots.

The OFDM/(TDMA, FDMA) system is a system in which a plurality of mobile stations transmit and receive data to and from the base station by changing the frequency and time based on those described above. In FIG. 42, the figure is drawn such that there seems to be a gap between slots for convenience's sake, however, the presence or absence of a gap is of no importance.

FIG. 43 is a block diagram showing a general configuration of a transmission circuit used in the OFDM/(TDMA, FDMA). The transmission circuit shown in FIG. 43 has a data multiplex part 431. In addition, the transmission circuit has 12 error correction encoding parts 432-$a$ to 432-$l$ and at the same time, has 12 serial/parallel conversion parts (S/P conversion parts) 433-$a$ to 433-$l$. A transmission power control part 435 exhibits a function of changing transmission power for each frequency channel.

In the data multiplex part 431, information data is separated into 12 groups in units of packets for transmission. In other words, the data multiplex part 431 physically specifies the ODFM/(TDMA, FDMA) slot to be specified by a module, such as a CPU etc., not shown schematically here. After that, error correction encoding is performed in the error correction encoding parts 432-$a$ to 432-$l$, separation into 64 groups is performed in the S/P conversion parts 433-$a$ to 433-$l$, and each carrier is modulated in a mapping part 434. In the transmission power control part 435, power control is performed into transmission power for each sub-channel specified by a module, such as a CPU etc., not shown schematically and IFFT (Inverse Fast Fourier Transform) processing is performed in an IFFT part 436. When generating an OFDM signal of 768 waves, the number of points of the IFFT normally used is 1,024.

After that, in a P/S conversion part 437, conversion into serial data is performed and then a guard interval is inserted in a guard interval insertion part 438. A guard interval is inserted in order to reduce interference between symbols when receiving an OFDM signal. Then, after converted into an analog signal in a D/A conversion part 439 and converted into a frequency for transmission in a radio transmission part 440, the data is transmitted from an antenna part 441.

In addition, FIG. 44 is a block diagram showing a general configuration of a reception circuit used in the OFDM/(TDMA, FDMA). The reception circuit shown in FIG. 44 has a data demultiplex part 461 and further, has 12 error correction decoding parts 460-$a$ to 460-$l$. In addition, the reception circuit has 12 parallel/serial conversion parts (P/S conversion parts) 459-$a$ to 459-$l$.

In the reception circuit, an operation reverse to that of the transmission circuit is performed basically. The frequency of the radio wave received by an antenna part 451 is converted into a frequency in a frequency band in which A/D conversion is possible by a radio reception part 452. With data having been converted into a digital signal in an A/D conversion part 453, the OFDM symbols are synchronized in a synchronization part 454 and the guard interval is removed in a guard interval removal part 455. After that, the data is paralleled into 1,024 data in an S/P conversion part 456.

After that, the FFT of 1,024 points is performed in an FFT (Fast Fourier Transform) part 457 and demodulation of the sub-carrier of 768 waves is performed in a propagation channel estimation and demapping part 458. Normally, propagation path is estimated by the receiver by sending a known signal from the transmitter to the receiver. After that, the necessary data is serialized in the P/S conversion parts 459-$a$ to 459-$l$, error correction is performed in the error correction decoding parts 460-$a$ to 460-$l$, and the data is input to the data demultiplex part 461. In the data demultiplex part 461, the data is processed into information data and output.

Next, the outline of a communication system consisting of cells is explained. FIG. 45($a$) is an example of the case where cells have a hexagonal shape and seven frequency bands are used. A base station is arranged in the center of the cell and in cell B0, communication is performed using a frequency band Fc0, in B1, Fc1 is used, and similar combinations follow in the rest of the cells. In such a cell configuration in which the number of frequency bands is sufficient, it is unlikely that the adjacent cells use the same frequency and it is possible to perform communication in an excellent condition without influence from the adjacent cells.

FIG. 45($b$) is an example of the case where one-cell reuse OFDM/(TDMA, FDMA) is used. Similarly, the configuration consists of hexagonal cells, however, the same frequency Fc0 is used. Consequently, when the one-cell reuse OFDM/(TDMA, FDMA) operates ideally, it follows that a frequency usage efficiency seven times that compared to the case in FIG. 45($a$) can be attained. As a result, it can be said that realization of one-cell reuse is a indispensable technique in order to realize high speed communication.

As obvious also from FIG. 45($b$), the point that affects the ideal operation of the one-cell reuse is to prevent interference from other cells. Two techniques can roughly be thought as a method for preventing interference from other cells. One method is to establish a communication system in which each terminal removes radio waves from other cells (interference removal) and the other method is to prevent interference from affecting as much as possible. Among these methods, the following two are explained with respect to a specific technique of the latter method.

First, a wireless data communication system, a wireless data communication method, and its program disclosed in Japanese Unexamined Patent Publication No. 2003-18091 (Patent document 1) are explained. A cell configuration relating to the invention described in Patent document 1 is shown in FIG. 46. In FIG. 46, a hexagon constructed by the dotted-line is shown in each cell in comparison with FIG. 45($a$). This means that one cell is divided into two areas, one being near the base station and the other, distant therefrom. When cell B0 is focused on, communication is performed conventionally using a frequency Fc0 with terminals in the area distant from the base station and communication is performed using Fc1 to Fc6 with terminals in the area near the base station. It is described that this increases the frequency usage efficiency. Further, it is explained that the use of a sector antenna within an area surrounded by the dotted-line increases the efficiency. This is a technique that utilizes the fact that even the use of the frequency bands Fc1 to Fc6 does not affect the adjacent cells because it is possible to lower transmission power when performing communication with terminals near the base station.

Next, a mobile communication system, a base station apparatus, and a control method of a mobile communication system disclosed in Japanese Unexamined Patent Publication No. 2003-46437 (Patent document 2) are explained. A cell configuration relating to the invention disclosed in Patent document 2 is shown in FIG. 47. In FIG. 47, two hexagons constructed by the dotted-line are shown in each cell in comparison with FIG. 45($a$). When cell B0 is focused on, the area most distant from the base station is denoted by Ts1, the second most distant area is denoted by Ts2, and the nearest area is denoted by Ts3. Ts represents time and Ts1 to Ts3 constitute one frame. This means that in B0, transmission power is increased to the maximum during Ts1 and communication is performed, and then, the transmission power is lowered in Ts2 and Ts3 and communication is performed. Similarly, each cell performs communication by changing transmission power in accordance with the time, respectively.

In B0, when communication is being performed with increased transmission power during Ts1, communication with transmission power increased to the maximum is not being performed in other adjacent cells, and therefore, it is possible to perform communication in B0 in a state in which interference from other cells is small. For the cells B1 to B6, the same advantage is secured similarly.

Patent document 1: Japanese Unexamined Patent Publication No. 2003-18091
Patent document 2: Japanese Unexamined Patent Publication No. 2003-46437

DISCLOSURE OF THE INVENTION

However, even if the techniques described in Patent document 1 and Patent document 2 are used in the one-cell reuse OFDM/(TDMA, FDMA), it is not possible to deal adaptively with the case of an isolated cell or the case where the number of adjacent cells is different, and further, the case where a base station is newly installed after the base station has once been installed and the service has been started. Further, in Patent document 2, that each base station is synchronized with another is a tacit assumption and there is no description on the solving means when not synchronized.

The present invention has been developed the above-described circumstances being taken into account and an object thereof is to provide a base station apparatus, a wireless communication system, and a wireless communication method capable of carrying out the allocation of transmission power adaptively without affecting adjacent cells.

(1) In order to attain the above-mentioned object, the present invention has employed means as follows. In other words, a base station apparatus according to the present invention is a base station apparatus that uses a plurality of slots and performs wireless communication with a mobile station apparatus in a cell, characterized in that the base station apparatus receives information from the mobile station apparatus, determines transmission power to be allocated to a group of the slots as well as determining transmission power when transmitting a wireless signal to the mobile station apparatus based on the received information, determines a group of slots or part of a group of slots for transmitting transmission data based on the transmission power when transmitting the wireless signal to the mobile station apparatus and the transmission power allocated to the group of slots, and transmits the wireless signal to the mobile station apparatus using the determined group of slots or the determined part of the group of slots As described above, since the base station apparatus determines the transmission power to be allocated to the group of the slots as well as determining the transmission power when transmitting the wireless signal to the mobile station apparatus based on the received information and determines the group of slots or the part of the group of slots for transmitting the transmission data based on the transmission power when transmitting the wireless signal to the mobile station apparatus and the transmission power allocated to the group of slots, it is possible to carry out the allocation of transmission power adaptively without affecting the adjacent cells.

(2) In addition, a base station apparatus according to the present invention is a base station apparatus that has a plurality of time channels and performs wireless communication with a mobile station apparatus in a cell using the time channel, characterized in that the base station apparatus receives information from the mobile station apparatus, determines transmission power to be allocated to the time channel as well as determining transmission power when transmitting a wireless signal to the mobile station apparatus based on the received information, determines a time channel or part of time channel for transmitting transmission data based on the transmission power when transmitting the wireless signal to the mobile station apparatus and the transmission power allocated to the time channel, and transmits the wireless signal to the mobile station apparatus using the determined time channel or the determined part of time channel.

As described above, since the base station apparatus determines the transmission power to be allocated to the time channel as well as determining the transmission power when transmitting the wireless signal to the mobile station apparatus based on the received information and determines the time channel or the part of time channel for transmitting transmission data based on the transmission power when transmitting the wireless signal to the mobile station apparatus and the transmission power allocated to the time channel, for example, small transmission power is allocated to a time channel with large interference power, a time channel with small SINR, and a time channel with a large error rate because those time channels are used only on the central part of the cell as those not used on the peripheral part of the cell because of their large interference. In addition, large transmission power is allocated to a time channel with small interference power, a time channel with large SINR, and a time channel with a small error rate as those used on the peripheral part of the cell because their interference is small even on the peripheral part of the cell. Due to this, it is made possible to carry out the allocation of transmission power adaptively without affecting the adjacent cells.

(3) In addition, a base station apparatus according to the present invention is a base station apparatus that has a plurality of frequency channels and performs wireless communication with a mobile station apparatus in a cell using the frequency channel, characterized in that the base station apparatus receives information from the mobile station apparatus, determines transmission power to be allocated to the frequency channel as well as determining transmission power when transmitting a wireless signal to the mobile station apparatus based on the received information, determines a frequency channel or part of frequency channel for transmitting transmission data based on the transmission power when transmitting the wireless signal to the mobile station apparatus and the transmission power allocated to the frequency channel, and transmits the wireless signal to the mobile station apparatus using a frequency channel corresponding to the determined frequency channel or the determined part of frequency channel.

As described above, since the base station apparatus determines the transmission power to be allocated to the frequency channel as well as determining the transmission power when transmitting the wireless signal to the mobile station apparatus based on the received information and determines the frequency channel or the part of frequency channel for transmitting transmission data based on the transmission power when transmitting the wireless signal to the mobile station apparatus and the transmission power allocated to the frequency channel, for example, small transmission power is allocated to a frequency channel with large interference power, a frequency channel with small SINR, and a frequency channel with a large error rate because those frequency channels are used only on the central part of the cell as those not used on the peripheral part of the cell because of their large interference. In addition, large transmission power is allocated to a frequency channel with small interference power, a frequency channel with large SINR, and a frequency channel with a small error rate as those used on the peripheral part of the cell because their interference is small also on the peripheral part of the cell. Due to this, it is made possible to carry out the allocation of transmission power adaptively without affecting the adjacent cells.

(4) In addition, a base station apparatus according to the present invention is characterized in that the condition for determining the allocation of time channel or part of time channel, or frequency channel or part of frequency channel for transmitting the transmission data is any one of the following conditions that: the interference power at the mobile station apparatus is the smallest; the magnitude of transmission power and the magnitude of interference power at the mobile station are associated in advance in a relationship of inverse proportion and interference power corresponding to the determined transmission power is possessed; and the ratio between reception signal power and interference power at the mobile station apparatus is the maximum.

By determining the condition for allocation as described above, it is made possible to carry out the allocation of transmission power adaptively without affecting the adjacent cells.

(5) In addition, a base station apparatus according to the present invention is characterized in that when determining the allocation of time channel or part of time channel, or frequency channel or part of frequency channel for transmitting the transmission data, the base station apparatus divides the mobile station apparatus in the cells into a plurality of groups based on the information received from the mobile station apparatus and allocates slots for transmitting transmission data to the same time channel or the same frequency channel for a mobile station apparatus in the same group.

As described above, by grouping the mobile station apparatus in the cell, the allocation of transmission power can be carried out for each group, and therefore, it is made possible to perform the allocation processing efficiently. In addition, it is possible to efficiently carry out the allocation of transmission data and transmission power for a mobile station apparatus that newly makes a request for connection in the same cell. Due to this, it is made possible to carry out the allocation of transmission power adaptively without affecting the adjacent cells. By the way, the transmission power of each group may assume discrete values or may assume continuous values in the above-mentioned numerical value range.

(6) In addition, a base station apparatus according to the present invention is characterized in that when determining the allocation of time channel or part of time channel, or frequency channel or part of frequency channel for transmitting the transmission data, the base station apparatus identifies the group to which the transmission power for transmitting a wireless signal to any one of the mobile station apparatus in the cell belongs, and allocates, when there exists a vacant time channel or a vacant frequency channel in all of the individual time channels or the individual frequency channels or in the part thereof to which transmission power corresponding to a group with transmission power larger than that of the identified group has been allocated, a slot for transmitting transmission data to the mobile station apparatus to the vacant time channel or the vacant frequency channel.

With this configuration, it is possible to employ a form in which, when there exists a vacant channel in the time channels or the frequency channels that have been allocated to a group that requires high transmission power, the allocation of a terminal that requires low transmission power to the vacant slot of the time channels or the frequency channels allocated to a terminal group that requires high transmission power is allowed. This is because the possibility is high that the time channel or the frequency channel to which a terminal group that requires high transmission power has been allocated is allocated a terminal group that requires low transmission power in the adjacent cells and there will occur no interference between the adjacent cells even when a terminal that requires low transmission power is allocated to the vacant communication slot of the time channel or the frequency channel in question. Due to this, it is made possible to carry out the allocation of transmission power adaptively without affecting the adjacent cells.

(7) In addition, a base station apparatus according to the present invention is characterized in that when determining the allocation of time channel or part of time channel, or frequency channel or part of frequency channel for transmitting the transmission data, the base station apparatus identifies the group to which the transmission power for transmitting a wireless signal to any one of the mobile station apparatus in the cell belongs, and allocates, when transmission data is not allocated to the time channel or the frequency channel allocated to the identified group and when there exists a vacant time channel or a vacant frequency channel in all of the time channels or the frequency channels or in the part thereof to which transmission power corresponding to a group with transmission power smaller than that of the identified group has been allocated, a slot for transmitting transmission data to the mobile station apparatus to the vacant time channel or the vacant frequency channel.

As described above, since when allocating the transmission power to the specific mobile station apparatus, the base station apparatus allocates, when there exists a vacant communication slot in the time channels or each of the frequency channels to which transmission power corresponding to the group with transmission power smaller than the group to which the transmission power for the mobile station apparatus belongs has been allocated, the transmission data to be transmitted to the mobile station apparatus and the transmission power corresponding to the group with small transmission power to the vacant communication slot, it is made possible to carry out the allocation of transmission power adaptively without affecting the adjacent cells.

(8) In addition, a base station apparatus according to the present invention is characterized by changing, after allocating a slot for transmitting the transmission data, the transmission power of the allocated slot based on the received information.

As described above, since the base station apparatus changes, after allocating the slot for transmitting the transmission data, the transmission power of the allocated slot based on the received information, it is made possible to use a plurality of values as reception power on the mobile station apparatus side in accordance with the variation in the propagation path.

(9) In addition, a base station apparatus according to the present invention is characterized by changing the modulation scheme when allocating transmission data to be transmitted to the mobile station apparatus and the transmission power to the vacant time channel or each vacant frequency channel.

As described above, since the base station apparatus changes the modulation scheme when allocating the transmission data to be transmitted to the mobile station apparatus and the transmission power to the vacant communication slot, it is possible to avoid the influence on the adjacent cells while avoiding the occurrence of an error by changing the modulation scheme to a lower one, that is, to a modulation scheme for easier reception, as well as lowering the transmission power when, for example, transmitting a wireless signal to a mobile station apparatus that requires high transmission power, and if the communication slot of each time channel or each frequency channel to which low transmission power has been allocated is vacant. On the contrary, it is possible to avoid the influence on the adjacent cells while improving transmission efficiency by changing the modulation scheme to a higher one as well as raising transmission power when, for example, transmitting a wireless signal to a mobile station apparatus that requires low transmission power, and if the communication slot of each time channel or each frequency channel to which high transmission power has been allocated is vacant

(10) In addition, a base station apparatus according to the present invention is characterized by updating the allocated transmission power at intervals of a certain period of time when determining the allocation of time channel or part of time channel, or frequency channel or part of frequency channel for transmitting the transmission data.

As described above, since the base station apparatus updates the allocated transmission power at intervals of a certain period of time, it is made possible to allocate transmission power in accordance with the movement of the mobile station apparatus, the change in the situation of propagation path, etc.

(11) In addition, a base station apparatus according to the present invention is characterized by updating the allocated transmission power when determining the allocation of time channel or part of time channel, or frequency channel or part of frequency channel for transmitting the transmission data, and if there exists a mobile station apparatus that newly makes a request for connection in the cell and if any one of the mobile station apparatus moves, or if the situation of propagation path changes in any one of the mobile station apparatus.

With this configuration, it is made possible to allocate transmission power in accordance with the variation in the situation of communication in the cell in real time.

(12) In addition, a base station apparatus according to the present invention is characterized by allocating transmission power so that, when updating the transmission power, the difference between the transmission power immediately before the update and the transmission power to be allocated at the time of update is equal to or less than a fixed value.

As described above, since the base station apparatus allocates the transmission power so that the difference between the transmission power immediately before the update and the transmission power to be allocated at the time of update is equal to or less than a fixed value, it is made possible to keep the variation in interference with the adjacent cells to a minimum. Here, the difference shall be equal to or less than a fixed value because of an attempt to define a range in which the transmission power immediately before update does not change considerably after the update. A specific numerical value range can be found from the technical common sense in the communication technique.

(13) In addition, a base station apparatus according to the present invention is characterized by allocating, when determining the allocation of time channel or part of time channel, or frequency channel or part of frequency channel for transmitting the transmission data, transmission power with which a wireless signal can reach the entire range in the cell to at least one of the time channels or frequency channels and at the same time, transmission power the influence of which on the adjacent cells can be ignored to at least one of the time channels or frequency channels.

By thus allocating transmission power, it is made possible to deal flexibly even with the case where there appears a mobile station apparatus that newly makes a request for connection in the cell and the mobile station apparatus requires high transmission power or low transmission power.

(14) In addition, a base station apparatus according to the present invention is characterized by acquiring a level of interference received from the adjacent cells based on information received from the mobile station apparatus and determining the time channel or part thereof, or the frequency channel or part thereof to which the transmission power with which the wireless signal can reach the entire range in the cell is allocated in accordance with the measured interference level in order to transmit data other than the control data.

As described above, since the base station apparatus determines the time channel or part thereof, or the frequency channel or part thereof to which the transmission power with which the wireless signal can reach the entire range in the cell is allocated in accordance with the measured interference level, it is possible to evaluate only the time channel or the part thereof, or the frequency channel or the part thereof that is actually affected by the interference from the adjacent cells and it is made possible to improve the usage efficiency of the time channel or the part thereof, or the frequency channel or the part thereof.

(15) In addition, a base station apparatus according to the present invention is characterized by measuring the number of adjacent cells based on the information received from the mobile station apparatus and determining, when determining the allocation of time channel, frequency channel, or communication slot for transmitting the transmission data, a number L of the time channels or part thereof, or the frequency channels or part thereof to which the transmission power with which the wireless signal can reach the entire range in the cell is allocated in accordance with the measured interference level in order to transmit data other than the control data as such one that holds $$L \leq (\text{total number of time channels, frequency channels, or communication slots})/\{(\text{number of adjacent cells})+1\}.$$

As described above, since the base station apparatus dynamically changes the number of time channels or the part thereof, or the number of frequency channels or the part thereof to which the transmission power with which the wireless signal can reach the entire range in the cell is allocated in accordance with the number of adjacent cells, it is made possible to improve the usage efficiency of the time channel or the part thereof, or the frequency channel or the part thereof.

(16) In addition, a base station apparatus according to the present invention is characterized by allocating, when determining the allocation of time channel or part of time channel, or frequency channel or part of frequency channel for transmitting the transmission data and if on one hand, there exists a mobile station apparatus required to transmit a wireless signal with transmission power with which the wireless signal can reach the entire range in the cell and if on the other hand, there exists no data to be transmitted to the mobile station apparatus, dummy data to be transmitted to the mobile station apparatus and the transmission power with which the wireless signal can reach the entire range in the cell to the time channel or the part thereof, or the frequency channel or the part thereof.

With such a configuration, it is made easy to detect a channel with high interference power at each terminal of the adjacent cells.

(17) In addition, a base station apparatus according to the present invention is characterized by adding a hysteresis characteristic to the condition for the change of groups when the group to which the transmission power allocated to the mobile station apparatus belongs is changed due to the information received from the mobile station apparatus.

With such a configuration, it is made possible to perform the grouping operation stably without being affected considerably from situations in which the communication speed is not constant and the communication speed needs to be changed frequently at the mobile station apparatus.

(18) In addition, a wireless communication system according to the present invention is characterized by being configured by the base station apparatus according to any one of claim 1 to claim 17 and at least one mobile station apparatus.

According to the wireless communication system according to the present invention, it is made possible to carry out the allocation of transmission power adaptively without affecting the adjacent cells.

(19) In addition, a mobile station apparatus according to the present invention is characterized by being applied to the wireless communication system according to claim 18.

According to the mobile station apparatus according to the present invention, it is made possible to carry out the allocation of transmission power adaptively without affecting the adjacent cells.

(20) In addition, a wireless communication method according to the present invention is a wireless communication method of a base station apparatus having a plurality of time channels and transmitting a wireless signal to a mobile station apparatus using the time channel, characterized by comprising at least a step for receiving information from the mobile station apparatus, a step for determining transmission power when transmitting a wireless signal to the mobile station apparatus based on the received information, a step for acquiring information about communication environment in each time channel from the received information, a step for determining the allocation of time channel or part of time channel and transmission power for transmission to the mobile station apparatus based on the determined transmission power and the information about communication environment, and a step for transmitting a wireless signal to the mobile station apparatus using the time channel or the part of time channel to which the transmission data and the determined transmission power have been allocated.

As described above, since the transmission power when transmitting the wireless signal to the mobile station apparatus is determined and at the same time, the transmission power to be allocated to the time channel is determined based on the information received from the mobile station apparatus, and the time channel or part of time channel for transmitting transmission data is determined based on the transmission power when transmitting the wireless signal to the mobile station apparatus and the transmission power allocated to the time channel, for example, small transmission power is allocated to a time channel with large interference power, a time channel with small SINR, and a time channel with a large error rate because those time channels are used only on the central part of the cell as those not used on the peripheral part of the cell because of their large interference. In addition, large transmission power is allocated to a time channel with small interference power, a time channel with large SINR, and a time channel with a small error rate as those used on the peripheral part of the cell because their interference is small also on the peripheral part of the cell. Due to this, it is made possible to carry out the allocation of transmission power adaptively without affecting adjacent cells.

(21) In addition, a wireless communication method according to the present invention is a wireless communication method of a base station apparatus having a plurality of frequency channels and transmitting a wireless signal to a mobile station apparatus in a cell using the frequency channel, characterized by comprising at least a step for receiving information from the mobile station apparatus, a step for determining transmission power when transmitting a wireless signal to the mobile station apparatus based on the received information, a step for acquiring information about communication environment in each frequency channel from the received information, a step for determining the allocation of frequency channel or part of frequency channel and transmission power for transmitting transmission data to the mobile station apparatus based on the determined transmission power and the information about communication environment, and a step for transmitting a wireless signal to the mobile station apparatus using the frequency channel or the part of time channel to which the transmission data and the determined transmission power have been allocated.

As described above, since the transmission power when transmitting the wireless signal to the mobile station apparatus is determined and at the same time, the transmission power to be allocated to the frequency channel is determined based on the information received from the mobile station apparatus, and a frequency channel or part of frequency channel for transmitting transmission data is determined based on the transmission power when transmitting the wireless signal to the mobile station apparatus and the transmission power allocated to the frequency channel, for example, small transmission power is allocated to a frequency channel with large interference power, a frequency channel with small SINR, and a frequency channel with a large error rate because those frequency channels are used only on the central part of the cell as those not used on the peripheral part of the cell because of their large interference. In addition, large transmission power is allocated to a frequency channel with small interference power, a frequency channel with large SINR, and a frequency channel with a small error rate as those used on the peripheral part of the cell because their interference is small also on the peripheral part of the cell. Due to this, it is made possible to carry out the allocation of transmission power adaptively without affecting adjacent cells.

According to the present invention, since transmission power when transmitting a wireless signal to a mobile station apparatus is determined and at the same time, transmission power to be allocated to a group of slots is determined based on information received from the mobile station apparatus, and a group of slots or part of a group of slots for transmitting transmission data is determined based on the transmission power when transmitting the wireless signal to the mobile station apparatus and the transmission power allocated to the group of slots, it is possible to carry out the allocation of transmission power adaptively without affecting adjacent cells.

BRIEF DESCRIPTION OF THE DRAWINGS

FIG. 49 is a diagram showing an example of a condition in grouping.

BEST MODES FOR CARRYING OUT THE INVENTION

First Embodiment

Figure 1:
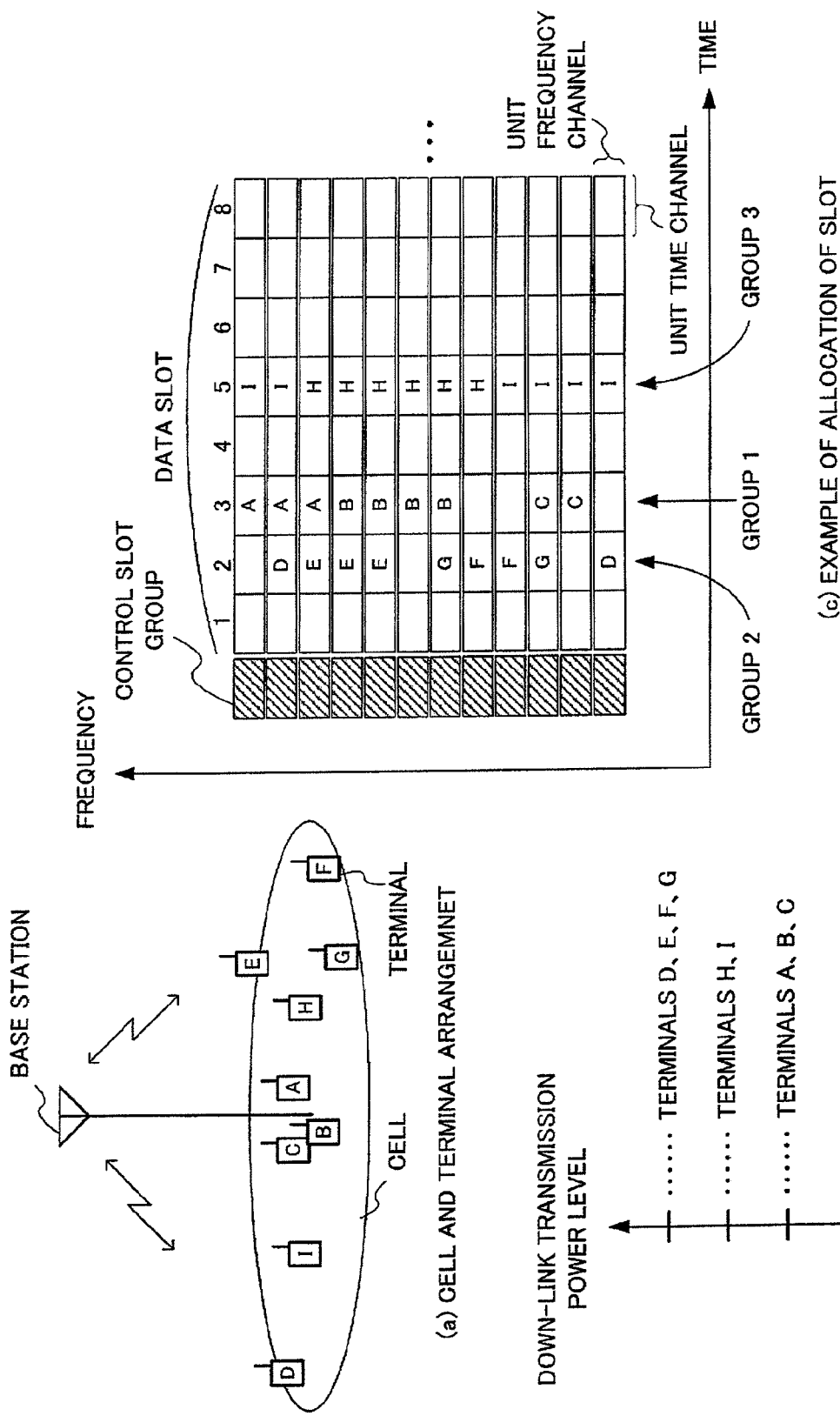
FIG. 1(a) is a diagram showing an arrangement situation of a cell and mobile station terminals.
FIG. 1(b) is a diagram showing transmission power required for Down-link in the cell.
FIG. 1(c) is a diagram showing an example of the allocation of slots.

A method of allocation of slot according to a first embodiment of the present invention is explained below. In the method of allocation of slot according to the first embodiment of the present invention, a plurality of terminals that require a transmission power level of the same level in a base station are allocated adaptively to different frequency channels of the same time channel while taking into consideration the influence of interference that comes from adjacent cells. An example of the result of the allocation when such adaptive allocation of slot is carried out is shown in FIG. 1. By the way, it is assumed that the "base station" has the same meaning as the control station, AP, or base station apparatus and the "mobile station" has the same meaning as the MT, mobile station apparatus, or terminal.

FIG. 1(a) shows a cell and the arrangement of terminals in the cell and FIG. 1(b) shows transmission power required for the Down-link communication for the respective terminals in the cell. However, in the first embodiment of the present invention, it is assumed that the transmission of transmission power control is so performed that the reception power of all of the terminals in the cell is the same. In such a situation, when the method of allocation of slot according to the first embodiment of the present invention is applied, the terminals whose transmission power required for the Down-link is the same level are grouped. Here, grouping is such that terminal A, terminal B, and terminal C are put into group 1, terminal D, terminal E, terminal F, and terminal G are put into group 2, and terminal H and terminal I are put into group 3. Then, it follows that the terminals belonging to the same group are allocated to different frequency channels of the same time channel. Here, it is assumed that the group 1 is allocated to time channel 3, the group 2, to time channel 2, and the group 3, to time channel 5. As a result, such channel allocation as shown in FIG. 1(*c*) is carried out and the transmission power required for the Down-link communication to a terminal is maintained at the same level for each time channel and therefore it is possible to keep the average interference power affecting on adjacent cells substantially constant for each time channel. A channel allocation procedure by such adaptive allocation of slot is explained below.

Figure 2:
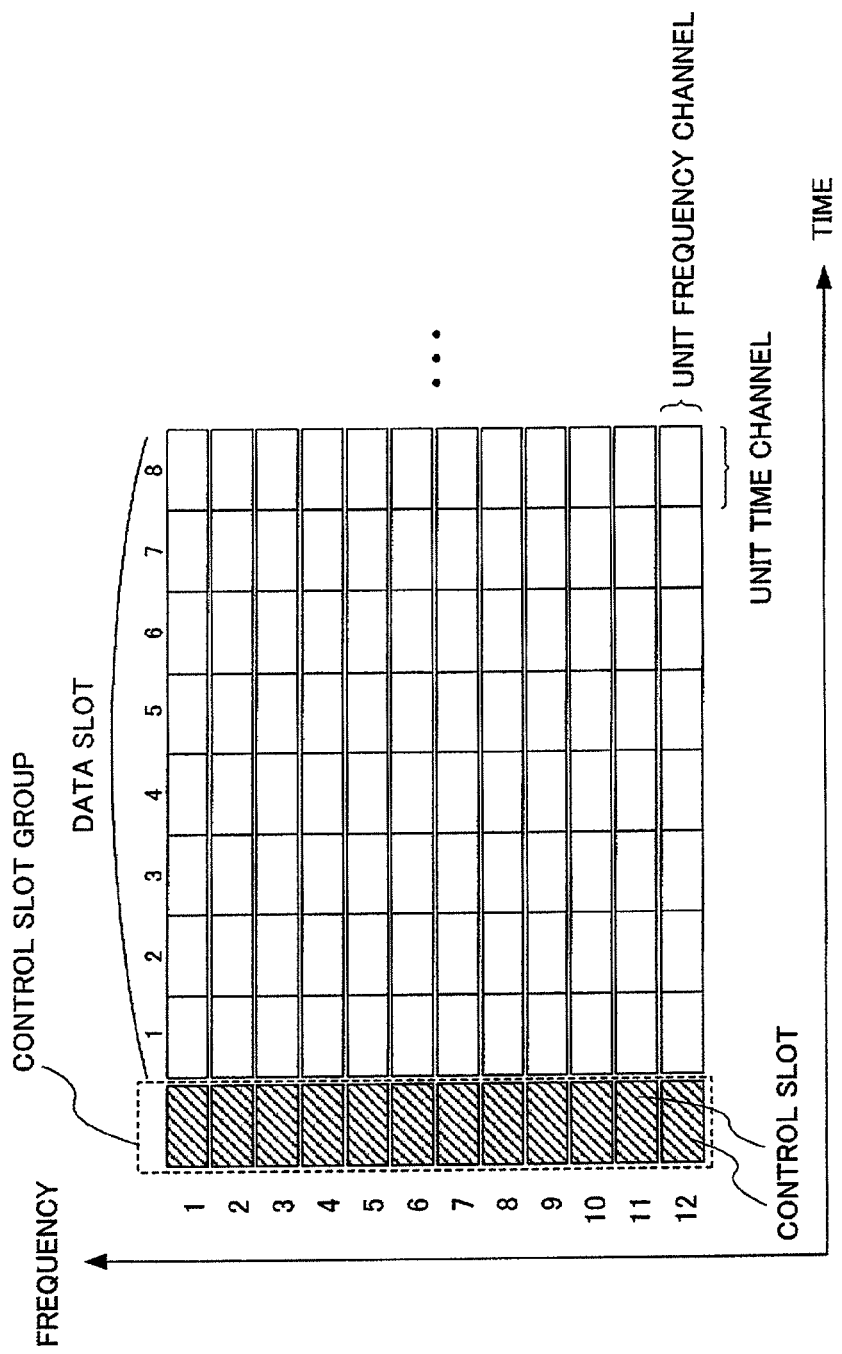
FIG. 2 is a diagram showing a configuration example of slots.

First, a slot configuration according to the first embodiment of the present invention is shown in FIG. 2. As shown in FIG. 2, the slot configuration according to the first embodiment of the present invention is assumed to be a configuration in which the number of frequency channels is 12, the number of time channels including control slots (hereinafter, a single time channel for transmission of control information in a single frequency channel is referred to as a control slot and the time channels for transmission of control information over a plurality of frequency channels are referred to as a control slot group) is 9, and the same frequency band is used in all of the cells. In the following, explanation is given with an example of a system in which base stations are synchronized with each other, however, the present invention is not limited to a system in which base stations are synchronized with each other but can also be applied to a system in which base stations are not synchronized with each other as in the case of the synchronized system.

Figure 3:
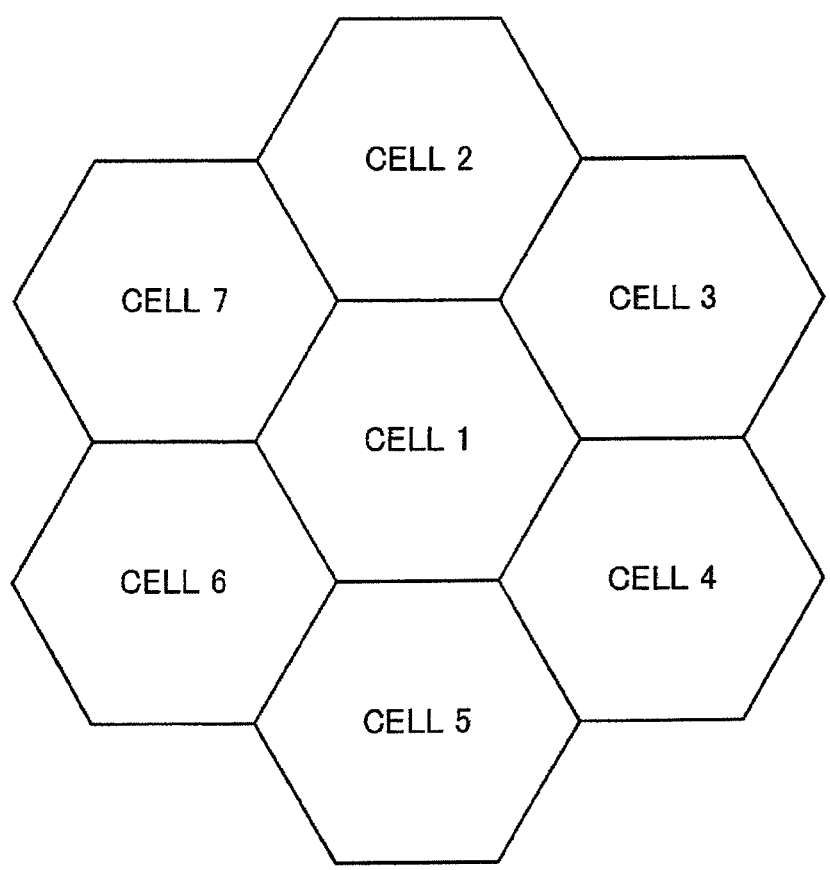
FIG. 3 is a diagram showing an example of cell arrangement.
Figure 4:
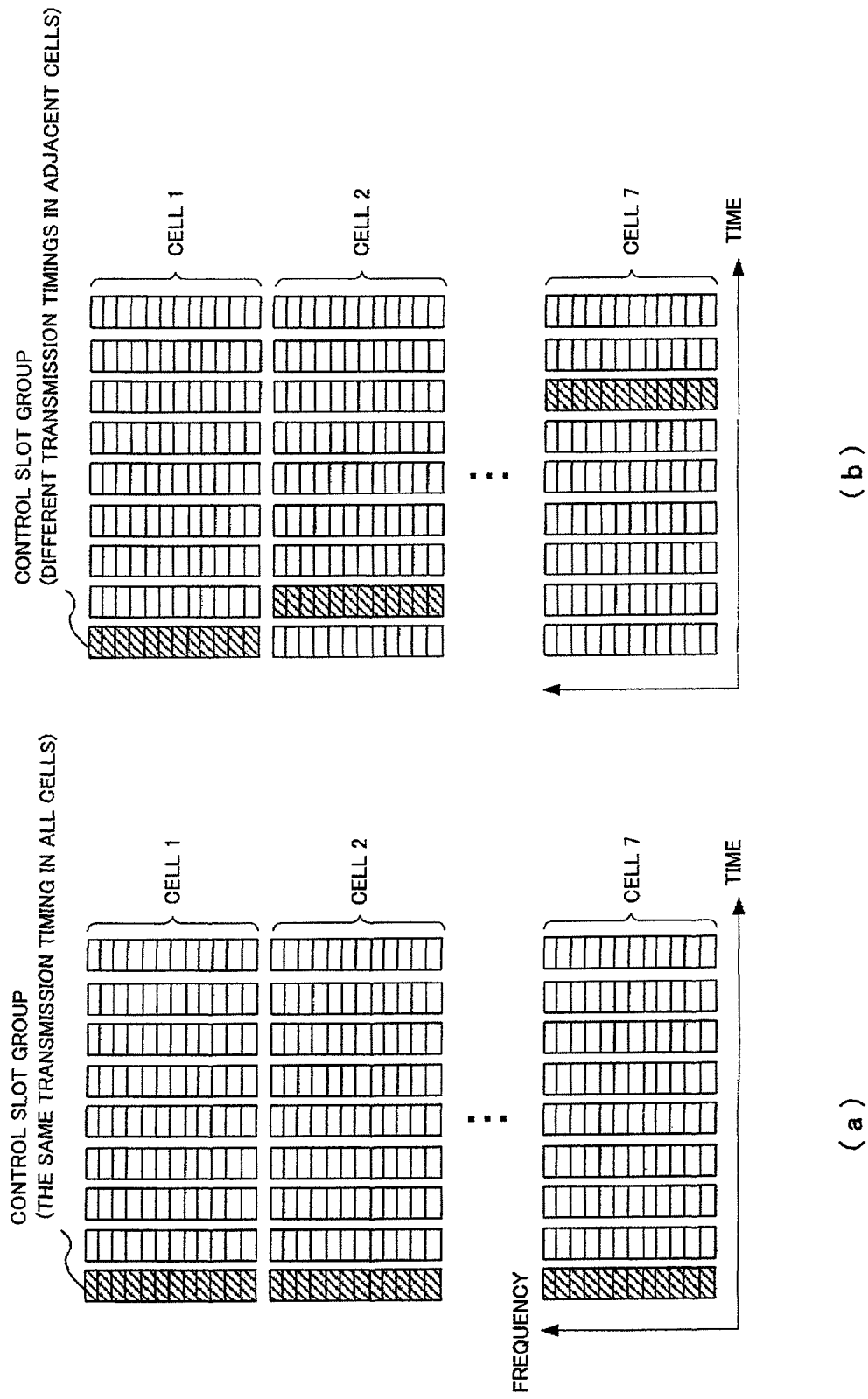
FIG. 4 is a diagram showing transmission timing of a control slot group.

In addition, in the case of the system in which base stations are synchronized with each other, it may also be possible to assume that the cell arrangement is a state as shown in FIG. 3 and that the transmission timing of the control slot group is one common to all of the cells as shown in FIG. 4(*a*), and further that the configuration is such one in which timing is different for each cell as shown in FIG. 4(*b*). Furthermore, it may also be possible to assume a configuration in which the transmission timing of the control slot is different from frequency channel to frequency channel. A case where the control slot group is transmitted with common timing determined in advance in all of the cells is explained below.

Figure 5:
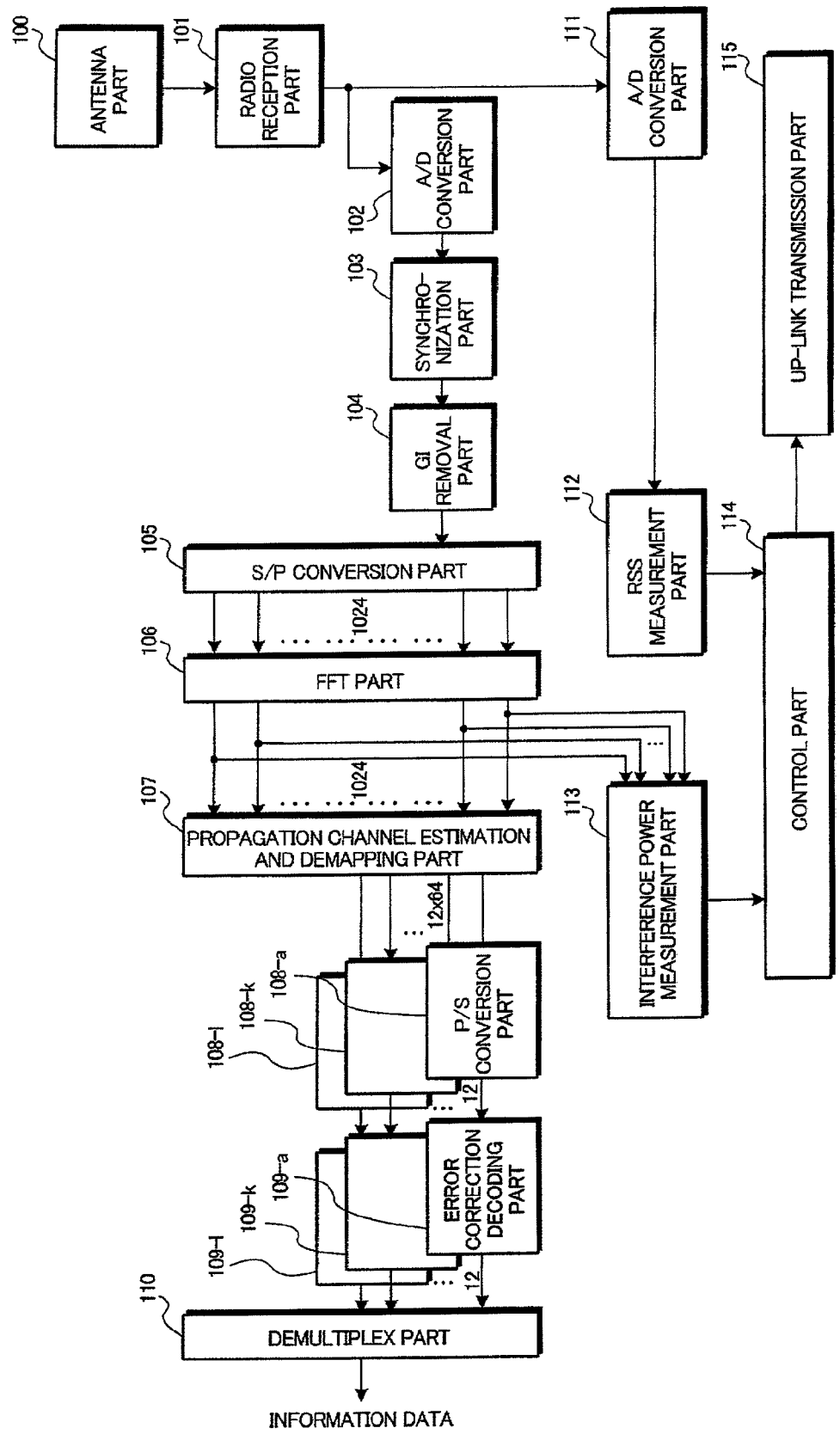
FIG. 5 is a block diagram showing a general configuration of a mobile station apparatus.

First, a device configuration of terminals when the allocation of slot according to the first embodiment of the present invention is carried out is shown in FIG. 5. FIG. 5 is a block diagram of a device configuration of terminals. In FIG. 5, reference number 100 denotes an antenna part, 101 denotes a radio reception part, 102 and 111 denote an A/D conversion part, 103 denotes a symbol synchronization part, 104 denotes a guard interval removal part, 105 denotes an S/P part, 106 denotes an FET part, 107 denotes a propagation channel estimation and demapping part, 108 denotes a P/S part, 109 denotes an error correction decoding part, 110 denotes a demultiplex part, 112 denotes an RSS (Received Signal Strength) measurement part, 113 denotes an interference power measurement part, 114 denotes a control part, and 115 denotes an Up-link transmission part.

As shown in FIG. 5, a terminal that is carried out the allocation of slot according to the first embodiment of the present invention has the RSS measurement part 112, unlike the conventional example, and performs measurement of a reception power level at Down-link. In addition, measurement of interference power is performed at the interference power measurement part 113. However, in FIG. 5, the interference power measurement part is at the post stage of the FFT part 106 and has a configuration in which the transmission power of an interference signal after FFT is measured, but, not limited to this, and a configuration may be possible in which the transmission power of an interference signal before FFT is measured.

The RSSI (Received Signal Strength Indicator) thus measured is subtracted from the transmission power information of a base station included in the control information transmitted from the base station at the control part 114 and thereby a propagation loss is calculated. The information about the propagation loss and the interference power in each time channel is put together with other information data as a packet at the control part 114 and transmitted to the base station at the Up-link transmission part 15.

Processes other than the above (demodulation of information data etc.) are performed in the same manner as that of the prior art. First, the received signal is subjected to symbol-synchronization at the synchronization part 113 via the A/D conversion part 102. After that, the guard interval is removed at the guard interval (GI) removal part 104 and after subjected to serial/parallel conversion at the S/P conversion part 105, the received signal is transmitted to the FFT part 106 and converted from a signal in the time area into a signal in the frequency area. For the received signal thus converted into one in the frequency area, propagation channel estimation and demapping are performed at the propagation channel estimation and demapping part 107, and after the parallel/serial conversion at the P/S conversion part 108, the transmission data is decoded at the error correction decoding part 109 and transmitted to the demultiplex part, as a result.

Figure 6:
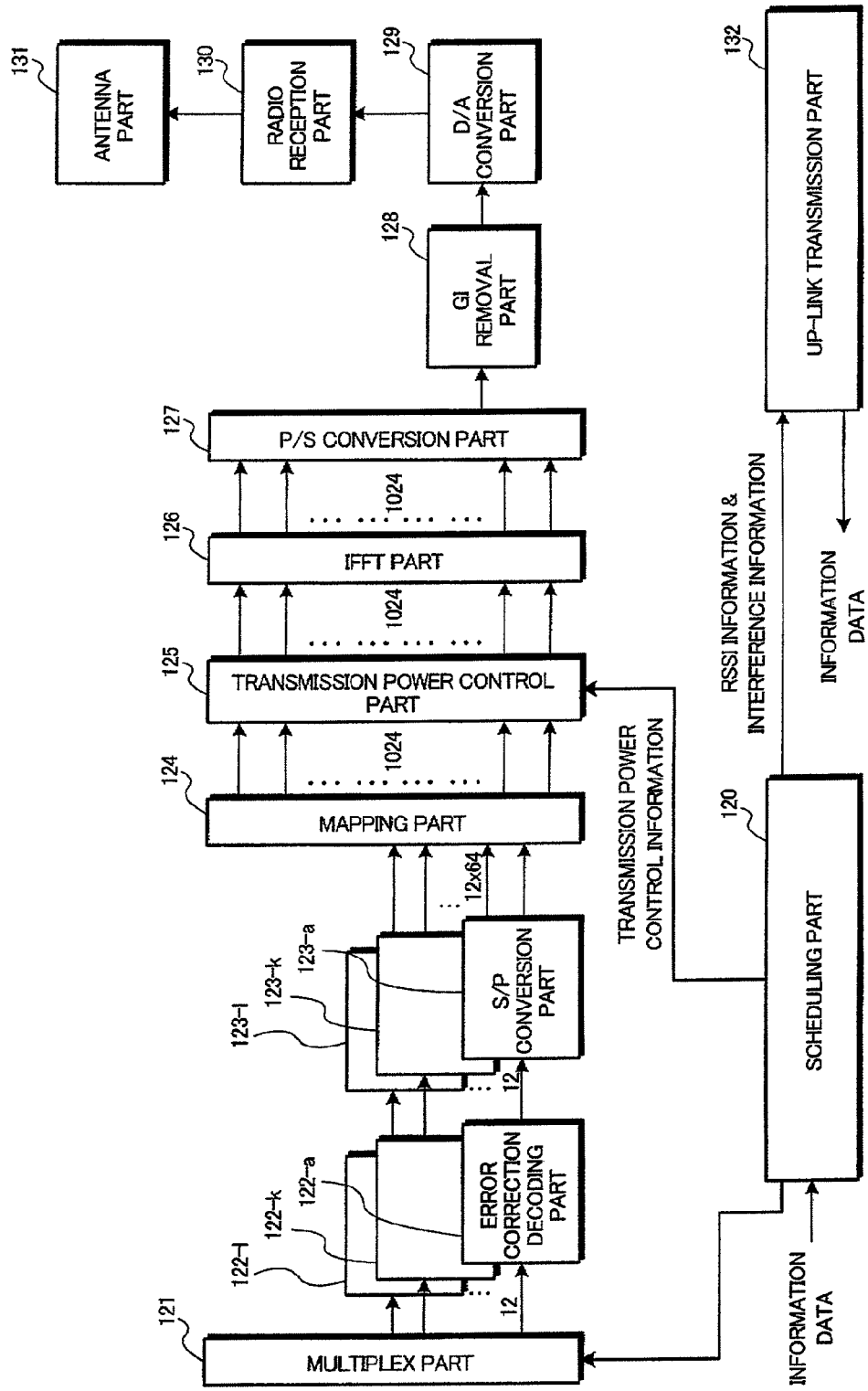
FIG. 6 is a block diagram showing a general configuration of a base station apparatus.

FIG. 6 is a block diagram of a device configuration of a base station. In FIG. 6, reference number 120 denotes a scheduling part, 121 denotes a multiplex part, 122 denotes an error correction encoding part, 123 denotes an S/P part, 124 denotes a mapping part, 125 denotes a transmission power control part, 126 denotes an IFFT part, 127 denotes a P/S part, 128 denotes a guard interval insertion part, 129 denotes a D/A conversion part, 130 denotes a radio transmission part, 131 denotes an antenna part, and 132 denotes an Up-link reception part.

As shown in FIG. 6, a base station when the allocation of slot according to the first embodiment of the present invention is carried out transmits the propagation loss information and interference information obtained from the Up-link reception part to the scheduling part 120 unlike the conventional example, and carries out the allocation of slot according to the first embodiment of the present invention. Then, at a slot allocated by the scheduling part 120, transmission of information data of each terminal is performed as a result, and at the same time, the transmission power control information for each terminal is obtained from the scheduling part 120 and transmitted to the transmission power control part 125.

Figure 7:
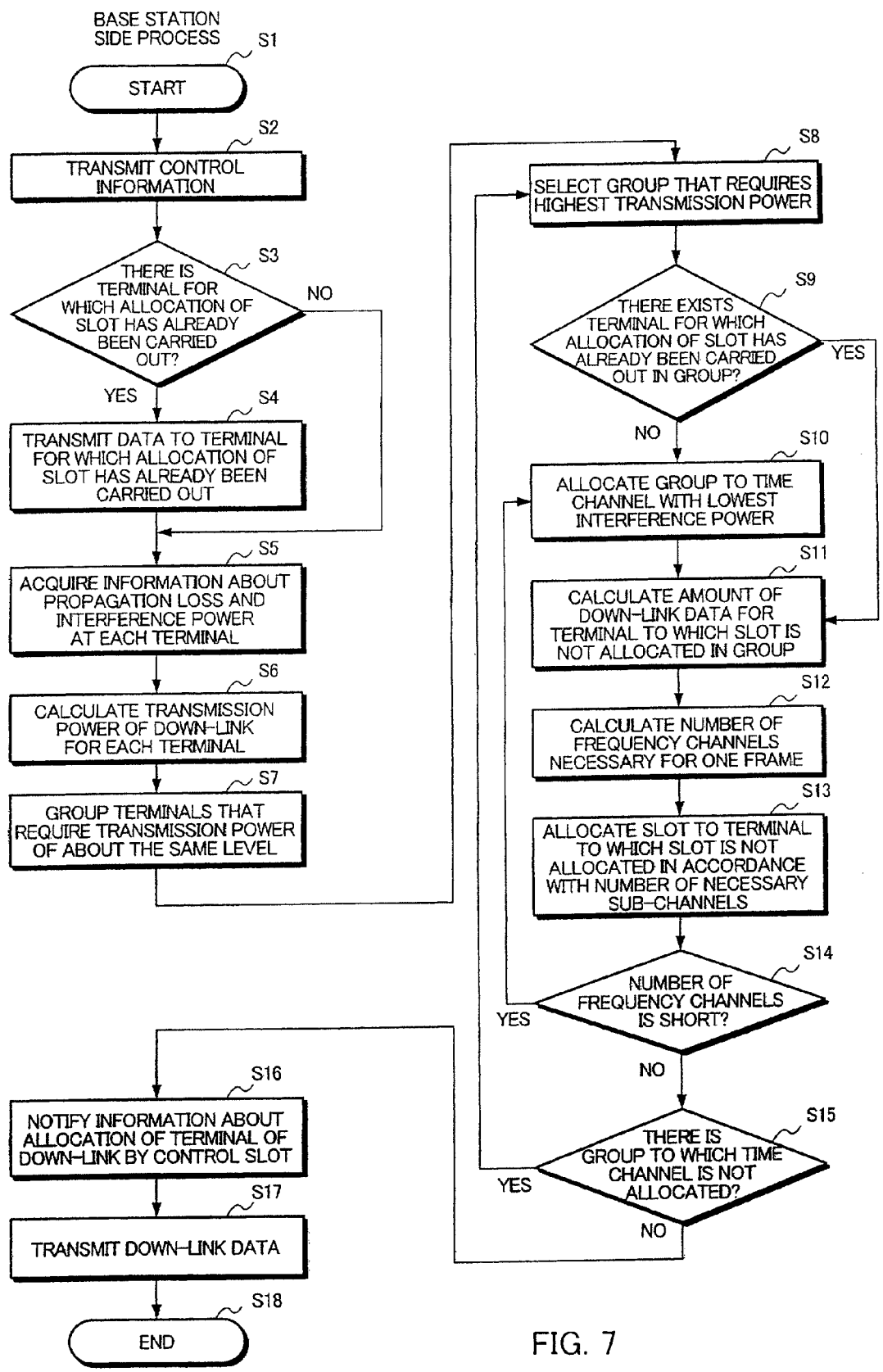
FIG. 7 is a flow chart showing the operation of the allocation of slot at a base station apparatus.
Figure 8:
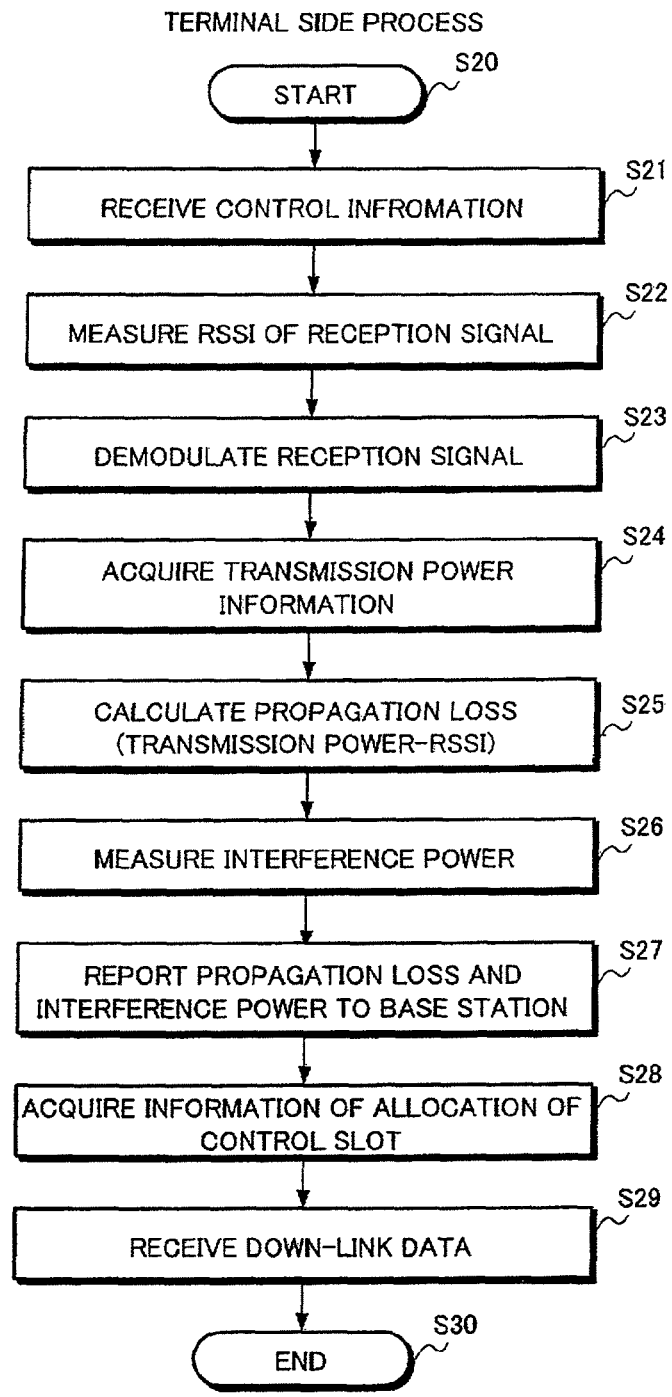
FIG. 8 is a flow chart showing the operation of the allocation of slot at a mobile station apparatus.
Figure 9:
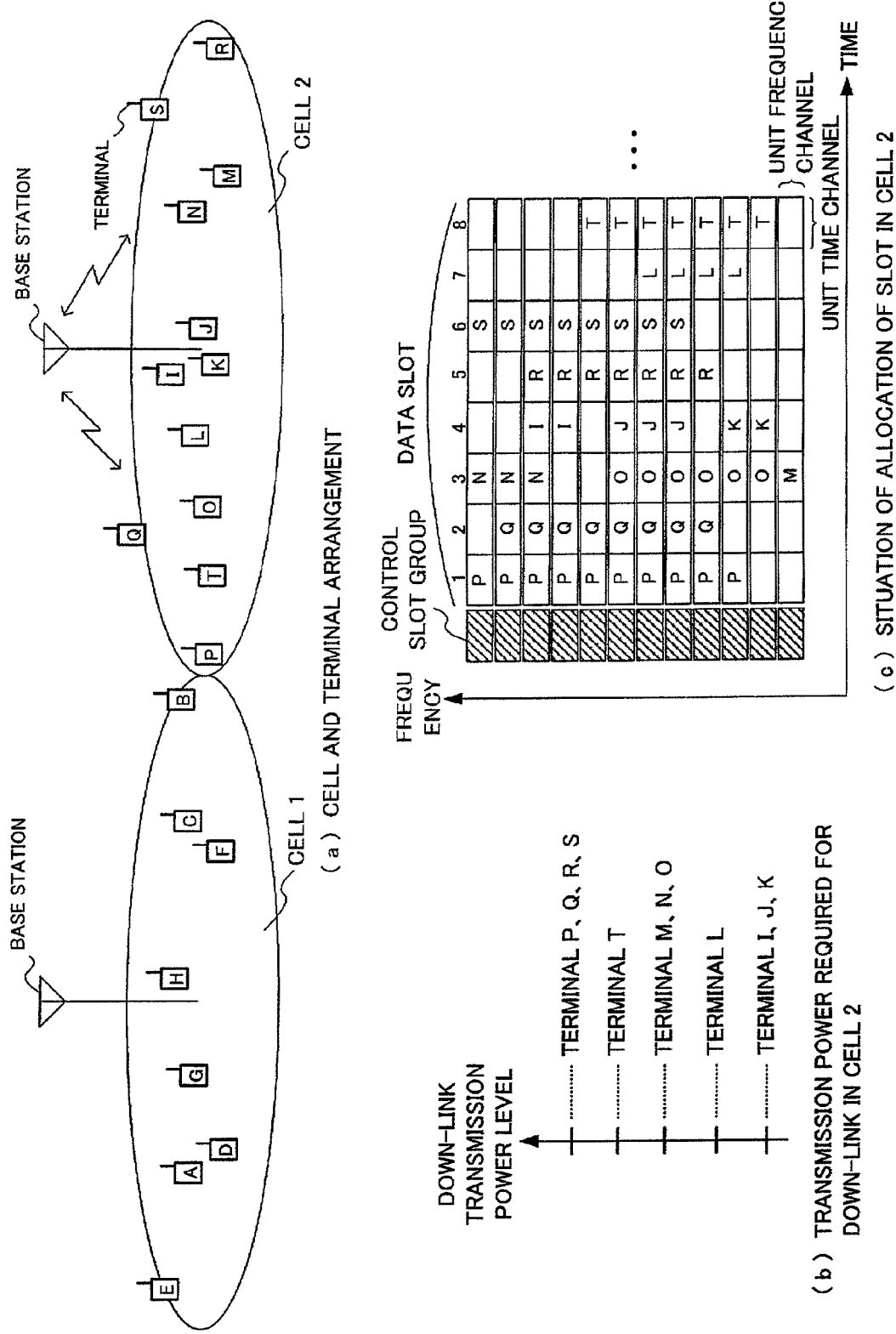
FIG. 9(a) is a diagram showing an arrangement situation of mobile station apparatus in cell 1 and cell 2.
FIG. 9(b) is a diagram showing transmission power required for Down-link in the cell 2.
FIG. 9(c) is a diagram showing a situation of the allocation of slot in the cell 2.

Next, a flow chart of allocation of slot at a base station according to the first embodiment of the present invention is shown in FIG. 7 and FIG. 8. A control flow shown in FIG. 7 and FIG. 8 is explained below, in which each terminal in cell 1 in FIG. 9(*a*) is actually put into a group and channel allocation is carried out. Here, it is assumed that in cell 2 (adjacent cell of the cell 1) in FIG. 9(*a*), the allocation of channel and slot has already been carried out and the situation of the channel allocation is such one as shown in FIG. 9(c). At this time, it is also assumed that each of terminals I to T in the cell 2 is at each of positions shown in FIG. 9(a), respectively, and the transmission power (transmission power required for Down-link) in the base station corresponding to the respective terminals is such one as shown in FIG. 9(b).

In the situation as described above, when there occurs a request for communication in the terminal A, terminal B, and terminal C situated in the cell 1, first, as shown in FIG. 7 and FIG. 8, the terminals A to C receive (step S21) the control information of all of the frequency channels transmitted (step S2) periodically in the control slot group from the base station in each cell, and measures the RSSI of the received signal at each terminal as shown in step S22. It is assumed that the control slot group transmitted periodically from the base station in each cell is transmitted with transmission power that can be received by even a terminal situated at the edge of the cell and the contents of the control information include transmission power information (information indicative of the magnitude of transmission power used for the transmission) when the base station transmits control information, information about allocation of slot, etc.

After the measurement of the RSSI at each terminal, the terminals A to C demodulate the received signal, as shown in step S23 and obtain the transmission power information at the base station when the control information is transmitted. Next, from the transmission power information at the base station obtained in step S24 and the RSSI obtained in step S22, the amount of attenuation of radio waves on the propagation path (propagation loss: here it is assumed that propagation loss=transmission power−RSSI) is calculated (step S25).

Further, as shown in step S26, measurement of the interference power that comes from the adjacent cells is performed at each of the terminals (terminals A to C). The terminals A to C notify the base station of the interference power thus obtained and the propagation loss information of Down-link between the base station and the terminal obtained in step S26 via the Up-link (step S27).

By the procedure described above, it is possible for the base station to obtain the propagation loss information of the Down-link between the base station and the terminal and the information about interference power that comes from the adjacent cells necessary to carry out the adaptive allocation of slot according to the first embodiment of the present invention for each terminal.

Next, at the base station, as shown in step S5 to step S7 in FIG. 7, the terminals are grouped based on the propagation loss information at each terminal obtained via the Up-link. Here, the grouping of terminals is a process, as shown in FIG. 10(a), in which the transmission power required for performing Down-link transmission for each terminal is calculated from the propagation loss at each terminal (step S6) and the terminals having the same transmission power as a result of the calculation are handled as a group (step S7).

Figure 10:
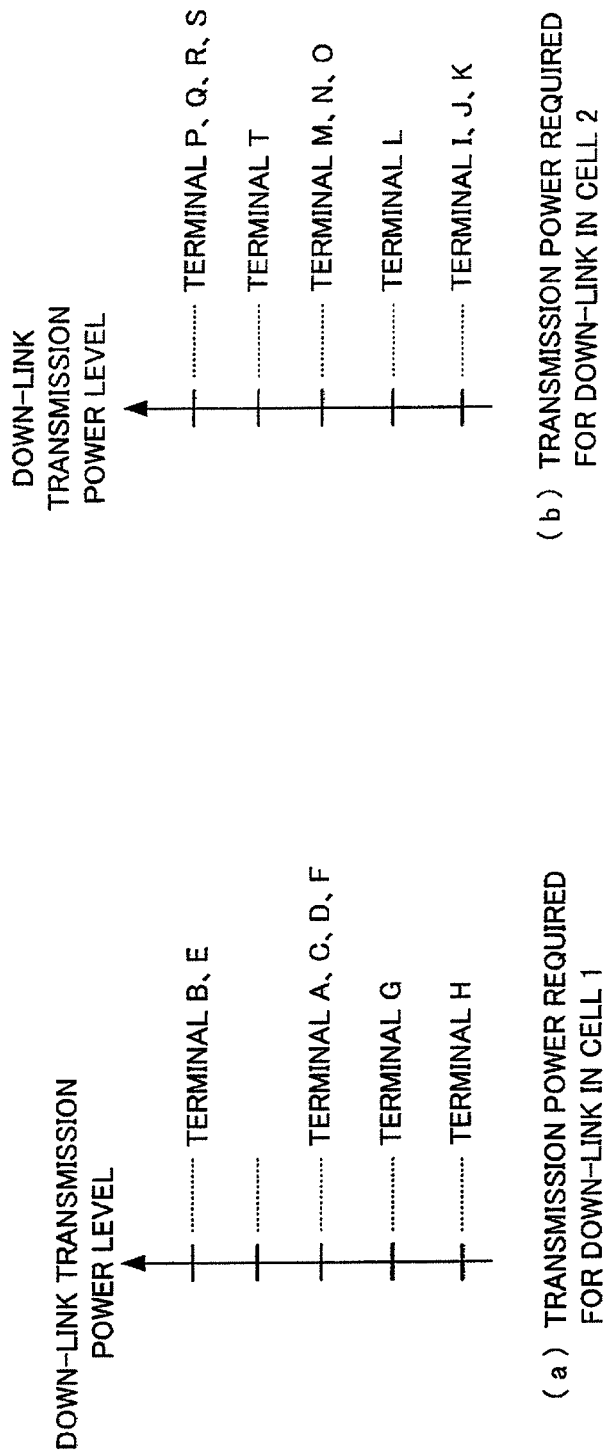
FIG. 10(a) is a diagram showing transmission power required for Down-link in the cell 1 and FIG. 10(b) shows a diagram showing transmission power required for Down-link in the cell 2.

By the way, as shown in FIG. 9(b), FIG. 10(a), and FIG. 10(b), explanation is given on the assumption that the transmission power of the Down-link for each terminal assumes discrete values, however, not limited to this example, the present invention can also be applied to the case where the transmission power of the Down-link for each terminal assumes continuous values.

As shown in FIG. 10(a), here, the transmission power of the Down-link for the terminal A is the same level as that of the transmission power of the Down-link for the terminal C, and as a result, they belong to the same group (here, the group 2). In addition, the terminal B requires high transmission power and therefore it belongs to a group (here, the group 1) different from that of the terminals A and C.

As described above, after the terminals (here, the terminals A to C) having a request for communication are put into a group, the allocation of time channel to each group and the allocation of frequency channel to each terminal belonging to the group are carried out at the base station. By the method of allocation of slot according to the first embodiment of the present invention, the allocation of time channel is carried out in the order from the group with higher transmission power of the Down-link (step S8). Consequently, here, the allocation of time channel is carried out from the group 1 (to which only the terminal B belongs) and as shown in step S9, whether there exists a terminal to which a slot has already been allocated in the selected group (group 1) is determined. Here, only the terminal B that newly initiates communication belongs to the group 1, and therefore, the procedure moves to step S10 and the time channel with the lowest interference power observed at the terminal B of the group 1 among the vacant time channels (here, all of the time channels) is allocated to the group 1.

Figure 11:
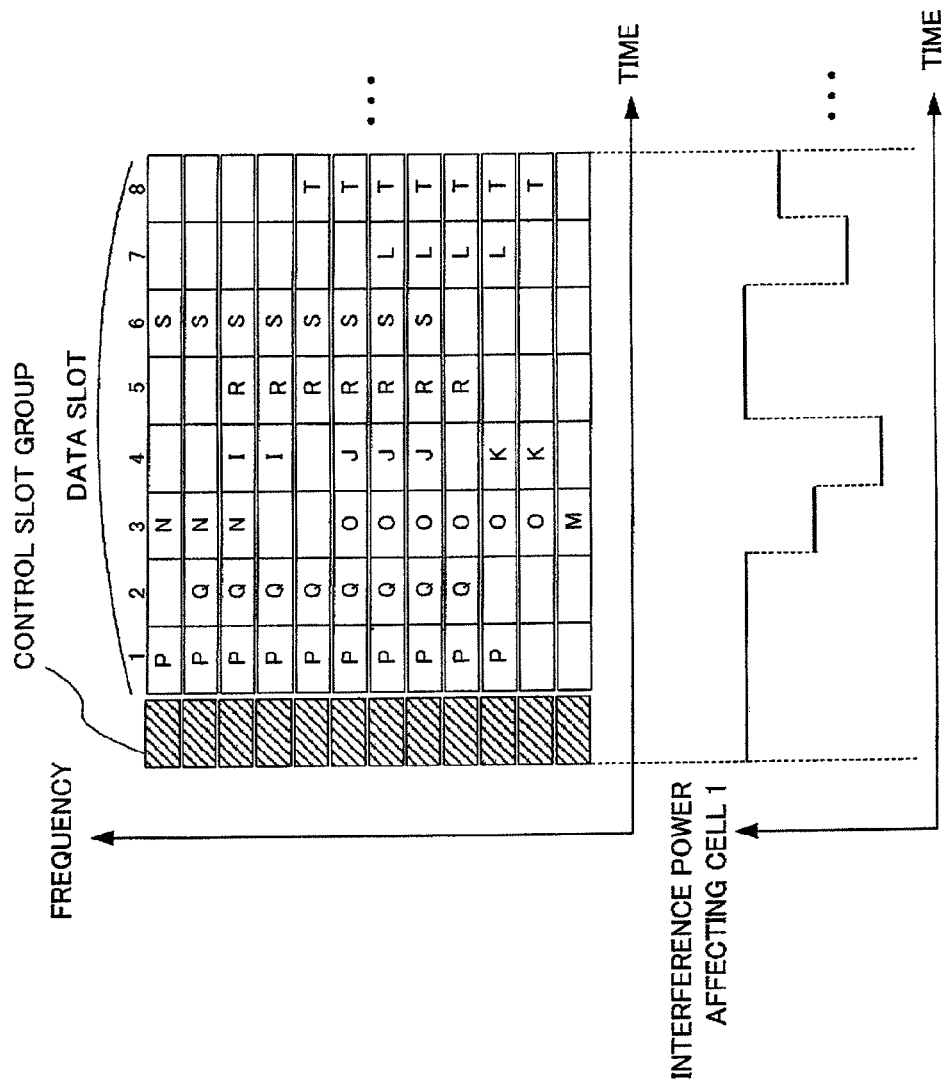
FIG. 11 is a diagram showing a situation of the allocation of mobile station apparatus in the cell 2 and interference power affecting the cell 1.

As shown in FIG. 11, the interference power in the time channel 4 is the minimum among the interference power of each time channel observed in the cell 1 and the time channel 4 is allocated to the group 1. As shown in FIG. 11, the interference power affecting the cell 1 is the minimum in the time channel 4, and this is because the terminals I to K situated near the base station of the cell 2 and whose transmission power of the Down-link is set low are allocated to the time channel 4.

Figure 12:
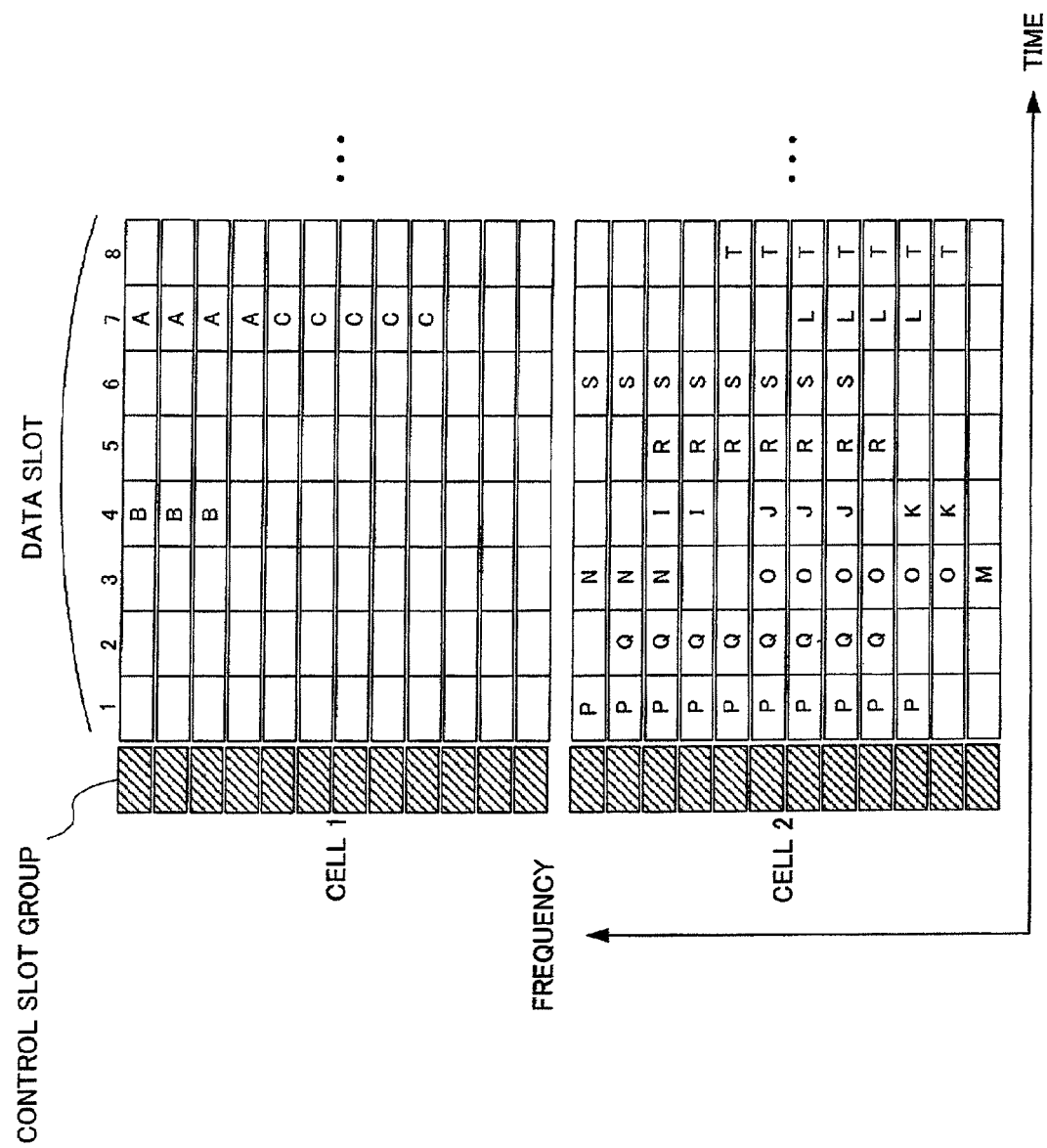
FIG. 12 is a diagram showing a state in which slots have been allocated to mobile station apparatus A to C in the cell 1.

By such a procedure, the allocation of time channel to the group 1 is carried out and next, the allocation of frequency channel to each terminal belonging to the relevant group is carried out (step S11 to step S13). First, as shown in step S11, the amount of data of Down-link for the terminal (terminal B) to which a slot has not been allocated yet in the relevant group (here, the group 1) is calculated, and as shown in step S12, the number of frequency channels necessary for one frame is calculated. Then, as shown in step S13, the allocation of vacant frequency channel to the relevant terminal in accordance with the number of necessary frequency channels. Here, if the number of necessary frequency channels of the terminal B is assumed to be three, it follows that three frequency channels of the time channel 4 are allocated to the terminal B, as shown in FIG. 12.

As above, the allocation of slot to the group 1 is completed, however, since there remain other groups to which allocation must be carried out in addition to the group 1, the procedure returns to step 8 and the allocation of time channel to the relevant group (here, the group 2) is carried out. If the allocation of time channel to the group 2 is carried out in the same manner as the above, the time channel 7 whose interference power is the smallest of all but the time channel already allocated to the group 1 is allocated to the group 2, as a result.

After the allocation of time channel for each group, in the same manner as in the above, the allocation of frequency channel to the terminals A to C belonging to the group 2 to which the time channel has been allocated is carried out and thus the procedure of the allocation of slot is completed. The result of such allocation of slot is notified to the terminal in the cell by the control slot group (step S16, step S17) and after that, each terminal occupies the allocated slot for a fixed period of time and performs communication.

Here, when the allocation of slot in the first embodiment of the present invention is updated and the allocation to a certain time channel is changed to a terminal group different from the previous frame, it is desirable to operate the algorithm so as to allocate, if possible, a terminal group that requires transmission power close to that of the terminal group to which the relevant time channel has been allocated in the previous frame in order to keep the variation in the interference with the adjacent cells to a minimum.

The result of the allocation of slot so far is shown in FIG. 12. As shown in FIG. 12, the terminal B that requires high transmission power at the Down-link in the cell 1 is allocated to the same time channel as that of the terminals I to K at which the Down-link transmission is performed with the lowest transmission power in the cell 2. In addition, the terminals A and C having somewhat higher transmission power in the cell 1 are allocated to the same time channel as that of the terminal L at which the Down-link transmission is performed with low transmission power in the cell 2.

As described above, by carrying out the allocation of slot according to the first embodiment of the present invention, a situation in which the terminals that require high transmission power both in the adjacent cells are allocated to the same time channel is eased and interference between cells can be suppressed.

Further, as to the case where a request for communication occurs newly at the terminals D to H in the cell 1, the process of the allocation of slot by the same procedure is explained. First, in the same manner as before (step S21 to step S29), each terminal having received control information from the base station notifies the base station of the propagation loss information of the Down-link and the information about the interference power via the Up-link. Here, if it is assumed that the Down-link transmission power for the terminals D to H is that shown in FIG. 10(a), respectively, the terminals D and F are added to the group 2 to which the terminal A and the terminal C belong. In addition, the terminal E is added to the group 1 to which the terminal B belongs and it follows that the terminal G belongs to the group 3 and the terminal H belongs to the group 4, respectively (step S5 to step S7).

Next, as shown in step S8, if it is assumed that the time channel is allocated in the order from the group having higher transmission power at the Down-link, it follows that the time channel is allocated to the group 1 to which the terminal E belongs. At this time, the terminal B belongs to the group 1 and the time channel 4 has already been allocated. Since the number of vacant frequency channels of the time channel 4 is greater than the number of necessary frequency channels of the terminal E, the number of necessary frequency channels is allocated to the terminal E among the vacant frequency channels of the time channel 4 as a result (step S11 to step S16).

In addition, the terminals D and F are allocated to the vacant frequency channel of the time channel 7 to which the group 2 has been allocated before, however, the number of vacant frequency channels in the time channel 7 is only three as shown in FIG. 12. If the number of necessary frequency channels of the terminal D is assumed to be three, it is possible to allocate the terminal D to the time channel 7, however, if the number of necessary frequency channels of the terminal F is assumed to be five, it is not possible to allocate the terminal F to the time channel 7. In such a case, the terminal D is allocated to the remaining frequency channels of the time channel 7 and the terminal F is allocated to the time channel to which another group is not allocated. In this manner, control is so executed that the number of time channels to be allocated to the same group increases (steps S14 and 15).

As a result, in the time channels (the time channels 1 to 3, 5, 6, and 8) to which no group is allocated, the time channel 3 having the lowest interference power notified from the terminal F is allocated to the terminal F (group 2) and the frequency channels corresponding to the number of necessary frequency channels (five frequency channels) of the terminal F are allocated.

In addition, the time channel 8 having the lowest interference power notified from the terminal G among the remaining time channels is allocated to the group 3 to which the terminal G belongs and the frequency channels corresponding to the number of necessary frequency channels of the terminal G are allocated. Similarly, the time channel 6 is allocated to the group 4 to which the terminal H belongs and the frequency channels corresponding to the number of necessary frequency channels of the terminal H are allocated.

Figure 13:
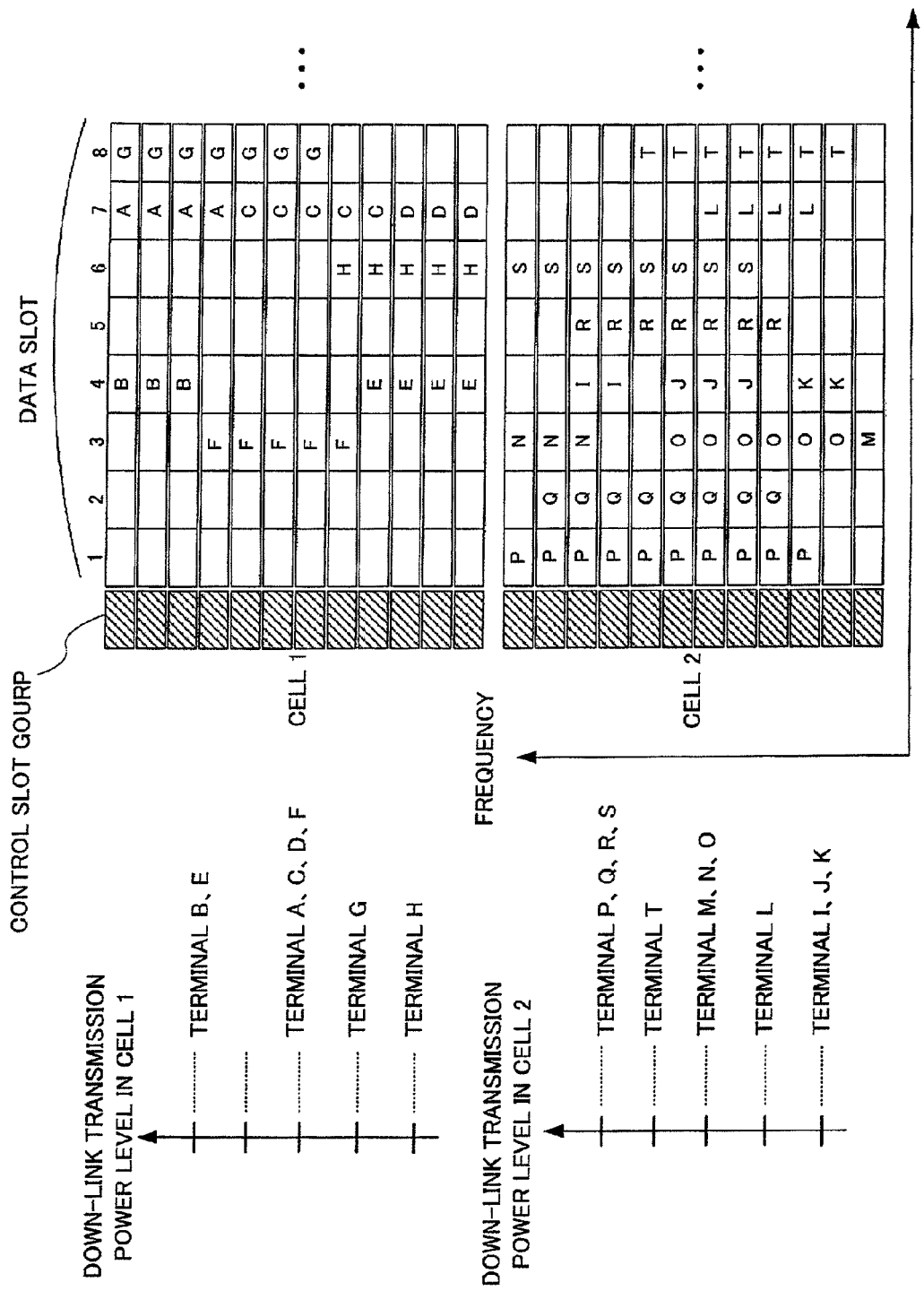
FIG. 13 is a diagram showing transmission power required for Down-link in the cell 1 and the cell 2 and a state in which slots have been allocated to mobile station apparatus D to H in the cell 1.

The result of the allocation of slot described above is shown in FIG. 13. As shown in FIG. 13, the terminals B and E that require high transmission power for the Down-link in the cell 1 are allocated to the same time channel as that of the terminals I to K in which Down-link transmission is performed with low transmission power in the cell 2. In addition, the terminals A, C, D, and F that require slightly higher transmission power for the Down link in the cell 1 are allocated to the same time channel as that of the terminals L to O in which Down-link transmission is performed with low transmission power in the cell 2.

Further, the terminal G and the terminal H that do not require high transmission power in the cell 1 are allocated to the same time channel as that of the terminal T and the terminal S that require high transmission power in the cell 2. As described above, a situation in which the terminals having high transmission power in the adjacent cells are allocate to the same time channel can be eased and also in a situation in which two or more adjacent cells exist, the same allocation is carried out by repeating the above-mentioned procedure.

As described above, by repeating the procedure of the allocation of slot according to the first embodiment of the present invention, it is possible to group the terminals that require transmission power of the same level for Down-link and allocate a different time channel for each group, taking into consideration the interference that comes from the adjacent cells. As described above, by allocating the slot adaptively in accordance with the required transmission power and the interference that comes from the adjacent cells, a situation in which terminals having high transmission power both in the adjacent cells are allocated to the same time channel is eased and by executing the same control for the terminal that newly starts communication, it is made possible to suppress the average interference power affecting the adjacent cells from varying much, and therefore, the interference between cells can be reduced.

By setting in advance a time channel that can be used for each cell, or by setting in advance the transmission power of each time channel to a different value for each cell, separately from the procedure of the allocation of slot according to the present invention, it is made possible to reduce the interference between adjacent cells, however, by such a method in which the time channels that can be used are limited in advance, when there are many terminals that require the same transmission power level in the cell, a situation will arise in which the allocation of time channel is not carried out despite that there are vacant time channels and therefore efficiency decreases.

In contrast to this, in accordance with the allocation of slot according to the present invention, the time channels that can be used are not limited in advance and the allocation of time channel is carried out dynamically in accordance with the required transmission power and the interference power that comes from the adjacent cells, and therefore, it is possible to flexibly deal with an increase or decrease in the number of terminals and the addition of cells by such a control executed autonomously and dispersedly by the base station in each cell and thereby communication of high efficiency can be realized while reducing the interference between cells.

Next, a modification example of the first embodiment of the present invention is shown. First, a form in which adaptive modulation is applied is shown. In the procedure of the allocation of slot according to the first embodiment of the present invention, although the modulation scheme etc. of signals when user data is transmitted is not referred to, when multicarrier transmission such as OFDM etc. is used, it may also be possible to employ the same modulation scheme in all of the sub-carriers, or a form may be possible in which a different modulation scheme is employed for each sub-carrier, or a form may be possible in which a modulation scheme different in terms of time is used in accordance with the variation of the propagation channel instead of using the same modulation scheme at all times.

Similarly, also when the OFDM is not used in each frequency channel (when single carrier transmission is used for each frequency channel), a form is possible in which a modulation scheme different in terms of time in accordance with the propagation channel variation is used. In a procedure in which the modulation scheme is changed in accordance with the propagation channel variation as described above, it follows that the reception signal power and the interference power at the slot allocated to each terminal are measured and after the reception SINR (Signal to Interference plus Noise power Ratio) is calculated by finding its ratio, a modulation scheme in accordance with the reception SINR is selected. In this manner, by combining an adaptive modulation with the allocation of slot according to the first embodiment of the present invention, more efficient communication can be realized.

Next, another modification example relating to the procedure of the allocation of time channel is shown. In the procedure of the allocation of slot according to the first embodiment of the present invention, the allocation of time channel is carried out in the order from the terminal group that requires the highest transmission power among the terminal groups having made a request for communication, however, on the contrary, a procedure is possible in which the allocation of time channel is carried out in the order from the terminal group capable of communication with the lowest transmission power among the terminals having made a request of communication. In this case, it follows that the time channels having high interference power are allocated among the remaining time channels for which allocation has not been carried out yet in the order from the terminal group having the lowest transmission power in the Down-link.

In addition, in the first embodiment of the present invention, the time channels with the minimum interference power measured at the terminal of the group are allocated among the remaining time channels for which allocation has not been carried out yet in the order from the terminal group that requires the highest transmission power among the terminal groups having made a request for communication. However, when the transmission power required by the group having made a request for communication is not so high, the time channel with the minimum interference power is allocated to the group as a result, and after that, even if a request for communication is made at a terminal situated near the cell edge and a group that requires very high transmission power is formed, it is not possible to allocate the time channel with the minimum interference power to a new group that requires high transmission power.

Figure 14:
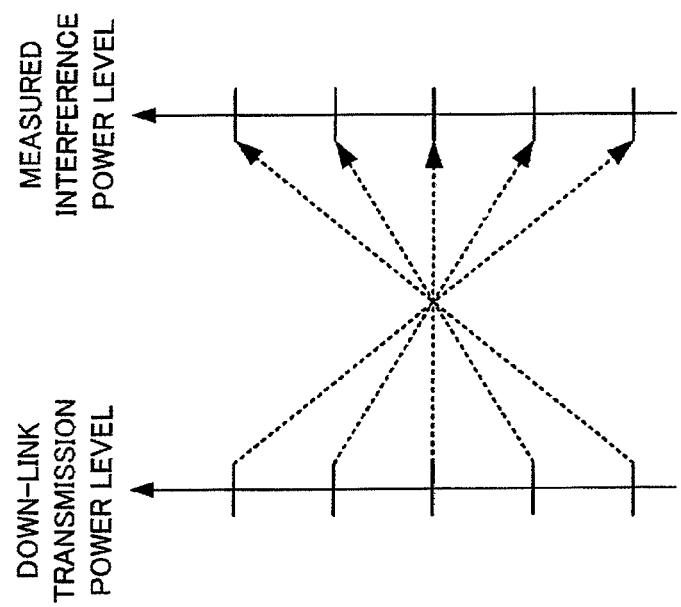
FIG. 14 is a diagram showing how the transmission power level and the interference level are associated with each other.

In order to avoid such a situation, a procedure may be possible, separately from the first embodiment of the present invention, in which, as shown in FIG. 14, the interference level of each time channel is associated with one of the transmission power levels in several steps set in advance and on the supposition of a situation in which a group that requires a transmission power level higher (lower) than that of the group of its own is formed, the allocation of time channel based on the association between the transmission power level and the interference power level is carried out. In this case also, it is made possible to dynamically deal with the circumstances because not only the time channels with an interference level in accordance with the transmission power level shown in FIG. 14 are targeted for allocation, but also the time channels not in accordance with the transmission power level are also targeted for allocation in the case of the situation in which the number of terminals with the same transmission power level is large and the allocation to the targeted time channels is not possible.

In addition, a procedure may be used, separately from the first embodiment of the present invention, in which arbitrary time channels among the time channels with interference power equal to or less than a threshold value which satisfies a predetermined reception quality determined in advance are allocated among the remaining time channels for which allocation has not been carried out yet in the order from the terminal group that requires the highest (lowest) transmission power among the terminal groups having made a request for communication.

Next, the contents of the control information in the Down-link, the contents of the information to be reported from each terminal to the base station via the Up-link, and another form relating to a method of the allocation of frequency channel are shown. In the first embodiment of the present invention, such a form is employed, in which the control slot group in the Down link is used for transmitting the transmission power information of the base station when the control information is transmitted, and at the terminal, the propagation loss and the interference power found from the RSSI are estimated and are reported to the base station by the Up-link.

Separately from this, a form may be possible, in which the control slot group in the Down-link is used for transmitting the transmission power information of the base station as in the first embodiment of the present invention, however, each terminal reports the measured RSSI and interference power to the base station. In this case, after the propagation loss in the propagation channel is calculated at the base station from the difference between the transmission power at the base station and the reported RSSI at the terminal, the transmission power required for the Down-link transmission to each terminal is calculated from the propagation loss as in the first embodiment of the present invention and grouping based on the transmission power of each terminal is performed. By using this form, it is possible to eliminate the procedure to find the propagation loss and the operation part at the terminal.

In addition, separately from this, a form may be possible, in which the same information as that in the first embodiment of the present invention is transmitted in the control slot group in the Down link, however, after measuring the RSSI and calculating the propagation loss, each terminal finds the transmission power control information and reports to the base station the transmission power control information and interference power. Here, the transmission power control information indicates the transmission power obtained by subtracting the transmission power when the control slot group is transmitted from the transmission power required for performing the Down-link transmission found from the propagation loss of each terminal and indicates how much the power should be raised or reduced from the transmission power of the control slot group.

In addition, a form may be possible, in which the same information as that in the first embodiment of the present invention is transmitted in the control slot group of the Down-link, however, each terminal measures and averages the reception signal power of each frequency channel instead of the RSSI indicative of the reception power of the whole of the frequency channels and reports to the base station this together with the interference power. In this case, after the propagation loss in the propagation channel is calculated at the base station from the difference between the transmission power at the base station and the reception power at each frequency channel, the transmission power required for the Down-link transmission to each terminal is calculated from the propagation loss, as in the first embodiment of the present invention, and grouping based on the transmission power of each terminal is performed.

Further, a form may be possible, in which the transmission power information at the base station is transmitted in the control slot group in the Down-link, as in the first embodiment of the present invention, however, each terminal measures the reception signal power of each frequency channel instead of the RSSI and reports to the base station this together with the interference power. In this case, the reception signal power of each frequency channel is averaged at each base station and after the propagation loss in the propagation channel is calculated at the base station from the difference between the transmission power of the control information transmitted from the base station and the average of the reception power found before, the transmission power required for the Down-link transmission to each terminal is calculated from the propagation loss, as in the first embodiment of the present invention, and grouping based on the transmission power of each terminal is performed.

Alternatively, a form may also be possible, in which the frequency channel to be allocated to the terminal is determined first at the base station, and after the propagation loss (the propagation loss that has taken into consideration the fading of the channel to be allocated) is calculated from the difference between the transmission power of the control information transmitted from the base station and the reception power of the frequency channel to be allocated to the terminal, the transmission power required for the Down-link transmission to the terminal is calculated based on the propagation loss and grouping is performed based on the result.

As described above, in the form in which the reception signal power of each frequency channel measured at the terminal is reported to the base station via the Up-link, the amount of information in the Up-link increases and the efficiency of the Up-link decreases more or less. However, the base station grasps the reception signal power for each frequency channel at each terminal, and thereby, it is made possible to carry out the allocation of frequency channel capable of obtaining the most excellent reception power for each terminal among the frequency channels that produce a difference in the reception power due to the influence of fading when the frequency channel is allocated to the terminal of each group after the allocation of time channel to the group, and the efficiency in the Down-link increases.

In addition, by performing grouping that has taken fading into consideration, it is possible to limit the transmission power for each group to a certain range also when the transmission power is so controlled that the reception power of all of the terminals is constant, and it is made possible to reduce the amount of variation in interference affecting the adjacent cells even in a situation in which the allocation to the terminal is changed.

Further, unlike the first embodiment of the present invention, a form may be possible, in which information indicative of the transmission power of the control information is not included in the control slot group of the Down-link. In this case, it follows that the RSSI of the received control information or the reception signal power of each frequency channel is measured at the terminal and this is reported to the base station together with the interference power via the Up-link. At this time, the reception signal power of each frequency channel is may be averaged or a form may also be possible in which it is not averaged and the information corresponding to the number of frequency channels is reported. By employing such a form, it is possible to eliminate the control information in the Down-link.

When any one of the forms described above is used, the period of report of the measurement result of the reception signal power and the interference power at the terminal to the base station by the Up-link may be for each frame or may be at arbitrarily fixed intervals.

In addition, as described above, the transmission timing of the control slot group in the Down-link may be common to all of the cells or may be different from cell to cell (FIG. 4). Here, if the transmission timing of the control slot group in the Down-link is made common to all of the cells as shown in the first embodiment of the present invention, the Down-link control slot group is transmitted with the transmission power that can be received even by a terminal situated at the cell edge, and therefore, there may the case where the control information of the adjacent cells interferes with each other at the terminal situated near the cell edge. When such a problem arises, by making the transmission timing of the control slot group in the Down-link differ from cell to cell, the situation can be avoided, in which the control information transmitted with the transmission power (the maximum transmission power that can be transmitted) that reaches the cell edge interferes with each other.

Further, when the allocation of slot according to the present invention is carried out, in the time channel to which the control information is allocated in the Down-link in the adjacent cell, high interference power is measured, and therefore, it follows that the terminal group with low transmission power of the Down-link within the cell of its own is allocated dynamically to the same time channel. Due to this, it is also made possible to avoid the situation in which the control information and the user data interfere with each other between cells.

Figure 15:
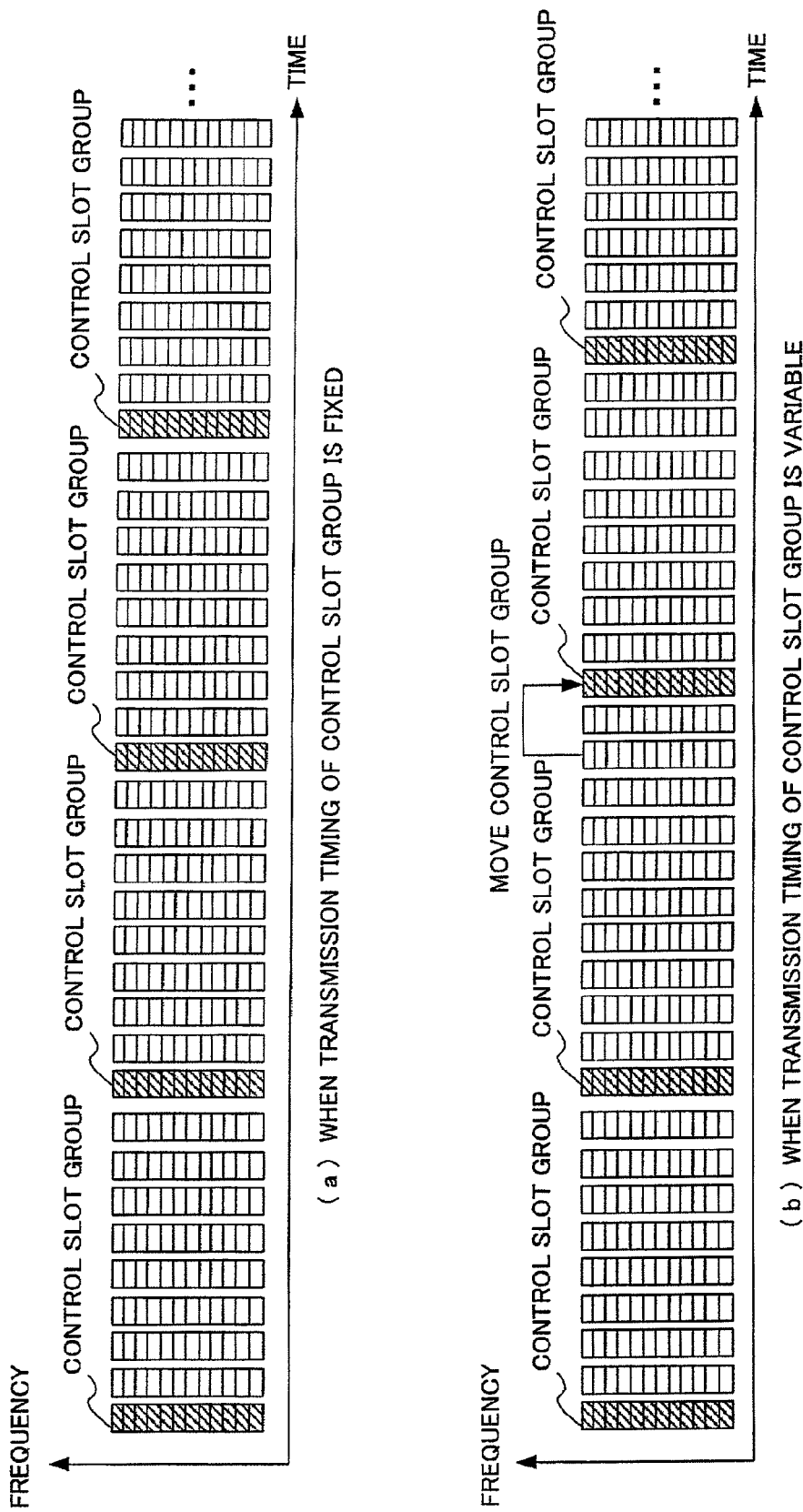
FIG. 15(a) is a diagram showing the case where the transmission timing of the control slot group is fixed and FIG. 15(b) is a diagram showing the case where the transmission timing of the control slot group is variable.

As described above, by making the transmission timing of the control slot group in the Down-link differ from cell to cell, it is possible to avoid the situation in which the control information transmitted with the transmission power that reaches the cell edge interferes with each other and by allocating the terminal with low transmission power to the time channel to which the control information is transmitted in the adjacent cell, it is also possible to avoid the interference between the control information and the user data, however, there may be the case where trouble occurs at the base station in the adjacent cell for some cause and a signal having very high transmission power is transmitted in the adjacent cell in the time channel for transmitting the control information in the Down-link. In such a case, because the control information is affected by the interference having high transmission power, many terminals in the cell are disabled from communication. As shown in FIG. 15, as a countermeasure to such a problem, a form (FIG. 15(b)) may be employed, in which flexibility is given so that the transmission timing is changed adaptively in accordance with the interference of the adjacent cell, instead of a form (FIG. 15(a)) in which the control slot group in the Down-link is transmitted with a predetermined timing at all times.

This is a control in which that the interference power is measured at the same time as the reception of the control information in the Down-link (it may also be possible to measure the SINR or detect a control information error) and when interference having transmission power exceeding a certain threshold value is observed (also when the control information is erroneous successively etc.), the control slot group is moved to the time channel with the lowest interference power among the vacant time channels. When there is no vacant time channel, the communication with the terminal allocated to the time channel with the lowest interference power is disconnected (aborted) and the control slot group is moved to the vacant time channel.

By employing such a form, the communication of some terminals is disconnected forcedly, however, in the situation in which the control information cannot be received correctly due to the influence of interference, the communication of many terminals in the cell is disconnected, and therefore, by employing the above-described form, it is possible to maintain the communication performed by many terminals in the cell. At this time, a form may be possible in which notice to the effect that the control slot group is moved is notified to the terminal in the frame immediately before the control slot group is moved, or a form may be possible in which such control is not executed but the terminal side is caused to have a mechanism to detect the control slot group over the entire the next frame when the control slot group cannot be received at the terminal any longer.

Next, another form relating to the update timing of the allocation of slot in accordance with the change in the surrounding environment is shown. In the first embodiment of the first invention, after the allocation of slot, each terminal performs communication by occupying the allocated slot for an arbitrarily fixed period of time and when the allocation to a certain time channel is changed to a terminal group different from the previous frame, a terminal group that requires the transmission power close to that of the terminal group to which the time channel has been allocated in the previous frame is allocated if possible.

In other words, after the terminal group is once allocated to a certain time channel, the allocation is not changed if possible, or even when changed, the allocation is carried out to the terminal group that requires nearly the same transmission power. This is because a situation can be thought in which when the terminal group to be allocated to the time channel is changed frequently, the interference observed in the adjacent cell changes frequently and therefore interference between adjacent cells occurs and the receive performance are deteriorated.

In addition, this is because also when the allocation is changed to a terminal group that requires transmission power (in particular, transmission power extremely higher compared to the previous frame) largely different from the transmission power required to the terminal group having been allocated in the previous frame, the performance are deteriorated due to the drastic change in the interference observed in the adjacent cell. However, it can be thought that excellent performance can be obtained by employing a form in which the allocation of slot is updated in the following case.

In general, since the terminal moves also during communication, the distance from the base station changes because of the movement and there may be the case where transmission power different from that of the group to which the terminal has belonged up to now is required. As described above, a form may be possible, in which the allocation of slot is updated when the transmission power required for the Down-link has changed accompanying the movement of the terminal, that is, the group configuration has changed from the previous one. In addition, a form may also be possible, in which the slot allocation is updated when a situation has been encountered etc., in which interference having high transmission power is observed at the terminal (or when the reception SINR is deteriorated, or when data is erroneous successively) during the communication in the allocated slot.

In these cases, a review of the allocation of slot may be done for all of the terminals in all of the groups or a form may be possible, in which a review of the allocation of slot only to the terminal encountered with a situation in which the transmission power required for the Down-link changes etc. is done. However, also when such a review of the allocation of slot is done, it is desirable to allocate the terminal group or the terminal that requires transmission power as close as possible to that of the terminal group allocated in the previous frame to the relevant time channel (slot) in order to suppress a drastic change in the interference affecting the adjacent cells.

In addition, in a situation in which the number of cells, such as an isolated cell, is small, it may also be possible to perform the update of the allocation of slot frequently or to allocate a terminal group with transmission power largely different from that of the terminal group having been allocated in the previous frame to the relevant time channel.

Next, another form relating to the case where a plurality of time channels are allocated to one group to which a plurality of terminals that require the same transmission power in the Down-link belong is shown. In the first embodiment of the present invention, the number of necessary frequency channels per frame for the Down-link transmission is calculated for each terminal in the group to which the time channel has been allocated and the vacant frequency channels are allocated to the terminals in accordance with the number of necessary frequency channels required of each terminal. Then, when the number of vacant frequency channels of the time channel is less than the number of necessary frequency channels, allocation is carried out to another time channel and allocation is carried out so that a plurality of terminals that require the same transmission power are accommodated in one time channel if possible.

Separately from such a form, another form may be possible, in which the maximum number of time channels that can be allocated to the terminal group that requires transmission power of certain level in the Down-link is determined in advance and thereby it is possible for the base station to carry out allocation freely in a range that does not exceed the maximum number of time channels. At this time, instead of determining in advance the maximum number of time channels that can be allocated to the terminal group that requires transmission power of certain level, it may also be possible to cause the base station to have a mechanism for adjusting the maximum number of time channels in accordance with the number of adjacent cells by measuring the interference that comes from the adjacent cells and estimating the number of adjacent cells.

Figure 16:
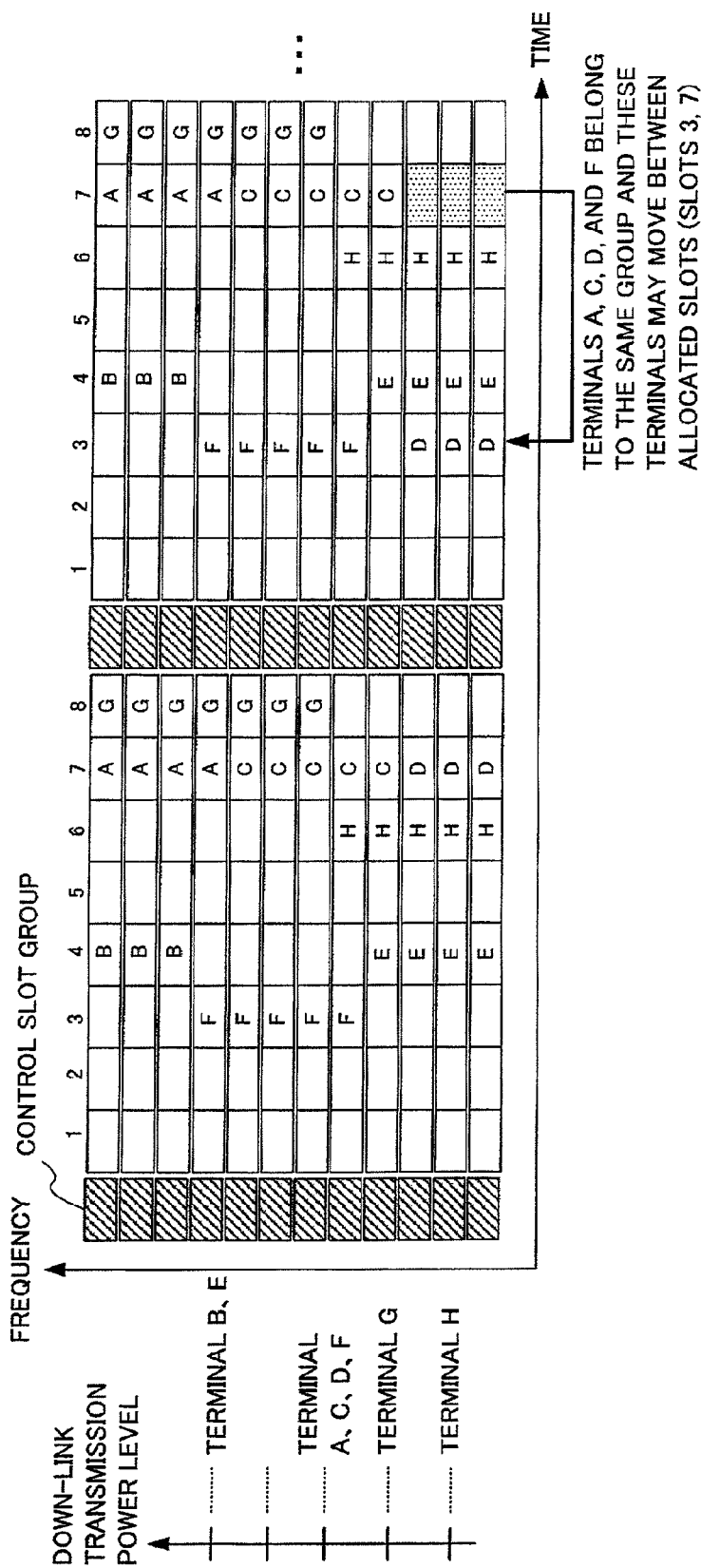
FIG. 16 is a diagram showing an example in which the transmission power required for Down-link and the allocation of slot in the same group are changed.
Figure 17:
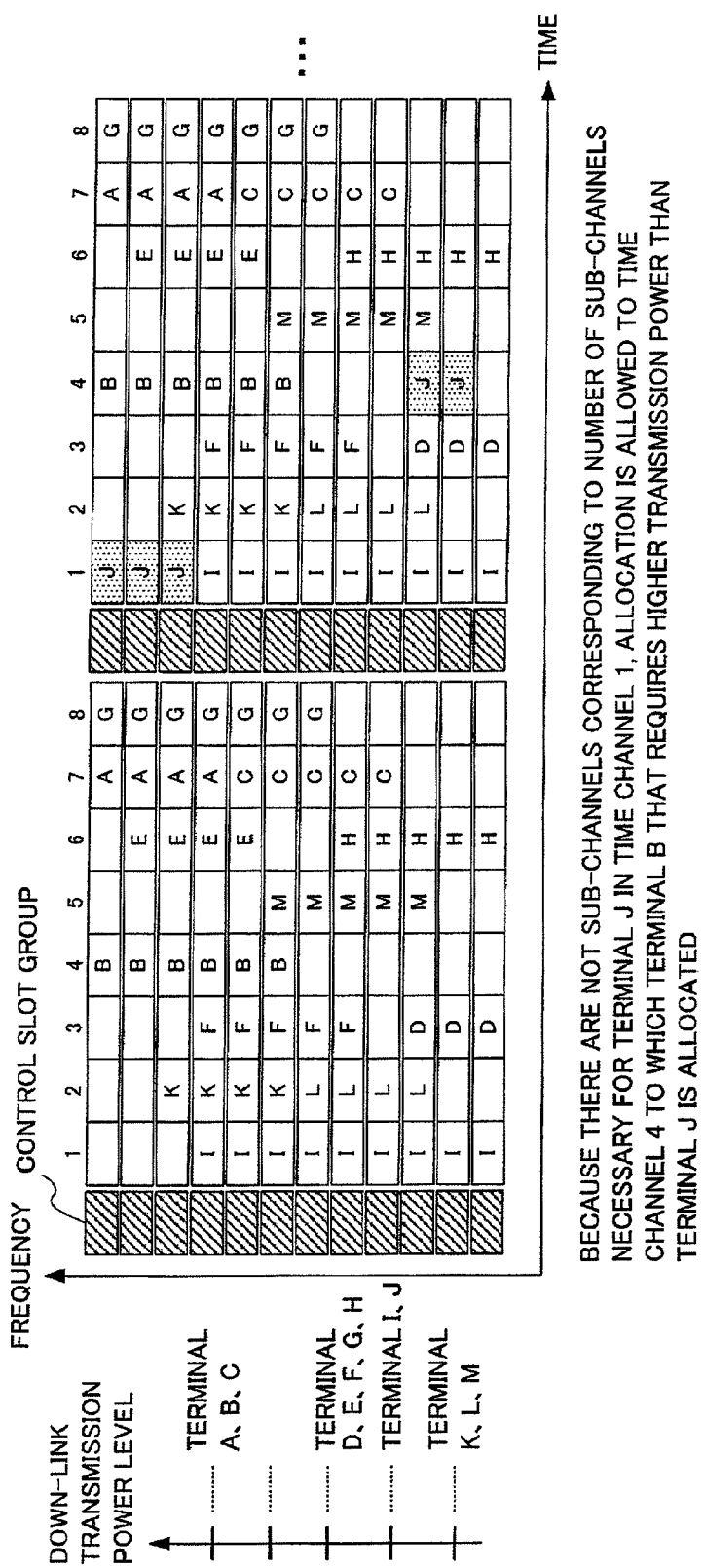
FIG. 17 is a diagram showing the transmission power required for Down-link and an example in which the allocation to the time channel to which another group has been allocated is allowed.

In addition, a form may also be possible, in which when a plurality of time channels are allocated to one group, the terminal belonging to the group may use any time channel among the plurality of the allocated time channels and the change of the allocation to a vacant frequency channel of a different time channel is allowed during communication. An example of such a case is shown in FIG. 16. As shown in FIG.

16, the terminals A, C, and D are allocated to the time channel 7 and the terminal F is allocated to the time channel 3, however, these terminals belong to the same group and therefore it may be allowed to reallocate the terminal D to the time channel 3 to which the terminal F is allocated. This is because the transmission power required for the Down-link to the terminal D and the terminal F is the same level and even if the time channel to which the terminal D is allocated is changed, the influence imposed on the adjacent cells does not change.

Similarly, a form may also be possible, in which it is allowed that one terminal is allocated to another time channel to which another terminal belonging to the same group is allocated, in addition to the time channel to which it has been allocated up to now (that is, a plurality of time channels are allocated to one terminal).

In addition, a form may also be possible, in which when there is a vacant frequency channel in the time channel to which the terminal group that require high transmission power is allocated, it is allowed that the terminal that requires low transmission power is allocated to the vacant frequency channel of the time channel to which the terminal group that requires high transmission power is allocated (FIG. 7).

This is because the possibility is high that the terminal group that requires low transmission power is allocated to the time channel to which the terminal group that requires high transmission power is allocated in the adjacent cell, and even if a terminal that requires low transmission power is allocated to the vacant frequency channel of the time channel, no interference between adjacent cells will occur.

On the contrary, however, in a situation in which there exist vacant frequency channels in the time channel to which a terminal group that requires low transmission power is allocated and the number of frequency channels to be allocated to a terminal that requires high transmission power is short, if a terminal that requires high transmission power is allocated to the frequency channel of the time channel to which a terminal group that requires low transmission power is allocated, it follows that a large interference occurs between adjacent cells. Because of this, a form may also be possible, in which instead of allocating a terminal that requires high transmission power to the vacant frequency channel in the time channel to which a terminal group that requires low transmission power is allocated as it is, after the modulation scheme of the terminal that requires high transmission power is changed to a lower one and at the same time, the transmission power is also set to a lower value, the allocation to the vacant frequency channel of the time channel to which the terminal group that requires low transmission power is allocated is allowed. By employing such a form, even when the allocation to the time channel to which a different terminal group is allocated is carried out, it is possible to suppress interference from affecting the adjacent cells by setting transmission power to a lower value while avoiding the occurrence of an error caused by the setting of the transmission power to the terminal to a lower value.

Next, another form is shown, in which a vacant time channel is reserved for a terminal that requires high transmission power. As described above, in the first embodiment of the present invention, the time channel of which the interference power measured at the terminal of the group is the smallest is allocated among the remaining time channels not allocated in the order from the terminal group that requires the highest transmission power in the terminal groups having made a request for communication. However, when the transmission power required by a group having made a request for communication is not so high, the time channel the interference power of which is the smallest is allocated to the group and after that, even if a request for communication is made at a terminal situated near the cell edge and a group that requires very high transmission power is formed, it is not possible to allocate the time channel the interference power of which is the smallest to a new group that requires high transmission power.

As a measure for this problem, a form may also be possible, in which at least one vacant time channel is reserved for a terminal group that requires high transmission power. On the contrary, a form may also be possible, in which at least one vacant time channel is reserved for a terminal group that requires low transmission power. Further, a form may also be possible, in which the number of time channels in which interference equal to or greater than a certain value is observed (interfered time channels) is counted and the resultant number of time channels, which is obtained by subtracting the number of interfered time channels from the total number of time channels, is reserved for a terminal group that requires high transmission power.

As described above, even in a situation in which a terminal that requires high (low) transmission power is not in communication, it is made possible to deal with the case where a terminal makes a request for communication in the future by reserving a vacant time channel for a terminal group that requires high (low) transmission power. However, just reserving a vacant time channel is not an effective measure because there is the possibility that a terminal group that requires high transmission power in the adjacent cell is allocated to the reserved time channel (this hardly leads to a problem when the terminal group requires low transmission power).

Consequently, a form may also be possible, in which a time channel for a terminal group that requires high transmission power is reserved by transmitting dummy data with the same transmission power as that when the control information is transmitted in the time channel the interference power of which has been determined to be the minimum by another terminal even when there exists no terminal group that requires high transmission power. In addition, it may also be possible to determine in advance a time channel to be reserved to which dummy data is thus transmitted so as to differ from cell to cell.

In a situation in which there exists a terminal that requires high transmission power and a time channel is allocated, however, the number of allocated frequency channels is small and most of the frequency channels of the time channel in question are vacant, a form may also be possible, in which dummy data is transmitted in a vacant frequency channel of the time channel in question. Such a form has the advantage that it is made easier to detect a time channel with high interference power at each terminal in the adjacent cells.

Further, as an optional form in which dummy data is transmitted in order to reserve a time channel for a terminal group that requires high transmission power, it may also be possible to implement a function of terminating transmission of dummy data in order to reduce interference affecting the adjacent cells in a situation in which there is not at all any terminal in the cell.

In addition, in a mobile communication system, transmission and reception of control information (base station ID and terminal ID) is performed generally between a base station and a terminal even for a terminal that has not made a request for communication and the base station has a grasp as to which terminal exists in the cell of its own and the terminal has a grasp as to which cell the terminal belongs to. At the base station in a system in which such transmission and reception of control information is performed between a base station and a terminal, it is possible to estimate how much transmission power is required for the Down-link when the data communication with the terminal is started. Consequently, as an optional form in which dummy data is transmitted for the purpose of reserving a time channel, it may also be possible to implement a function of transmitting dummy data when there exists a terminal in the cell, which is estimated to require high transmission power when data communication is started, and of terminating transmission of dummy data when there exists no terminal in the cell, which is estimated to require high transmission power when data communication is started.

As described above, it is possible to reserve a time channel for a terminal that requires high transmission power in the cell of its own while taking into consideration the prevention of interference affecting the adjacent cells by estimating transmission power required for the Down-link at the base station and performing transmission of dummy data based on the estimation result.

Second Embodiment

Figure 18:
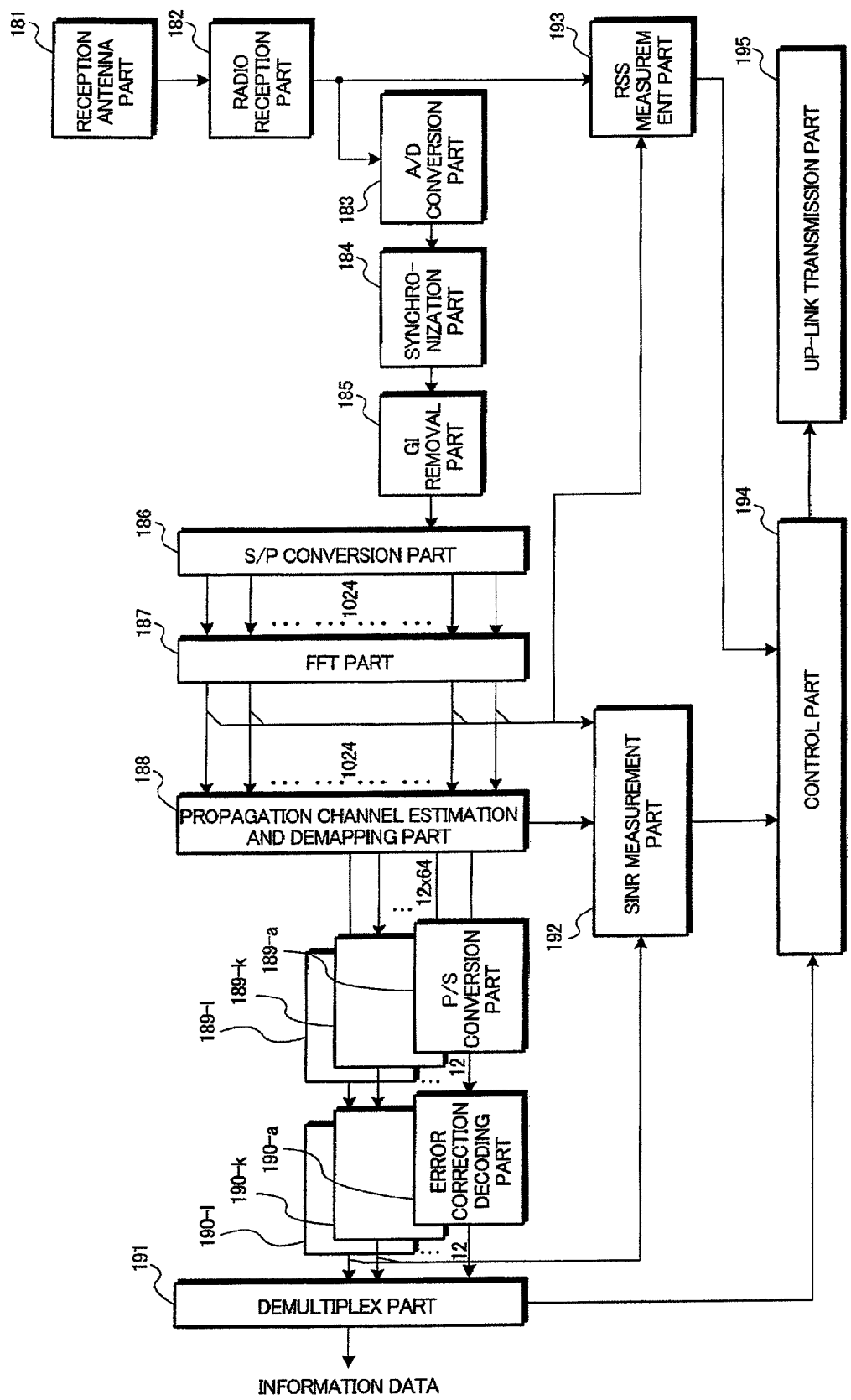
FIG. 18 is a diagram showing a general configuration of a mobile station apparatus.

A second embodiment is explained below. FIG. 18 is a block diagram showing the general configuration of a terminal device (mobile station apparatus). Reference number 181 denotes a reception antenna part, 182 denotes a radio reception part, 183 denotes an analog/digital conversion part (A/D conversion part), 184 denotes a synchronization part for synchronization of the OFDM symbols, 185 denotes a guard interval (GI) removal part, 186 denotes a serial/parallel (S/P) conversion part, 187 denotes an FFT part, 188 denotes a propagation channel estimation and demapping part, 189-*a* to 189-*l* denotes parallel/serial conversion parts (P/S conversion parts), 190-*a* to 190-*l* denote error correction decoding parts, 191 denotes a demultiplex part, 192 denotes an SINR measurement part, 193 denotes an RSS measurement part, 194 denotes a control part, and 195 denotes an Up-link transmission part.

The frequency of the radio wave received by the antenna part 181 is converted into a frequency band in which A/D conversion is possible in the radio reception part 182. The data converted into a digital signal in the A/D conversion part 183 is synchronized with the OFDM symbols in the synchronization part 184 and the guard interval is removed in the guard interval removal part 185. After that, the data is paralleled into 1,024 data in the S/P conversion part 186. After that, in the FFT part 187, the FFT of 1,024 points is performed and the demodulation of the sub-carrier of the 768 waves is performed in the propagation channel estimation and demapping part 188. The necessary data is serialized in the P/S conversion parts 189-*a* to 189-*l*, error correction is performed in the error correction decoding parts 190-*a* to 190-*l*, and it is divided into the data of each channel in the demultiplex part 191.

The SINR measurement part 192 is a block that measures the SINR for each sub-channel, which will be described below, using the output of the FFT part 187, the output of the propagation channel estimation and demapping part 188, and the output of the error correction decoding parts 190-*a* to 190-*l*. The RSS measurement part 193 is a block that measures the RSSI for each sub-channel from the output of the radio reception part 182 and the output of the FFT part 187. The control part 194 takes out necessary information from the reception data output from the RSS measurement part 193, the SINR measurement part 192, and the demultiplex part 191 and sends the Up-link data to the Up-link transmission part 195 in accordance with the procedure explained below. The Up-link transmission part 195 transmits the Up-link data sent from the control part 194 to the base station.

Figure 19:
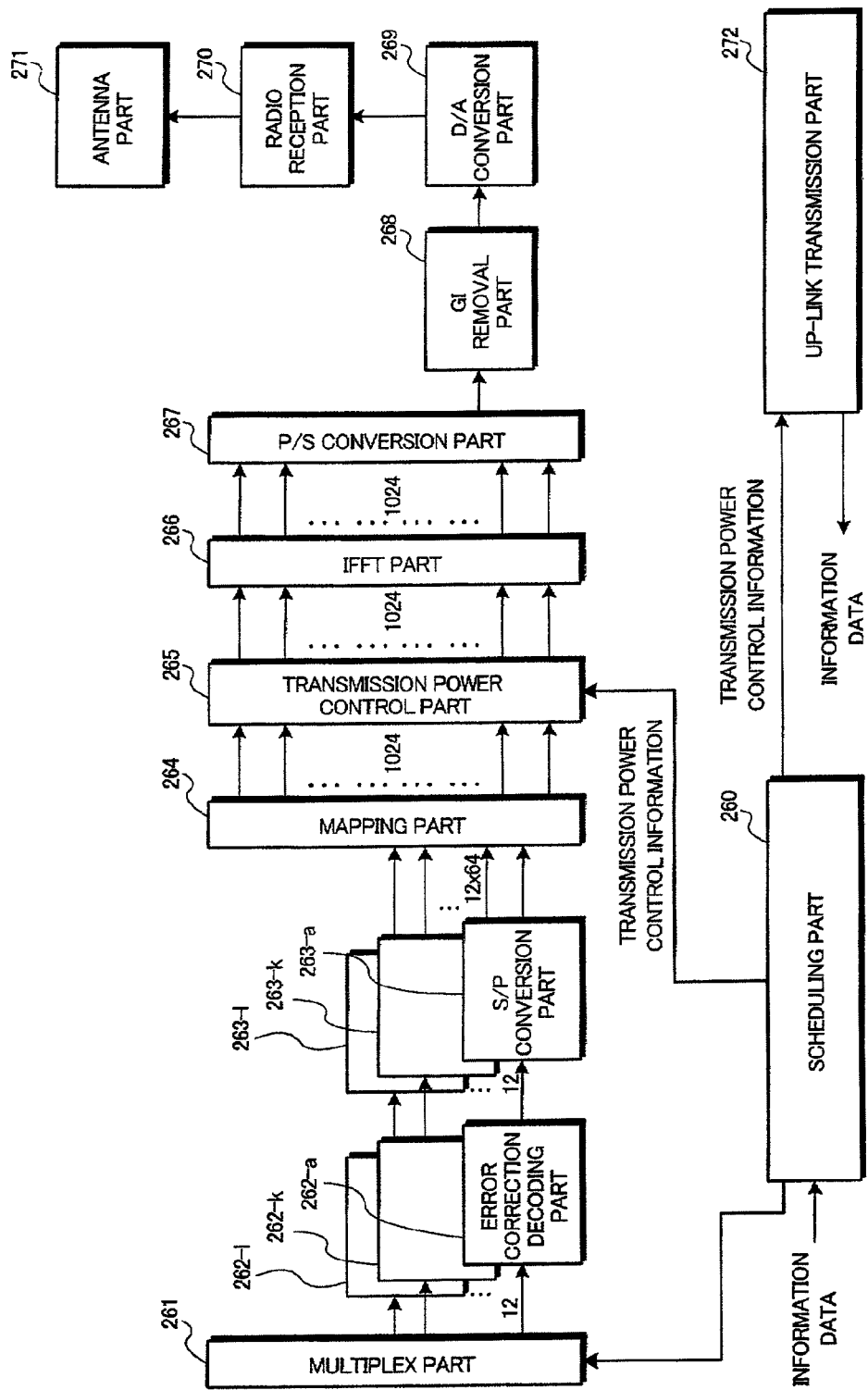
FIG. 19 is a diagram showing a general configuration of a base station apparatus.

FIG. 19 is a block diagram showing the general configuration of the base station (base station apparatus). Reference number 260 denotes a scheduling part, 261 denotes a multiplex part, 262-*a* to 262-*l* denote error correction encoding parts, 263-*a* to 263-*l* denote serial/parallel conversion parts (S/P conversion parts), 264 denotes a mapping part, 265 denotes a transmission power control part, 266 denotes an IFFT part, 267 denotes a parallel/serial (P/S) conversion part, 268 denotes a guard interval insertion part, 269 denotes a digital/analog conversion part (D/A conversion part), 270 denotes a radio reception part, 271 denotes an antenna, and 272 denotes an Up-link reception part.

Which sub-carrier and which time slot are used to transmit the information data is determined in the scheduling part 260 and the data is converted into a data stream in accordance with the result thereof. The converted data is subjected to error correction encoding in the error correction encoding parts 262-*a* to 262-*l*. For example, when the number of sub-carriers is 768 waves and the modulation scheme of each carrier is the QPSK, the data is converted into the data in 768 lines in units of two bits. After that, the data corresponding to the amount required for the modulation of each carrier is converted in the S/P conversion parts 263-*a* to 263-*l* and each carrier is subjected to modulation in the mapping part 264.

After that, by the direction from the scheduling part 260, the amplitude of each carrier is adjusted in the transmission power control part 265. After that, the IFFT is performed in the IFFT part 266. In the following explanation, the number of points of the IFFT is assumed to be 1,024 in order to generate the OFDM signal of 768 waves. Then, after the data is converted into serial data in the P/S conversion part 267, a guard interval is inserted in the guard interval insertion part 268. The guard interval is inserted in order to reduce interference between symbols when the OFDM signal is received.

Then, after converted into the analog signal in the D/A conversion part 269, the data is converted into a frequency to be transmitted in the radio reception part 270 and then, the data is transmitted from the antenna part 271. By means of the transmission power control information and the interference information received by the Up-link reception part 272, the scheduling part 260 executes the control properly. The method of the control is explained below in detail.

Figure 20:
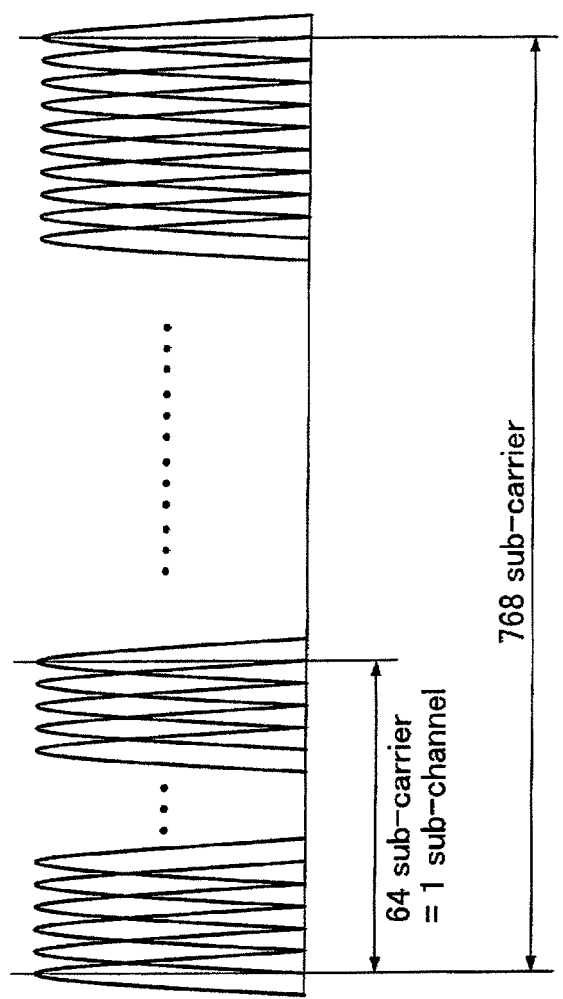
FIG. 20 is a diagram showing an example of a sub-channel used in Down-link.

The radio wave form used in the second embodiment is the OFDM. It is assumed that the number of sub-carriers used in the Down-link is 768 and 64 of sub-carriers are integrated into a sub-channel. Consequently, it follows that the Down-link consists of 12 sub-channels. This is shown in FIG. 20. In the second embodiment, it is supposed that the number of sub-channels that can be used is greater than the total number of adjacent cells.

Figure 21:
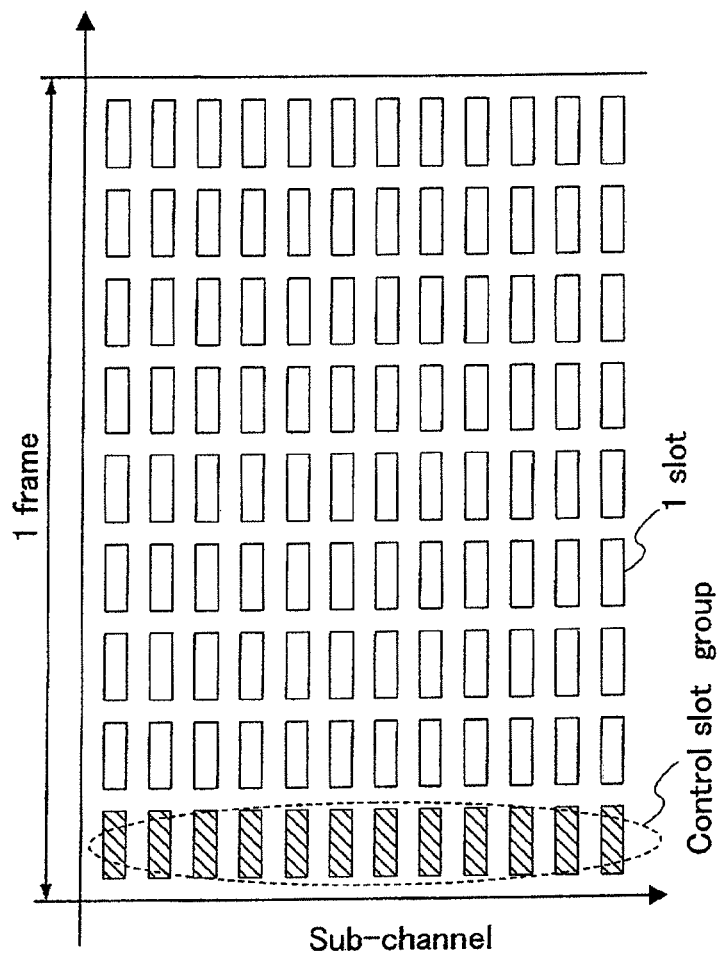
FIG. 21 is diagram showing a configuration example of a frame.

The MAC has a fixed length frame configuration. In the frame, nine slots are accommodated. This is shown in FIG. 21. Among these slots, the front slot of the frame in each sub-channel is a control slot, in which information about the control slot itself and the following slots is stored. The control slots of all of the sub-channels are together referred to as a control slot group.

Figure 22:
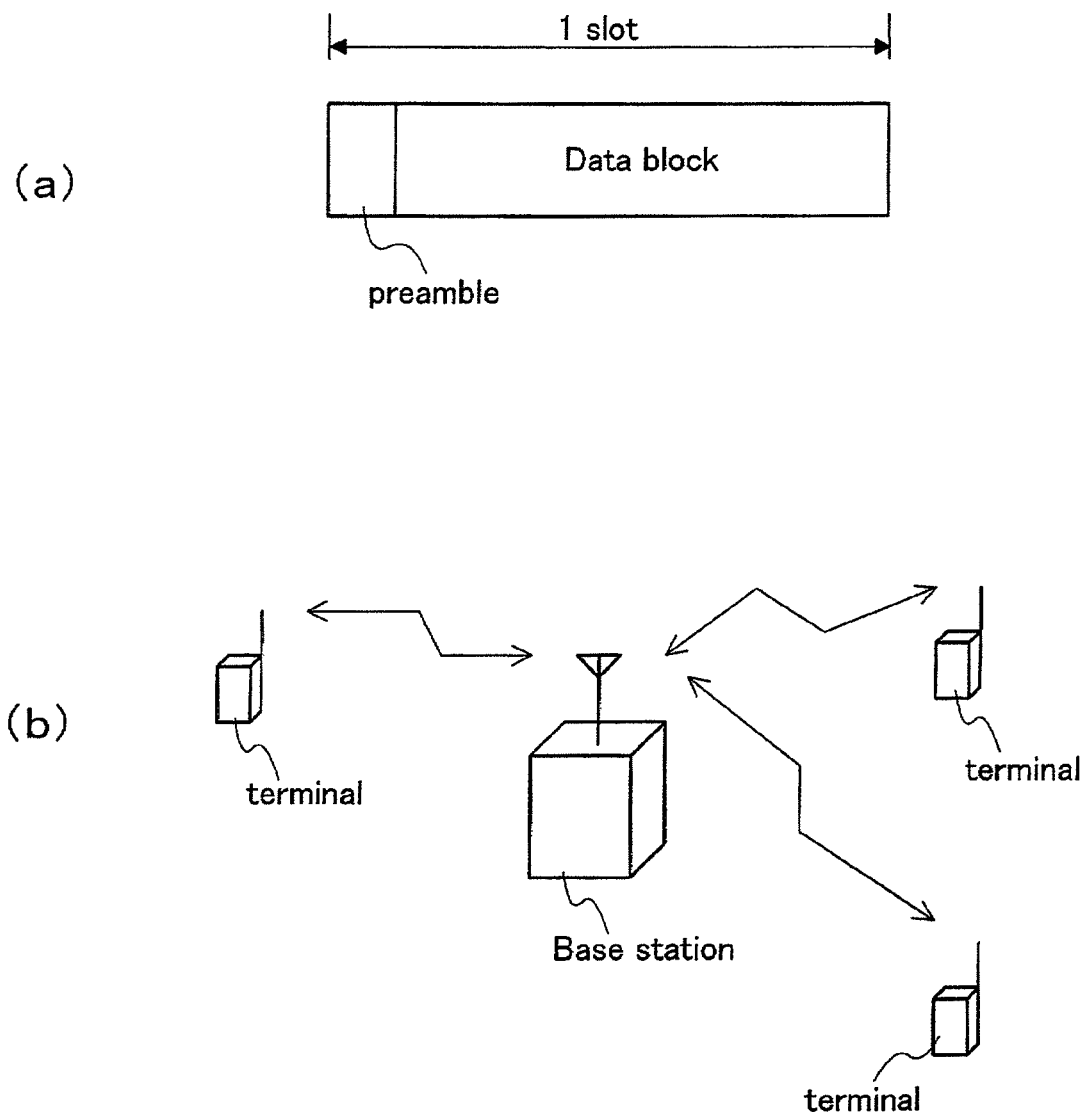
FIG. 22(a) is a diagram showing the configuration of a slot and FIG. 22(b) is a diagram showing the outline of the topology of a network.

To the front of each slot, a preamble is added and it is possible for the reception terminal to perform demodulation of the following data blocks by receiving the preamble and adjusting the demodulation timing. The structure of the slot is shown in FIG. 22(*a*). The Up-link is not referred to in particular in the second embodiment. Various techniques can be utilized. Irrespective whether single carrier or multi carrier, and whether or not a frame configuration is employed, various techniques can be utilized.

The topology of the network is a star type with the base station as its center. The communication data of all of the Down-links are transmitted directly from the base station to the terminal. The outline of the topology is shown in FIG. 22(b).

Figure 23:
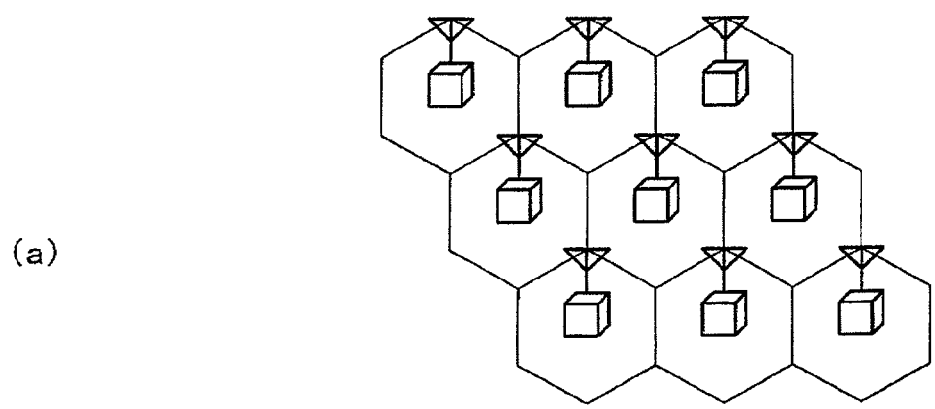
FIG. 23(a) is a diagram showing the outline of a cell arrangement and FIG. 23(b) is a diagram showing a structure example of a control slot.

It is assumed that the cells are arranged in a hexagonal form. The base station is situated in the center and the base stations are arranged equidistantly. It is assumed that the total number of adjacent cells is six at the maximum. The outline of the cell arrangement is shown in FIG. 23(a). The base station always transmits the control slot to all of the sub-channels.

The following information is stored in the control slot. That is, the network ID, the transmission power information of the control slot of the sub-channel, and the terminal ID allocated to each of the following slots. An example of the structure of the control slot is shown in FIG. 23(b).

It is assumed that the control slot is sent by a modulation scheme with higher reliability than that by which the data slot is sent. This is because information of highly great importance is transmitted by the control slot although the amount of information is small. Although the modulation scheme is not specified in particular, in the second embodiment, it is assumed that the BPSK is used for the control slot and the QPSK is used for the data slot.

The mobile terminal (mobile station apparatus) demodulates the control slot transmitted by the base station and makes a request for connection by sending the terminal ID of its own to the base station of the obtained network ID using the Up-link. When allowing the connection, the base station having received the request for connection transmits the terminal ID in the slot allocation information in the control slot and orders the terminal to use the slot in the Down-link.

The base station executes transmission power control in order to keep the transmission power of the radio wave to be transmitted to the mobile terminal to a minimum. Because of this, the mobile terminal receives and demodulates the control slot group of all of the sub-channels once in at least n (n: natural number) frames and calculates the propagation loss of the sub-channel from the information of the transmission power of each channel shown in each control slot. At the same time, the mobile terminal calculates the SINR of each sub-channel. The mobile terminal transmits the calculated propagation loss and the SINR of each sub-channel to the base station via the Up-link.

The base station obtains the propagation loss and the SINR from all of the connected mobile terminals via the Up-link. After that, the base station calculates transmission power required for the transmission of the Down-link to each terminal from the propagation loss of each terminal and classifies the terminals connected to the base station into four levels (just an example, not limited to four levels). One group is defined as a group in which data is transmitted from the base station with transmission power with which demodulation is possible even at the cell boundary and two groups are defined as a group in which data is transmitted from the base station with transmission power that sufficiently attenuates at the cell boundary and that does not affects the adjacent cells.

Figure 24:
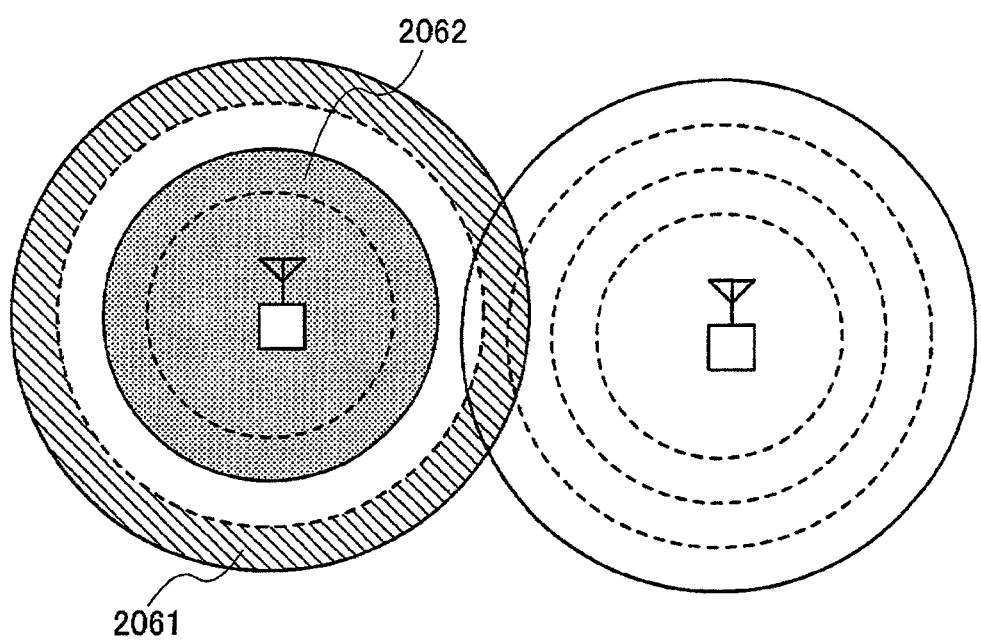
FIG. 24 is a diagram showing the relationship between the cell boundary and the transmission power group.

The other group is defined as a group in which data is transmitted from the base station with transmission power with which demodulation may not be possible at the cell boundary, however, which may affect the adjacent cells. It is not required for each group to include a terminal as a result of classification. The relationship between the cell boundary and the transmission power groups is shown in FIG. 24. In FIG. 24, the area in which demodulation is possible even at the cell boundary is denoted by 2061 and the area that does not affect the adjacent cells is denoted by 2062.

Figure 25:
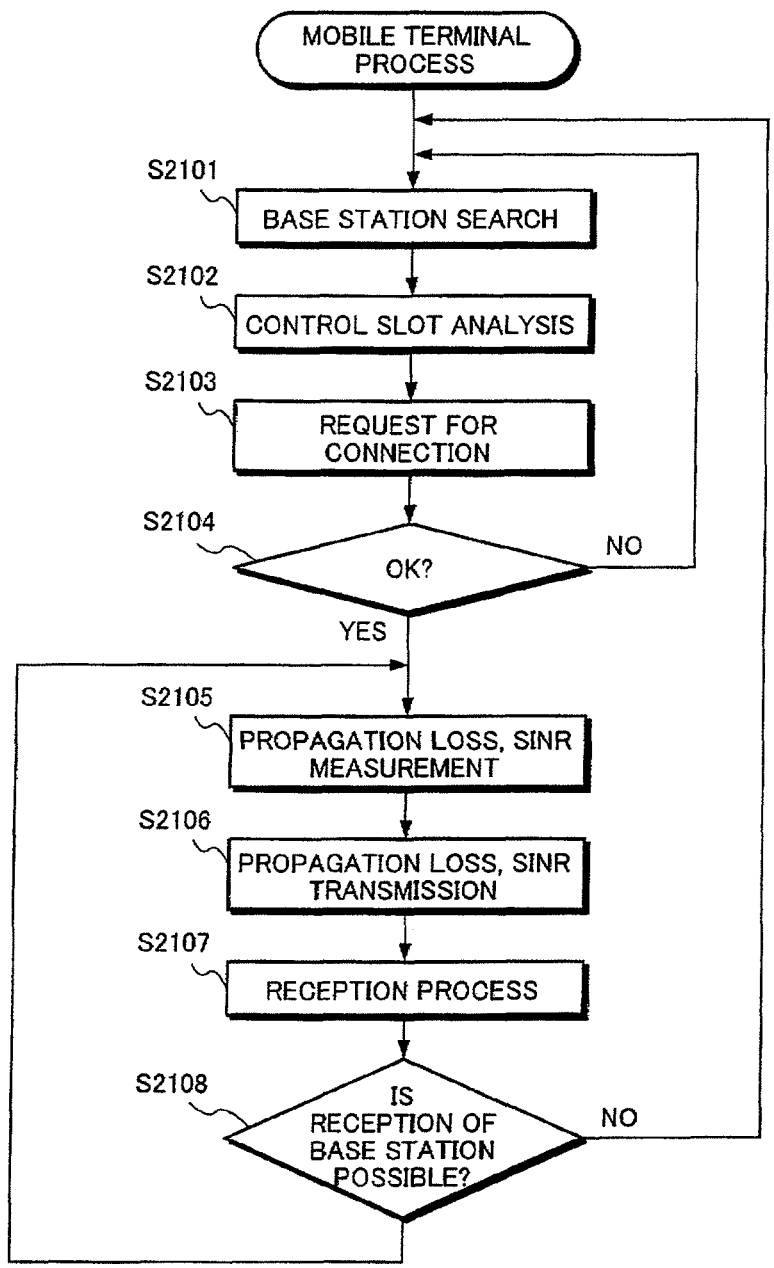
FIG. 25 is a flow chart showing the outline of the operation procedure of a mobile station apparatus.

The outline of the operation procedure of the terminal is shown along with a flow chart. The flow chart is shown in FIG. 25. First, in step S2101, the terminal receives the signals of the Down-link and searches for a base station that transmits the control slot group. After a base station that transmits the control slot group is found, the terminal demodulates the control slot group in step S2102 and analyzes the contents of the control slot group. In this step, the terminal acquires the base station ID of the base station. Next, in step S2103, the terminal transmits the acquired base station ID to the base station via an Up-link means and makes a request for connection.

After step S2103, in step S2104, the terminal receives the control slot group several times and determines whether or not the connection is successful depending whether or not the ID of the terminal of its own is transmitted in the control slot. If the connection has failed, the procedure returns to step S2101 for searching for a base station and when it has succeeded, the procedure proceeds to step S2105 for measurement of the propagation loss and the SINR. In step S2105 for measurement of the propagation loss and the SINR, the terminal receives the Down-link signals from the base station and measures the propagation loss from the base station to the terminal for each sub-channel and the SINR (Signal to Interference and Noise power of Ratio) at the position of the terminal. Various measurement methods can be thought. Although the detailed description is omitted because they do not related to the contents of the second embodiment, the methods includes a method in which the propagation loss is found from the RSSI (Receive Signal Strength Indicator) of the control slot and the transmission power in the control slot and the SINR is found from the difference between the received waveform of the control slot and the ideal waveform estimated from the demodulated data by demodulating the control slot etc.

In the next step S2106, which is step for transmitting the propagation loss and the SINR, the propagation loss and the SINR found in the previous step S2105 are transmitted to the base station via the Up-link means.

In the reception process in the next step S2107, the Down-link data for the terminal of its own is received in accordance with the contents of the received control slot. In the next step S2108, the terminal determines whether or not the reception of signals from base station is possible depending on whether the next control slot can be received and when reception is possible, the procedure returns to step S2105, which is step for analyzing the propagation loss and the RSSI and when reception is not possible, the procedure returns to step S2101, which is step for searching for a base station. By repeating these steps, the communication of the Down-link can be maintained.

Next, the outline of the operation procedure of the base station is shown along with a flow chart. First, in step S2001, the base station performs a process to allocate a sub-channel that can be used to each transmission power group. Next, in step S2002, the base station checks whether or not there exists a terminal that has newly made a request for connection and performs the connection process in step S2003 when there exists any. Irrespective of the execution in step S2003, the base station performs the transmission power control in step S2004. Then, the base station performs the determination of a transmission sub-channel in step S2005 and the procedure returns to step S2001 when the result is NG and the base station allocates a sub-channel that can be used. When the result is OK, the procedure proceeds to step S2007 for the allocation of transmission data slot.

After the step for the allocation of transmission data slot, the base station performs Down-link transmission in accordance with the allocation in step S2008 and the procedure returns to step S2002 in which whether or not there exists a terminal that has newly made a request for connection is checked.

At the time of the transmission of the Down-link, the transmission power for each sub-channel is controlled in accordance with the transmission power of the transmission power group allocated to the sub-channel. The control slot is also transmitted in accordance with this control by displaying the transmission power in the transmission power information in the control slot. However, although explanation will be given later, there may be the case where the data of a terminal of another transmission power group is allocated to the data slot part. In this case, only the slot shall be transmitted with the transmission power defined by the transmission power group.

Figure 27:
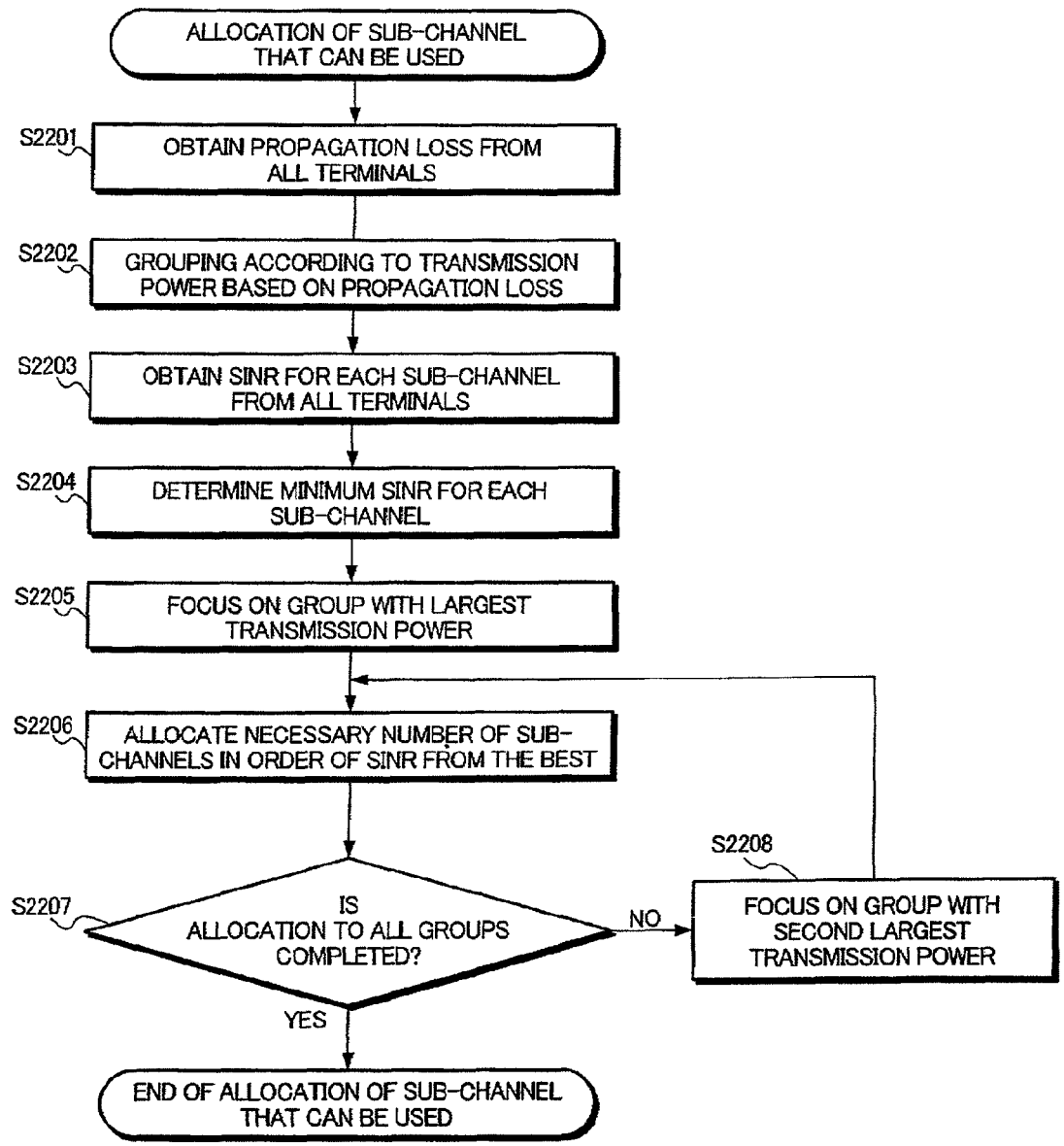
FIG. 27 is a flow chart showing the operation of the allocation of sub-channel that can be used.

Next, the detail part of the operation procedure of the base station is explained along with a flow chart. The contents of the process of the step for the allocation of sub-channel that can be used are explained. The flow chart is shown in FIG. 27. First, in step S2201, the most recent propagation losses sent from all of the terminals via the Up-link means are totalized. In the next step S2202, the transmission power for each terminal is classified into four levels according to the totalized propagation loss and all of the terminals are classified into groups of transmission power. In the next step S2203, the most recent SINR for each sub-channel sent from all of the terminals via the Up-link means is totalized. In the next step S2204, the minimum value of the SINR is found for each sub-channel. In the next and subsequent steps, the allocation of sub-channel that can be used is carried out actually for each transmission power group.

In the second embodiment, it is assumed that one, four, four, and three sub-channels are allocated to each group in the descending order of the transmission power. Only one sub-channel is allocated to the group with the strongest transmission power, and this is because the value of the number of the total number of sub-channels/(total number of adjacent cells+ 1) is prevented from being exceeded.

In step S2205, first, the group with the largest transmission power is focused on and allocation is carried out for the group focused on in step S2206. The predetermined number of sub-channels is allocated in the order from the sub-channels with the largest minimum SINR among the sub-channels, that is, in the order from the sub-channels with the smallest interference. In step S2207, whether or not there remains a group to which a sub-channel that can be used has not been allocated yet is checked and if there remains any, a group with the second strongest transmission power is focused on in step S2208 and step S2206, which is step for the allocation of sub-channel, is repeated and when there remains no group to which the sub-channel that can be used has not been allocated yet, the allocation of sub-channel that can be used is terminated.

Figure 28:
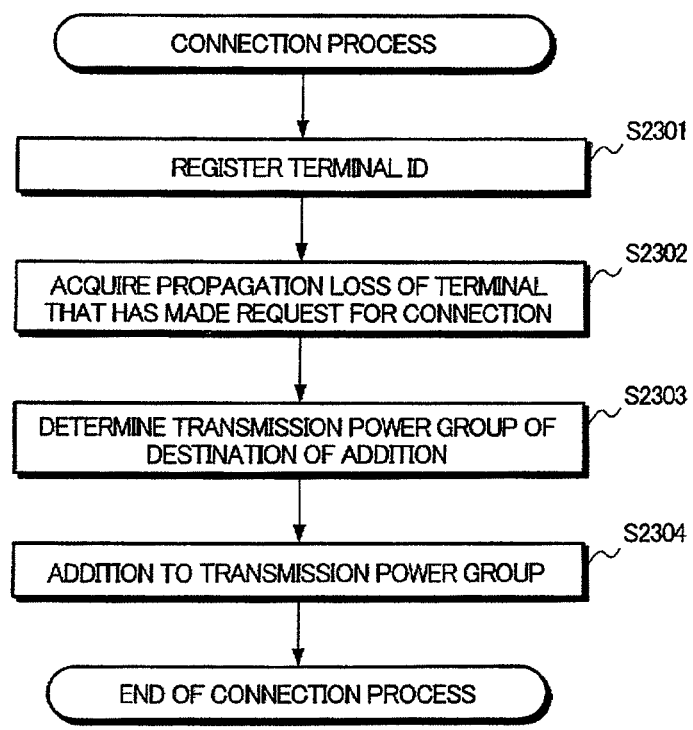
FIG. 28 is a flow chart showing a connection process.

Next, the detailed procedure of the step of connection process is explained. A flow chart is shown in FIG. 28. First, in step S2301, the terminal ID sent by a terminal via the Up-link means is registered as one that can be used at the base station. At this time, only once, the slot for the terminal is allocated for the sub-channel allocated to the group with the maximum transmission power. Due to this, the terminal knows that the request for connection has been accepted. In addition, during the allocation of the slot, the slot may be embedded with dummy data. In the next step S2302, the base station waits until the terminal sends the propagation loss and the procedure proceeds to the next step. In the next step S2303, to which transmission power group this terminal should belong is calculated from the sent propagation loss. In the next step S2304, this terminal is added to the group, as a result of the calculation, and the step of connection process is terminated.

Figure 29:
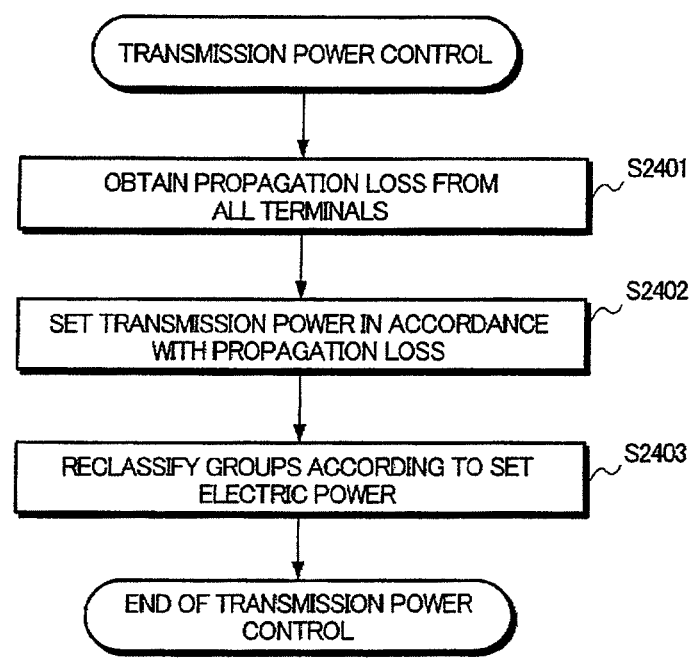
FIG. 29 is a flow chart of transmission power control.

Next, the detailed procedure of the transmission power control step is explained. A flow chart is shown in FIG. 29. First, in step S2401, the most recent propagation losses sent from all of the terminals are totalized. In the next step S2402, the transmission power to each terminal is set to a four-level transmission power based on the propagation loss obtained in the previous step and in the next step S2403, grouping is performed according to the set transmission power. Then, the transmission power control step is terminated.

Figure 30:
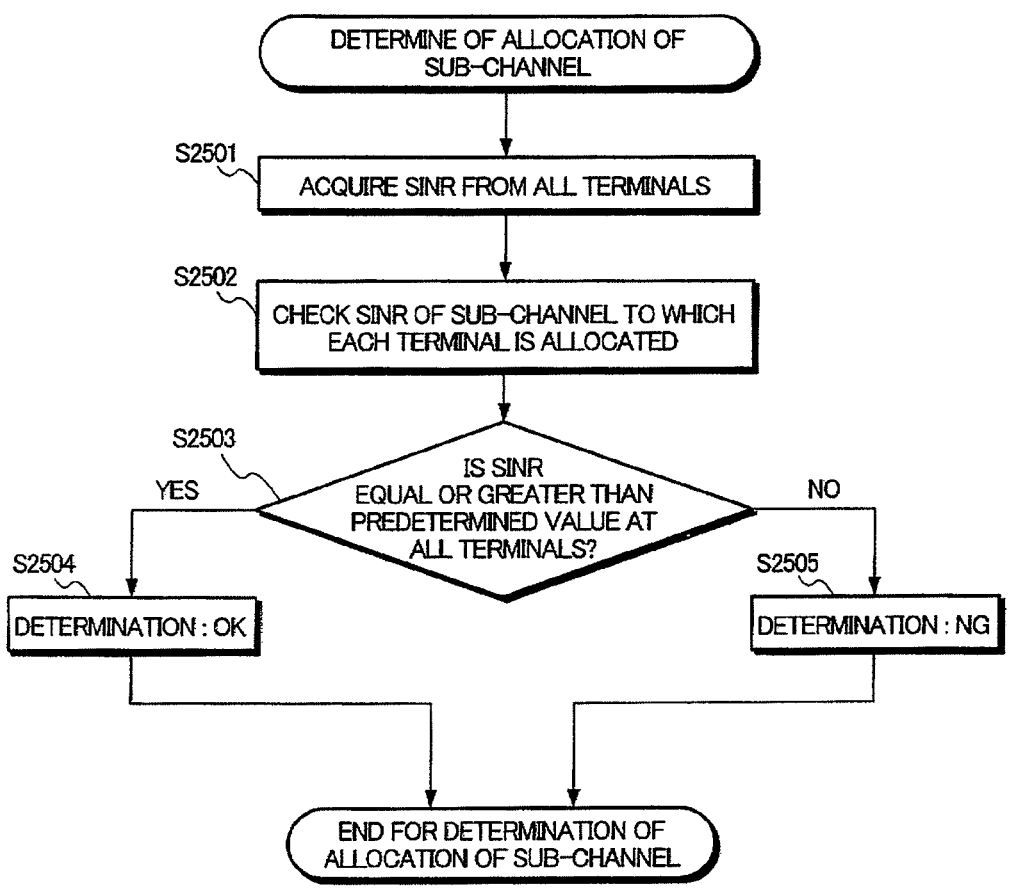
FIG. 30 is a flow chart showing the determination of the allocation of sub-channel.

Next, the detailed procedure of the determination of the allocation of sub-channel is explained. A flow chart is shown in FIG. 30. First, in step S2501, the most recent SINR for each sub-channel sent from all of the terminals is totalized. In the next step S2502, whether or not the SINR of the sub-channel allocated to the terminal satisfies a predetermined value is checked for each terminal. Determination is made in step S2503 and when the SINR satisfies the predetermined value at all of the terminals, OK is issued as the result of determination in step S2504 and when any one of the SINRs does not satisfy the predetermined value, NG is issued as the result of determination in step S2505, and then the step of the determination of the allocation of sub-channel is terminated.

Figure 31:
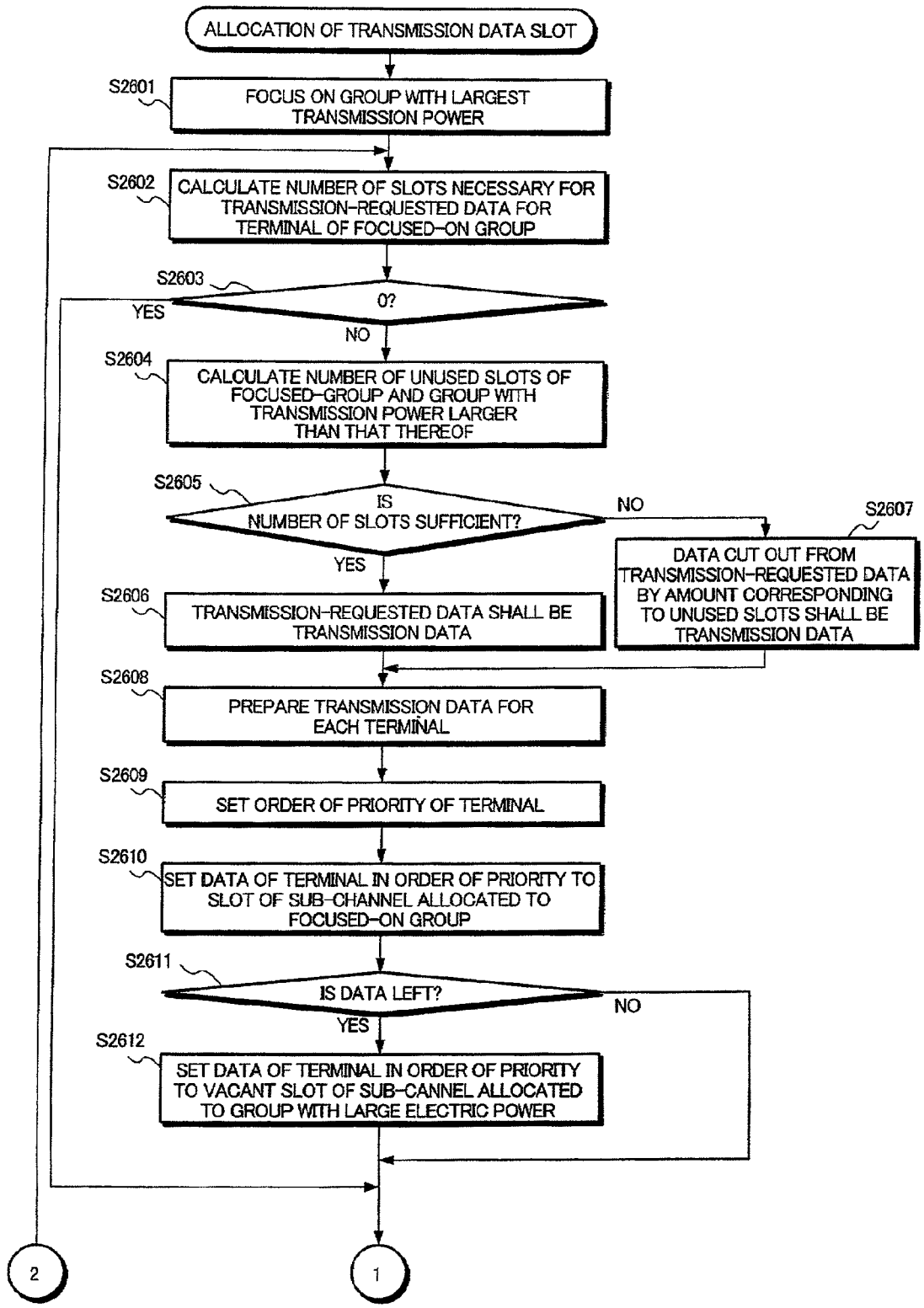
FIG. 31 is a flow chart showing the operation of the allocation of transmission data to slots.
Figure 32:
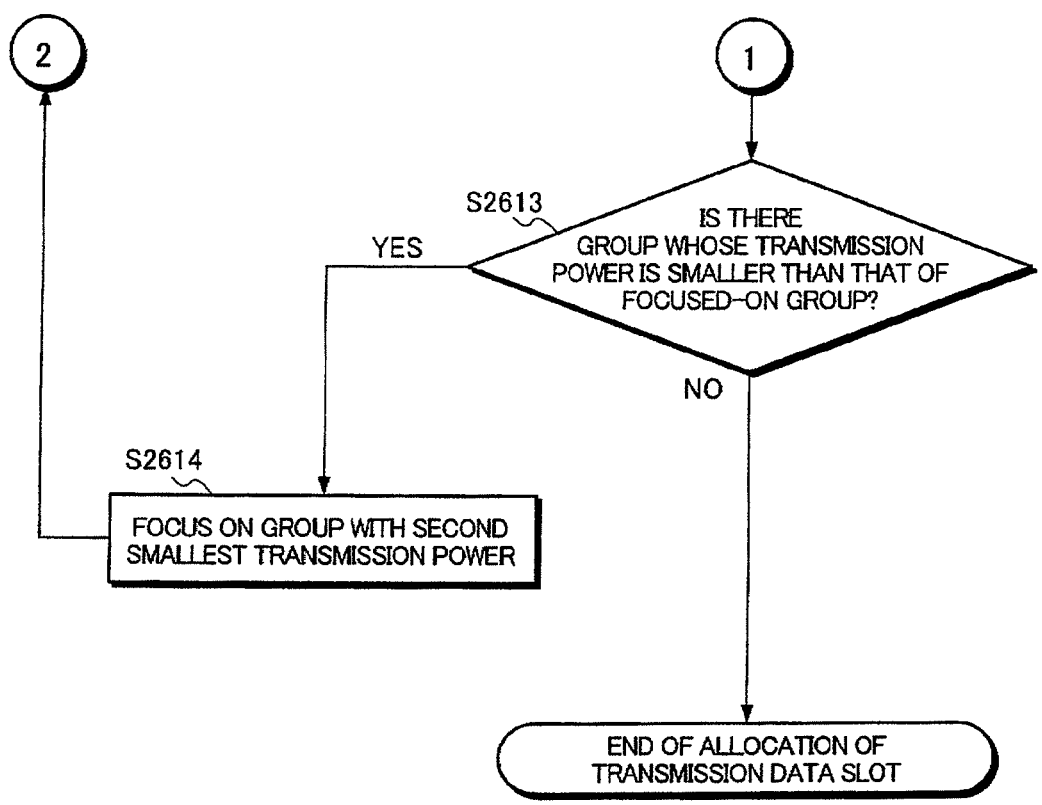
FIG. 32 is a flow chart showing the operation of the allocation of transmission data to slots.

Next, the detailed procedure of the allocation of transmission data slot is explained. A flow chart is shown in FIG. 31 and FIG. 32. First, in step S2601, the group with the largest transmission power is focused on. In the next step S2602, the total amount of data to be transmitted to the terminals included in the focused-on group is checked and how many slots are required for the data is calculated. In step S2603, when there is not data to be transmitted and the number of necessary slots is zero, the procedure proceeds to the determination as to whether or not there is an unevaluated transmission power group in step S2613 and when the number of necessary slots is one or more, the procedure proceeds to the calculation of the number of unused slots in step S2604. In step S2604 of the calculation of the number of unused slots, the total number of vacant slots of the focused-on group and the group to which transmission power larger than that of the focused-on group is allocated is calculated.

In the next step S2605, the number of slots required for transmission is compared with the calculated number of vacant slots and whether or not the number of vacant slots is sufficient is determined. When sufficient, all of the data for which a request for transmission has been made as transmission data is regarded as transmission data in step S2606, and when the number of vacant slots is not sufficient, data corresponding to the number of vacant slots is cut out from the data for which a request for transmission has been made and regarded as transmission data in step S2607. At this time, in order to prevent only the data bound for a specific terminal from being cut out, the data is cut out by the round robin method for all of the terminals in the group. Due to this, the throughput of a specific terminal is prevented from reducing.

In the next step S2608, the prepared transmission data is divided for each terminal. In the next step S2609, the priority of the terminals is determined. The initial value of the process method of the priority shall be the order of the terminal ID and the terminal processed once with the highest priority will be processed with the lowest priority next time, that is, the round robin method shall be used.

By performing this process, it is avoided that only a specific terminal is processed. In the next step S2610, data is allocated to the vacant slots of the sub-channel allocated to the focused-on group in the order of the priority set to the terminals. At this time, when there are two or more sub-channels that can be used, allocation is carried out in the order from the sub-channel with the lowest SINR. When there remains transmission data that is not allocated after the data is allocated to all of the vacant slots of the sub-channel allocated in step S2611, the data is allocated also to the vacant slots of the sub-channel allocated to a group with transmission power larger than that of the focused-on group until all of the transmission data is allocated in step S2612.

In the next step S2613, whether or not there remains a group with transmission power smaller than that of the transmission power group currently focused on is checked, that is, whether or not there remains an unprocessed group is checked, and when there remains any, a group with transmission power second in magnitude to that of the group currently focused on is focused on in step S2614 and then the procedure returns to step S2602 in which the number of slots for the data to be transmitted to the terminals in the group is calculated, and when there remains none, the step of the allocation of transmission data slot is terminated.

Figure 33:
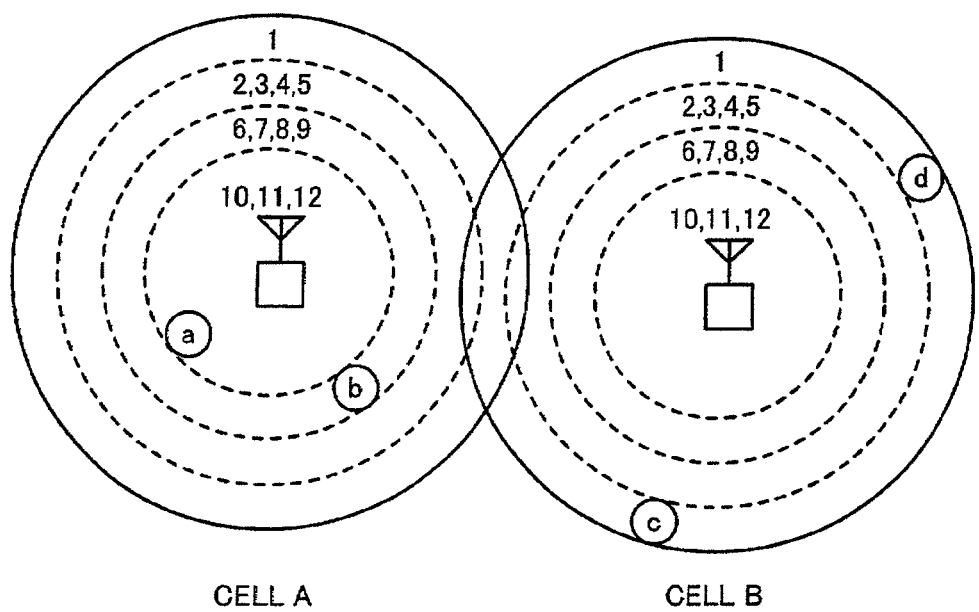
FIG. 33 is a diagram showing the relationship between the cell boundary and the transmission power group.
Figure 34:
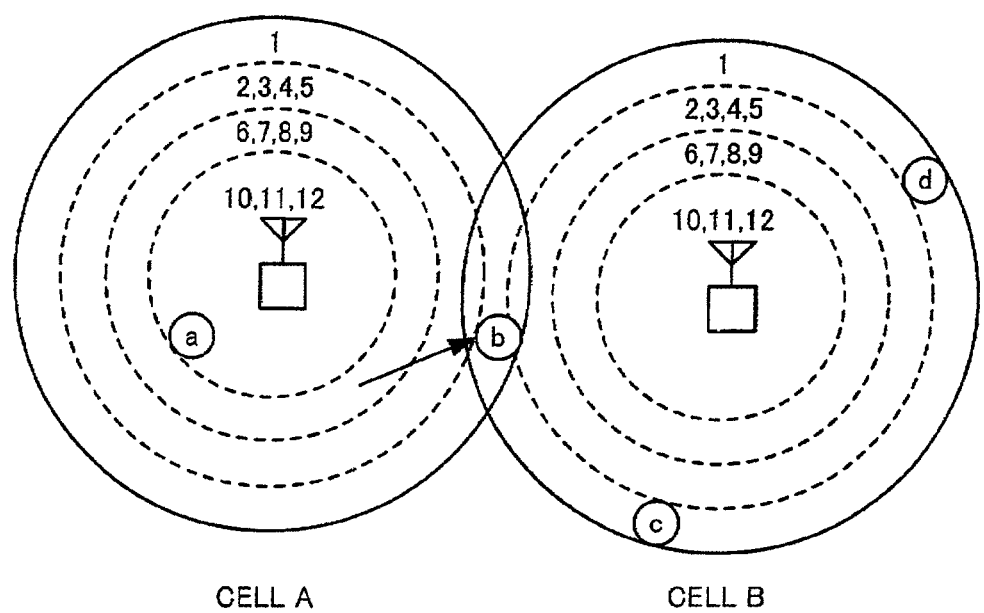
FIG. 34 is a diagram showing the relationship between the cell boundary and the transmission power group.

Next, how interference between cells is avoided when there exist the base station and the terminal group that operate as described above is explained. First, a situation is supposed, in which the allocation of the same sub-channel that can be used is carried out by coincidence in adjacent cells. This situation is shown in FIG. 33. Although this is a special situation, it can occur depending on the position of the terminals in the cells, such as when the terminals in one of the cells are arranged only in the vicinity of the base station etc. Here, a case is considered, where one of the terminals in the vicinity of the base station moves near to the cell boundary. This case is shown in FIG. 34. Here, a terminal b moves near to the position at which both the cells neighbor each other. Since the adjacent cell also arranges the same sub-channel, the SINR of a sub-channel (1) to be allocated newly to the terminal that has moved will deteriorate. The terminal having moved demodulates the control slot and reports the SINR and the propagation loss of all of the sub-channels at the position to which it has moved to the base station via the Up-link.

The base station learns that the classification of the transmission power groups is correct no longer by the fact that the propagation loss sent by the terminal that has moved becomes large. The base station newly reconfigures the transmission power groups and determines, by referring to the SINR sent from the terminals to be added newly to the respective transmission power groups, whether or not the sub-channel that can be used allocated to the transmission power group to which the terminal is newly added can be used without problem.

Figure 35:
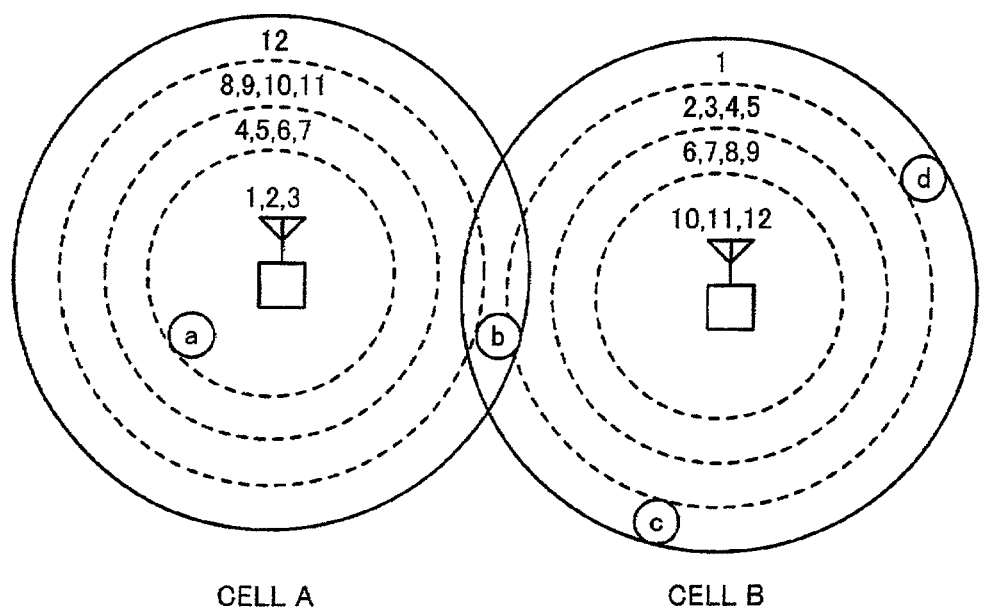
FIG. 35 is a diagram showing the relationship between the cell boundary and the transmission power group.

In this example, since the allocated sub-channel (1) is affected by the adjacent cell, the SINR is below that which can be used and it is determined that the sub-channel cannot be used. In response to this, in the cell A, the reallocation of sub-channel that can be use is carried out. At this time, evaluation is made in the order from the group with the largest transmission power. Since the allocation is carried out based on the SINR evaluated by the terminal b belonging to the group, the sub-channel is selected from among (10, 11, 12) with excellent SINR. Here, (12) is selected. After that, sub-channels with excellent SINR are selected in the descending order of the transmission power of the group and as a result, a sub-channel with poor SINR is allocated to the group with the smallest transmission power. The situation after the allocation is shown in FIG. 35.

Here, the distance of the terminal in the group with small transmission power from the other cell is sufficiently large and in actuality, communication is possible without problem although the evaluation of the SINR is poor more or less. In addition, the transmission power is also small and therefore the signals of the sub-channel used in this group hardly affects the other cell. As a result, wireless interference does not occur between the two cells and therefore the communication between the base station and the terminals is enabled.

The operation is the same also when there are a plurality of cells. Since up to one (total number of sub-channels that can be used/(number of adjacent cells+1)) sub-channel that can be used is allocated to the group with transmission power that can reach the adjacent cell, even if most of sub-channels are affected by all of the adjacent cells, it is unlikely that the system fails because it is no longer possible to allocate transmission power that can reach the adjacent cell in the cell.

Similarly, the adjacent cell is in a state in which it is possible to prepare one or more sub-channels ((total number of sub-channels−number of adjacent cells−1)≧1) that does not affect the cell boundary, and therefore, it is made possible to attain a sub-channel arrangement without interference in the cell even when affected by all of the adjacent cells.

Even when the result of rearrangement is inconvenient to other cells, if rearrangement of sub-channels is carried out each time, the ratio of the number of sub-channels that can reach the adjacent cells is set equal to or less than a certain value, and therefore, the sub-channels that reach the adjacent cells become dispersed gradually in the entire cell and the operation without interference is enabled in the entire system.

Figure 36:
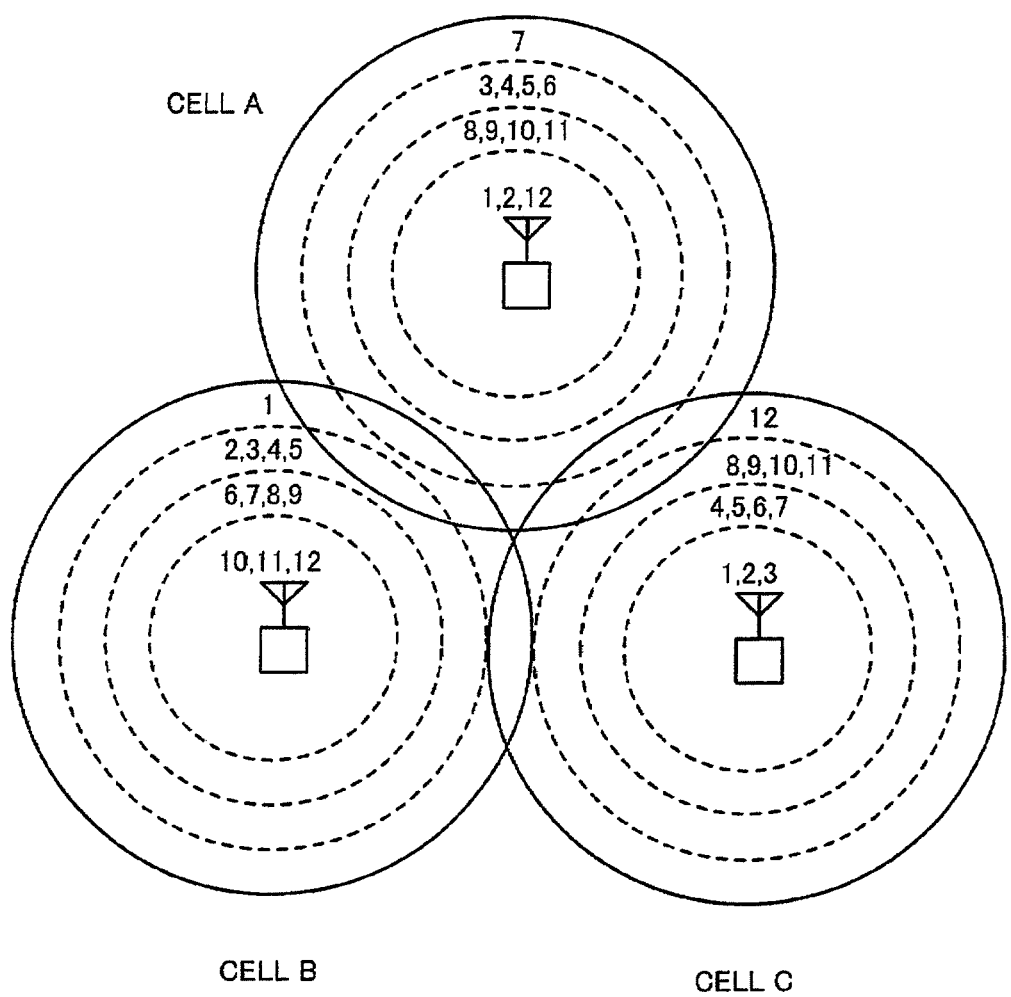
FIG. 36 is a diagram showing the relationship between the cell boundary and the transmission power group.
Figure 37:
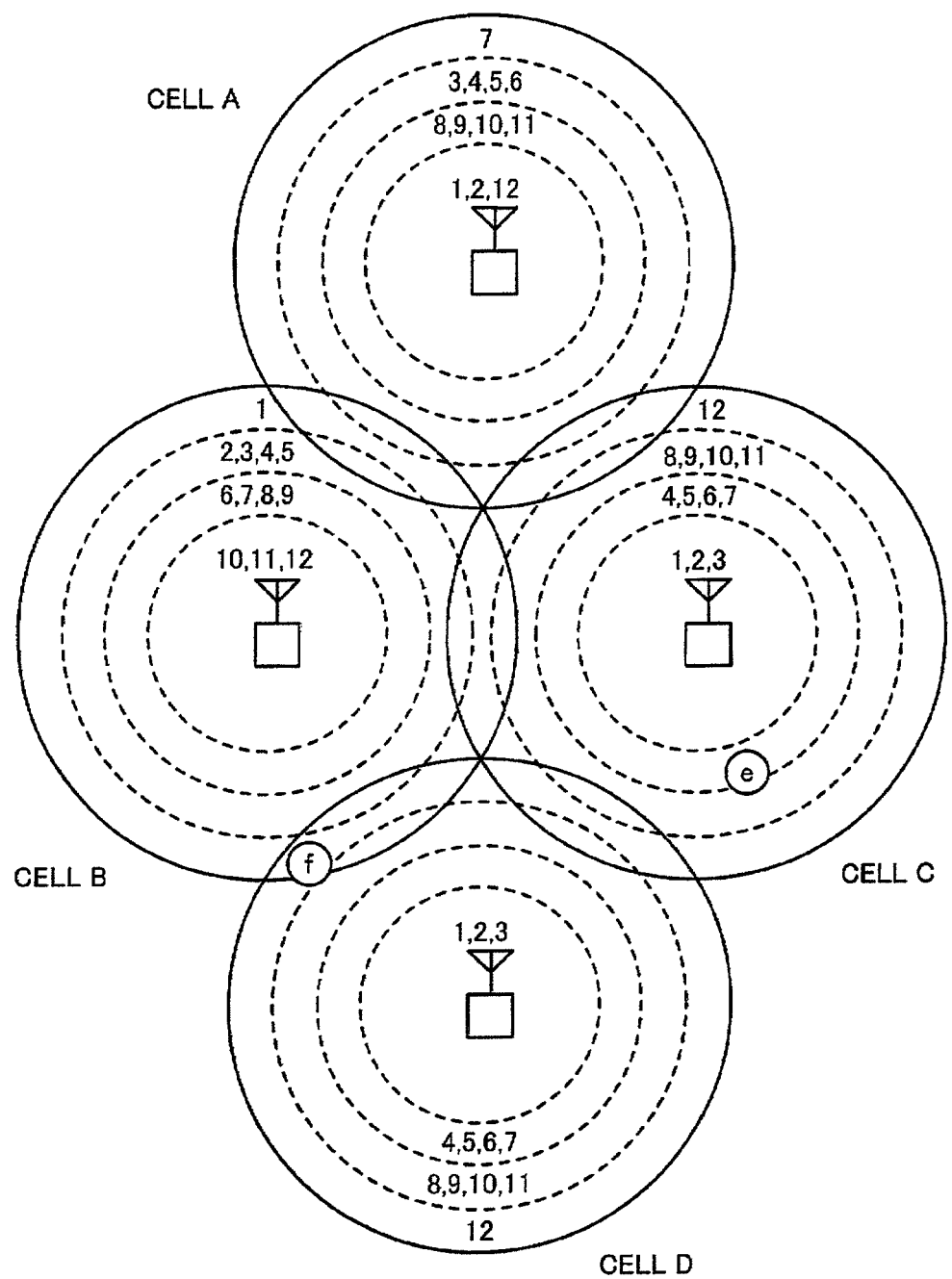
FIG. 37 is a diagram showing the relationship between the cell boundary and the transmission power group.

Next, the operation when a cell is added newly is explained. First, a situation is supposed, in which three cells (cell A, cell B, cell C) are arranged and arrangement of sub-channels has already been carried out properly between the cells. This state is shown in FIG. 36. Next, a situation is supposed, in which a cell D is arranged in such a manner as to be adjacent to the cell B and cell C. This state is shown in FIG. 37. Here, a situation is supposed, in which the cell C and the cell D have carried out the same sub-channel arrangement due to the influence of the arrangement of terminals after the arrangement. As shown in FIG. 37, it can be thought that such a situation occurs when the arrangement state of terminals in the cell D is a state in which a terminal, such as a terminal f, is not affected by the cell C and only the influence from the cell B can be detected.

Figure 38:
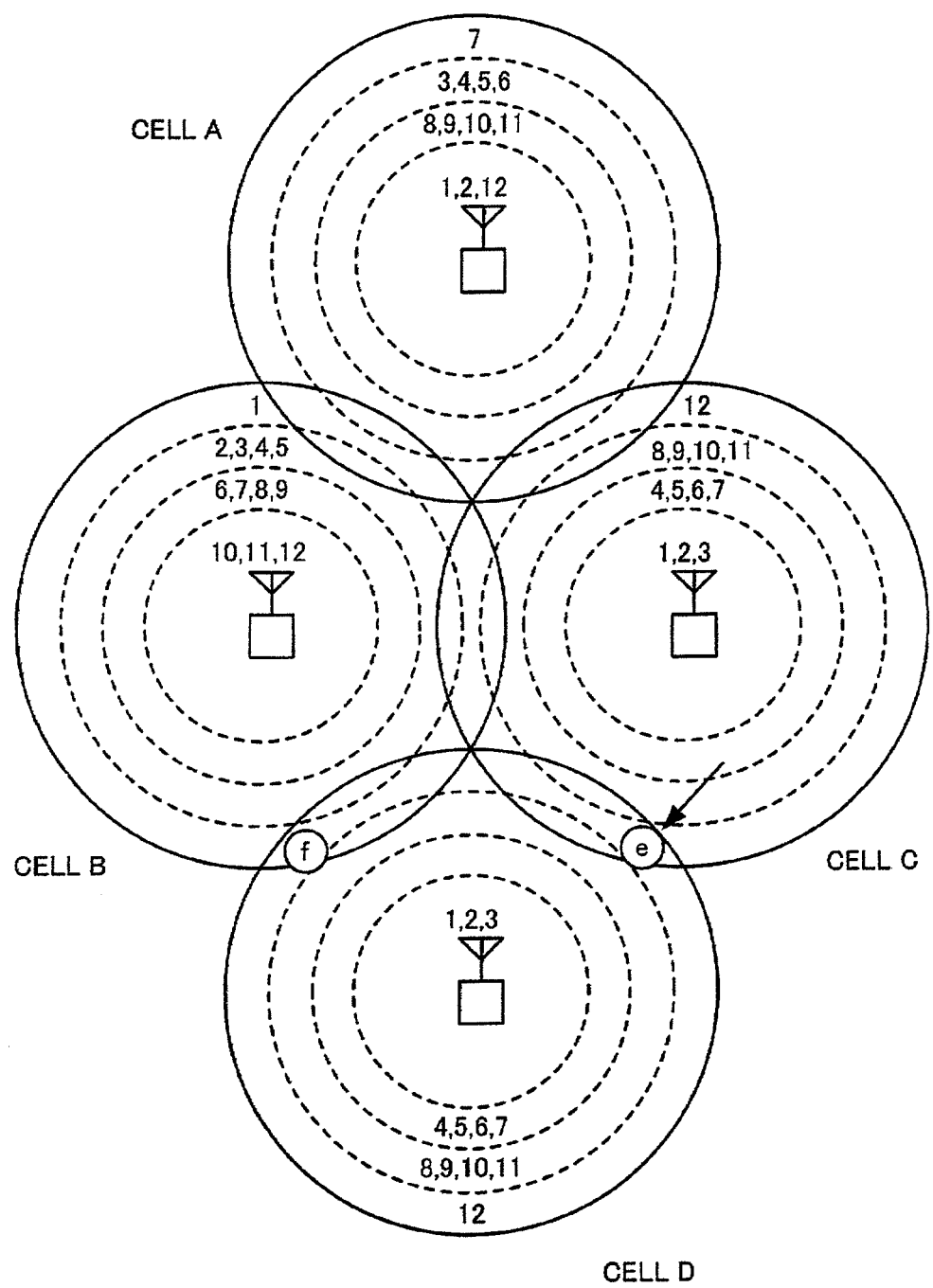
FIG. 38 is a diagram showing the relationship between the cell boundary and the transmission power group.
Figure 39:
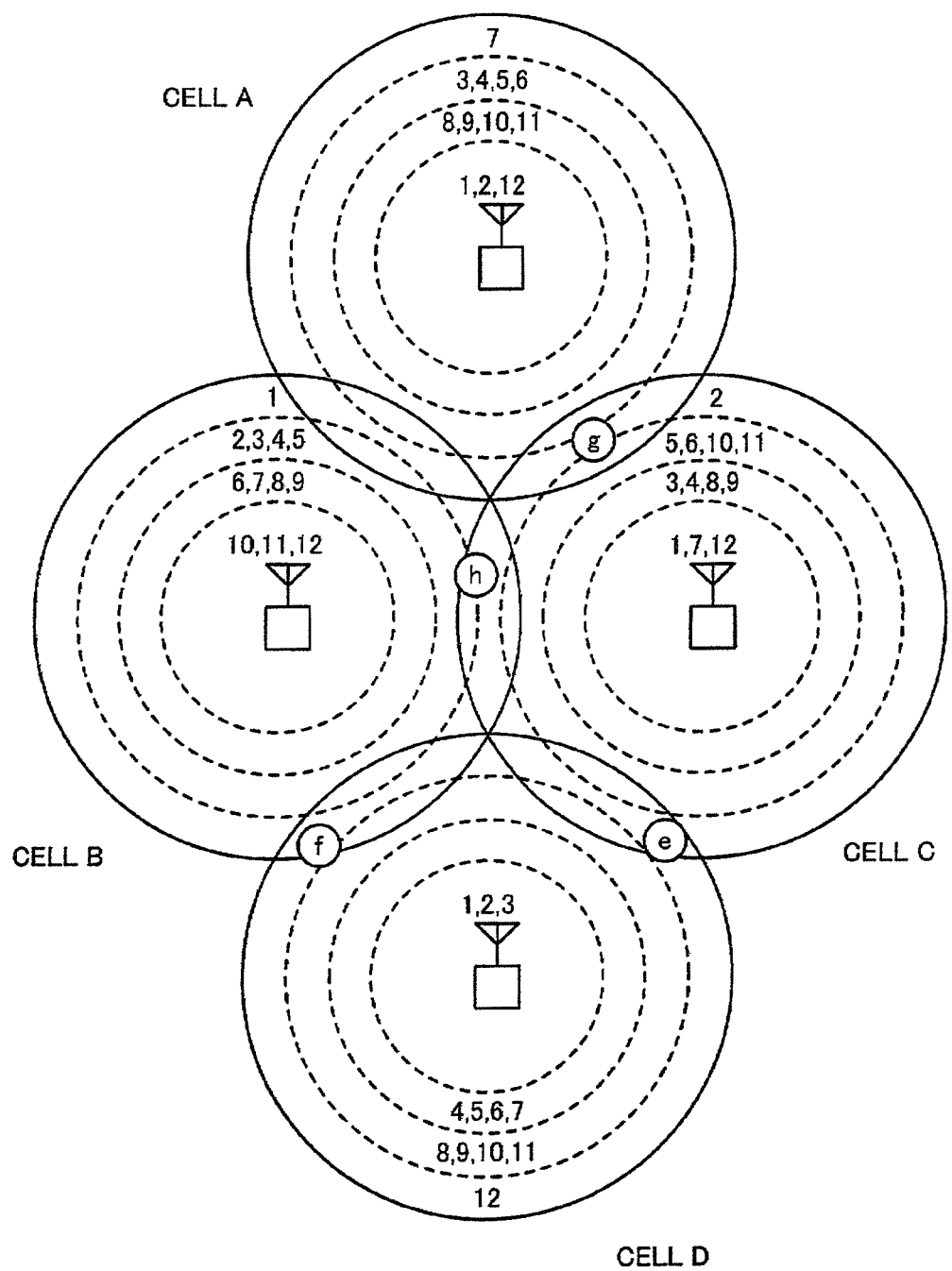
FIG. 39 is a diagram showing the relationship between the cell boundary and the transmission power group.

In this state, when a terminal e in the cell C moves near to the boundary with the cell D, interference from the cell D is detected naturally. This state is shown in FIG. 38: In this case, by performing the process in accordance with the above-described procedure, the allocation of the sub-channels in the cell C is changed. At this time, when a terminal is arranged between the cell A and the cell B, the influence from the adjacent cells is detected and arrangement of sub-channels is carried out in the cell such that there is no interference among all of the cells. Since the sub-channel that affects the adjacent cells is avoided with priority, allocation is carried out as long as possible. An example of the final allocation is shown in FIG. 39.

Third Embodiment

In the above explanation, an embodiment in which the maximum value of the number of adjacent cells is determined in advance is explained. By changing part of the procedure, described above, it is made possible to deal with a case where the maximum number of adjacent cells changes dynamically. If the maximum number of adjacent cells is determined in advance, the number of sub-channels allocated to a group that performs transmission with transmission power that reaches the cell edge is limited. In the above-described example, since the six cells neighbor each another, only one sub-channel can be allocated to this group. Due to this, in the case where terminals have gathered together near the cell edge, a problem arises in that the usage efficiency of the sub-channels in the cell decreases.

For this problem, it is made possible to improve the efficiency by allocating more sub-channels to a group with transmission power that can reach the cell edge in the case where the number of adjacent cells is smaller or in the case of isolated cell. A third embodiment is explained below.

In the third embodiment, a means for checking the number of current adjacent cells is added to the base station in addition to the case of the above-described second embodiment. The means for checking the number of adjacent cells may use any method. For example, such a method suggests itself, in which a high-gain antenna is added in addition to the antenna the gain of which has adapted to the cell radius normally used by the Up-link, and thereby the Up-link communication of a terminal situated beyond the cell radius is received, and the number of adjacent cells is checked by checking which base station ID is used.

Figure 26:
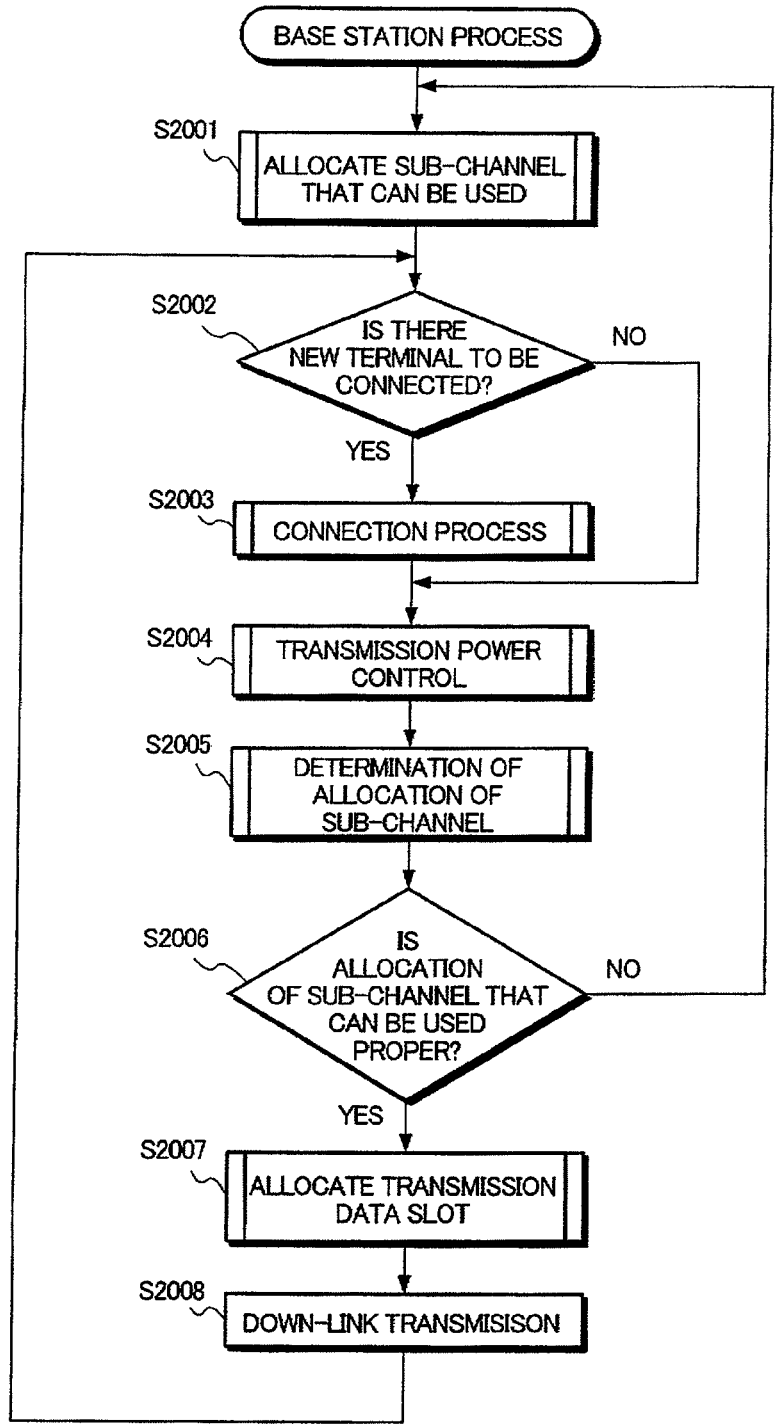
FIG. 26 is a flow chart showing the outline of the operation procedure of a base station apparatus.
Figure 40:
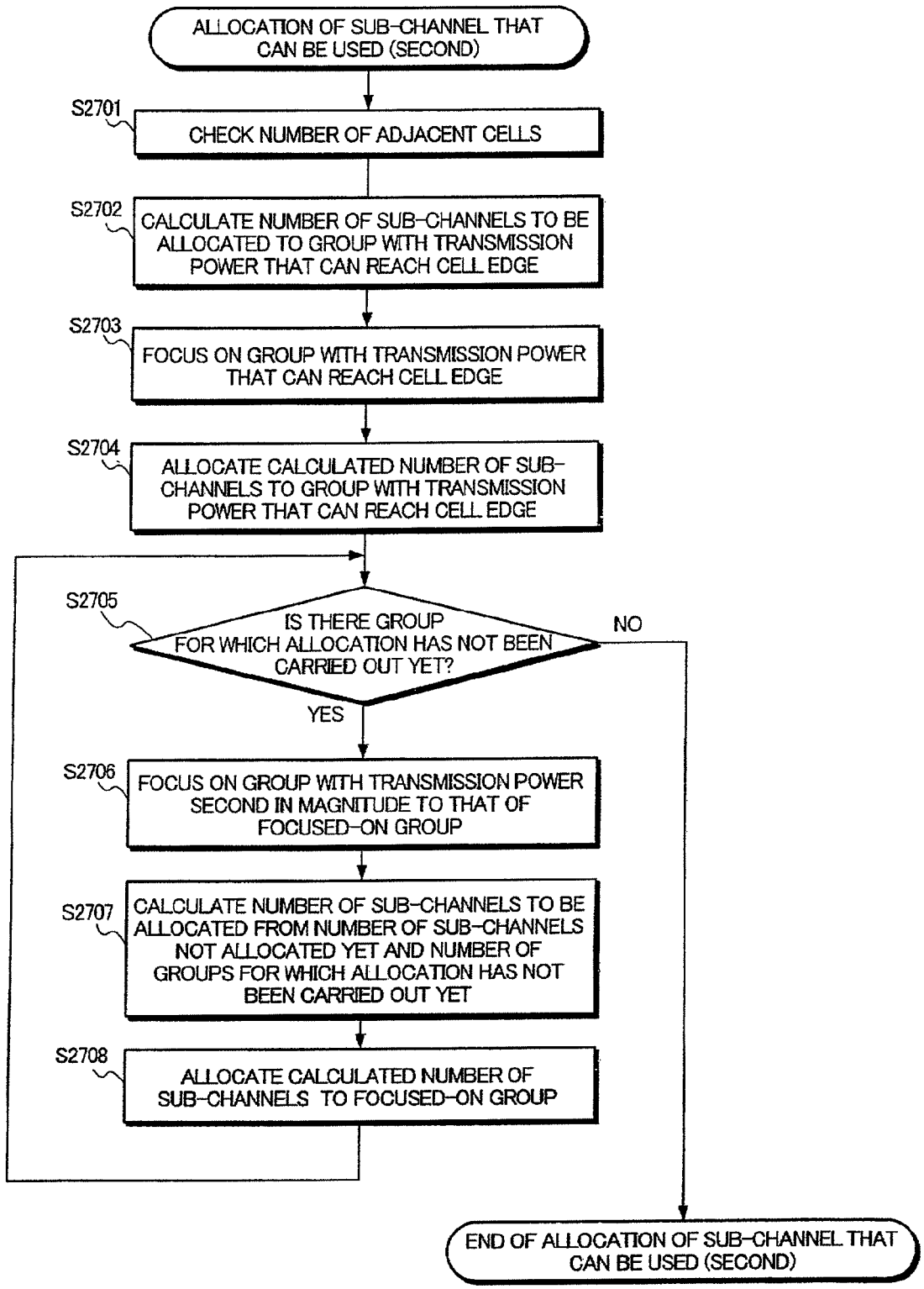
FIG. 40 is a flow chart showing the operation of the allocation of sub-channel that can be used.

By the way, the operation of the terminal may be quite the same as that in the second embodiment described above. The operation of the base station is also the same basically. However, part of the contents of the step of the allocation of sub-carrier that can be used (FIG. 26, S2001) is changed. In the above-described second embodiment, the number of sub-channels allocated in step S2001 for the allocation of sub-channel that can be used is set fixedly to one, four, four, and three in the descending order of transmission power. This step is changed as follows. A flow chart is shown in FIG. 40.

In the first step S2701, the number of adjacent cells is checked. In the next step S2702, the number of sub-channels allocated to a group with transmission power that reaches the cell edge is calculated. This number is assumed to be (total number of sub-channels/(number of current adjacent cells+1)) (decimal fraction is rounded down). In the next step S2703, a group with transmission power that reaches the cell edge is focused on. In the next step S2704, a sub-channel is allocated to the focused-on group with transmission power that reaches the cell edge. At this time, the most recent minimum SINR for each sub-channel collected by the base station is checked and allocation is carried out in the descending order of the minimum SINR. In the next step S2705, whether or not there is a transmission power group to which a sub-channel has not been allocated yet is determined and when there is any unallocated group, the procedure proceeds to step S2706 and when there is no unallocated group, the step of the allocation of sub-channel that can be used is terminated. In step S2706, a group with transmission power second in magnitude to that of the transmission power group currently focused on is focused on. In the next step S2707, the number of sub-channels allocated to the focused-on group is calculated.

Here, it is assumed that when the number of groups to which a sub-channel is not allocated is one, that is, when the unallocated group is only the group currently focused on, the number shall be the total number of remaining sub-channels, and when the number of groups to which a sub-channel has not been allocated yet is more than one, the number shall be ((number of unallocated sub-channels)/(number of groups to which the number of sub-channels is not allocated) (decimal fraction is rounded up). In the next step S2708, the number of sub-channels calculated in step S2707 is allocated to the focused-on group. After that, the procedure returns to step S2705, in which evaluation of the remaining groups is continued.

By dynamically changing the number of sub-channels to be allocated depending on the number of adjacent cells in this manner, it is possible to avoid a situation in which the number of sub-channels to be allocated to a specific group becomes less than required.

Fourth Embodiment

In the above-mentioned embodiment, it is premised that there is always interference from the adjacent cell. However, it is possible to increase the number of sub-channels with transmission power that reaches the adjacent cells by evaluating only the sub-channels actually affected by the adjacent cells. An embodiment in this case is shown below.

Figure 41:
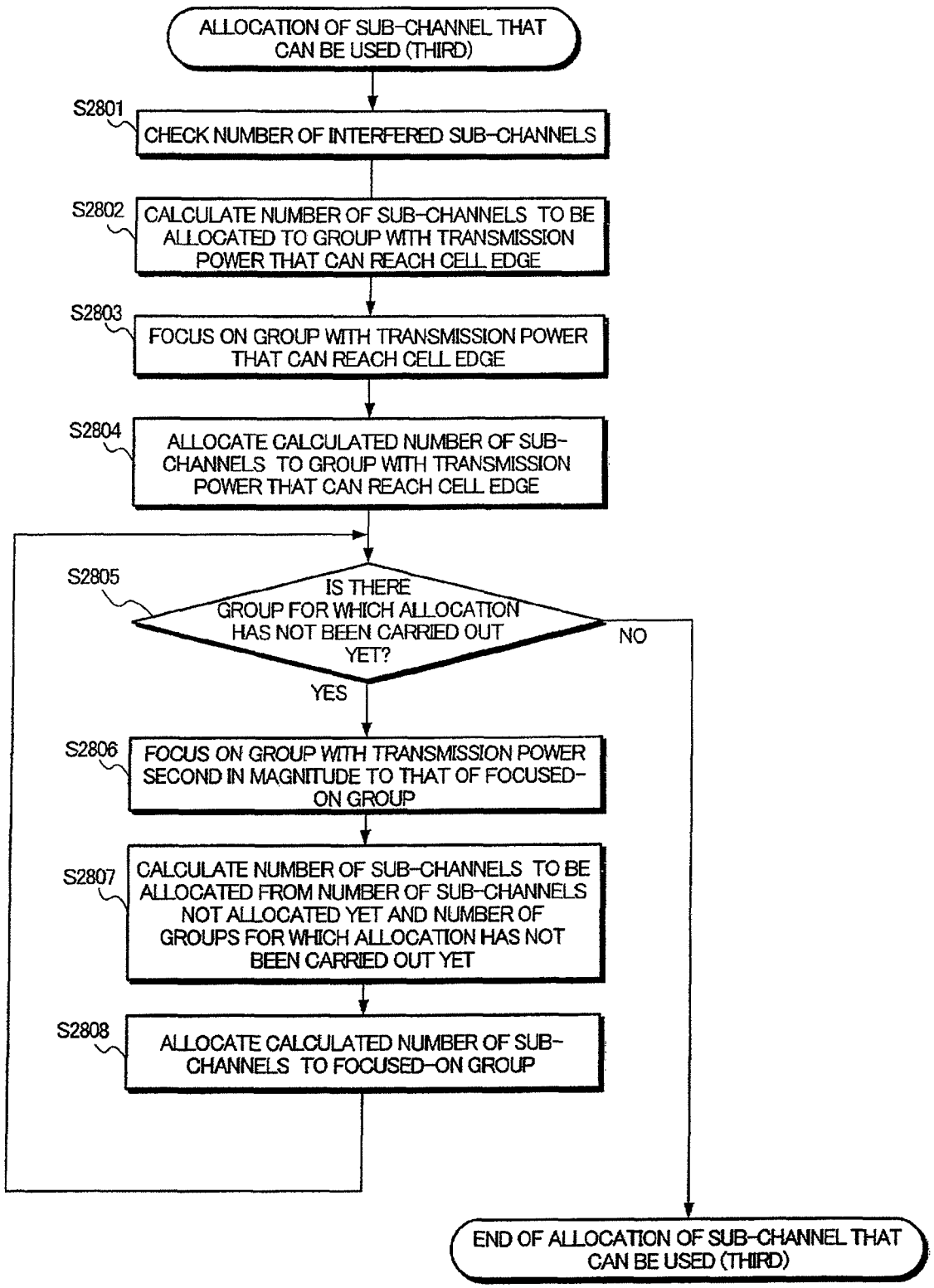
FIG. 41 is a flow chart showing the operation of the allocation of sub-channel that can be used.
Figure 42:
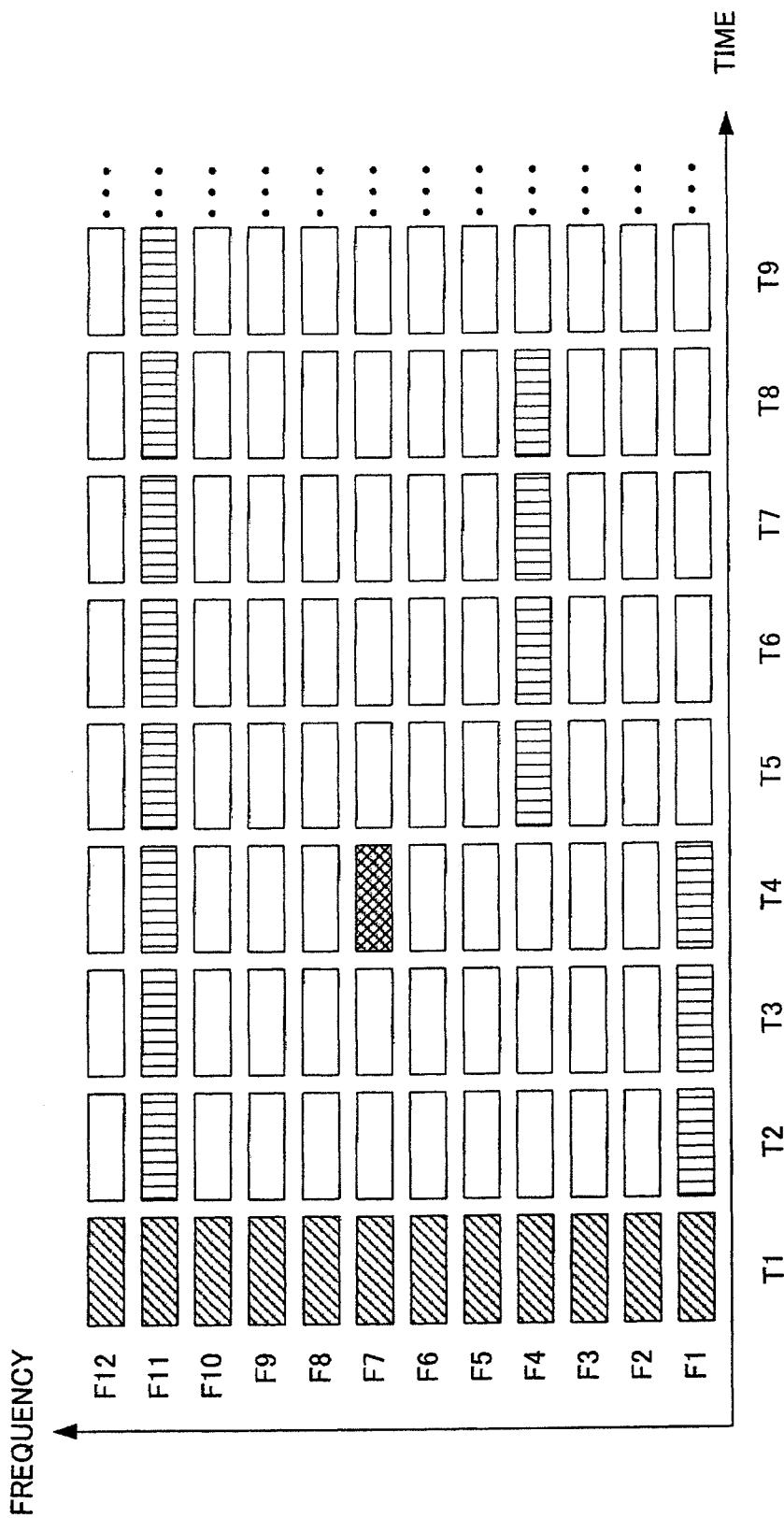
FIG. 42 is a diagram showing a configuration example of a frame.
Figure 43:
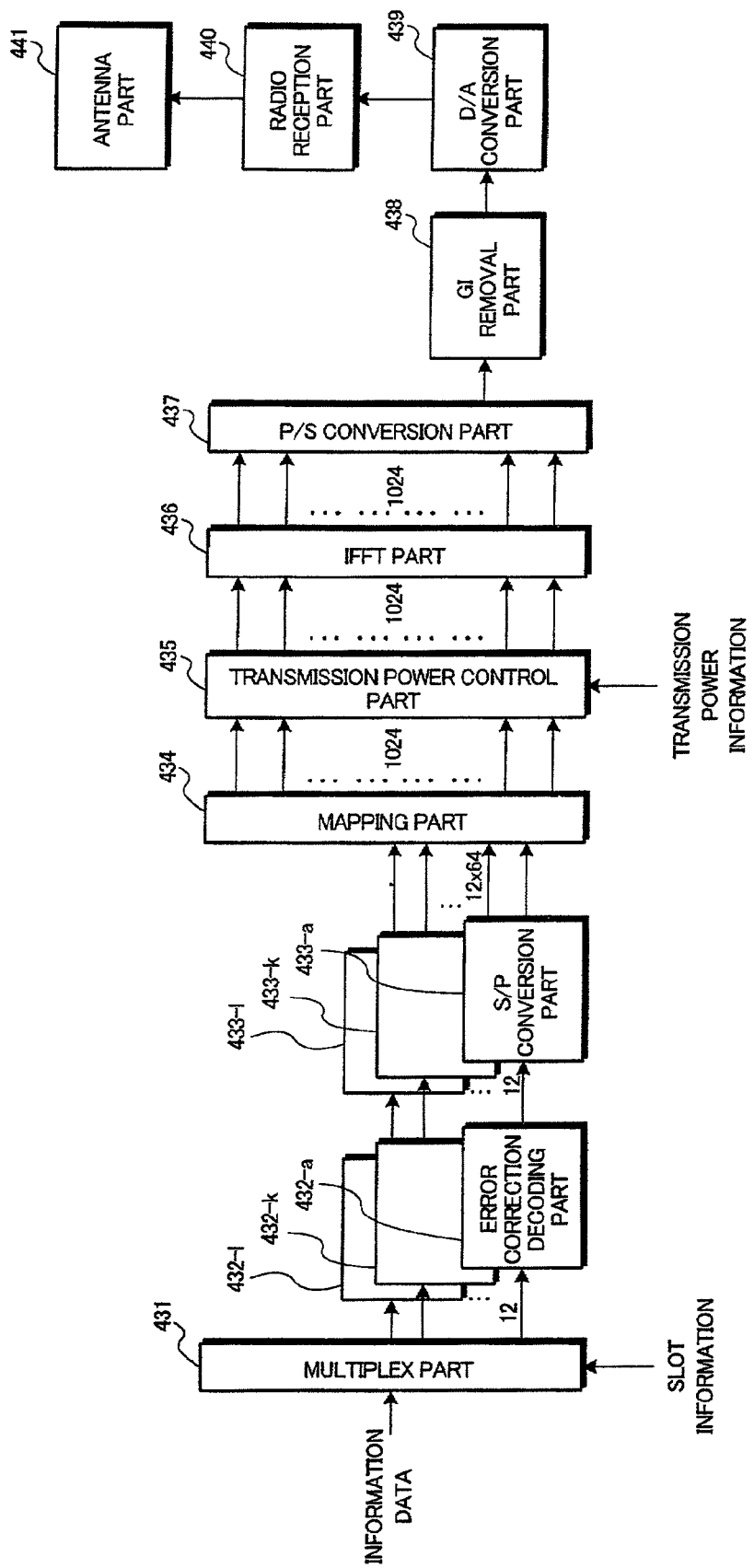
FIG. 43 is a diagram showing a general configuration of a base station apparatus.
Figure 44:
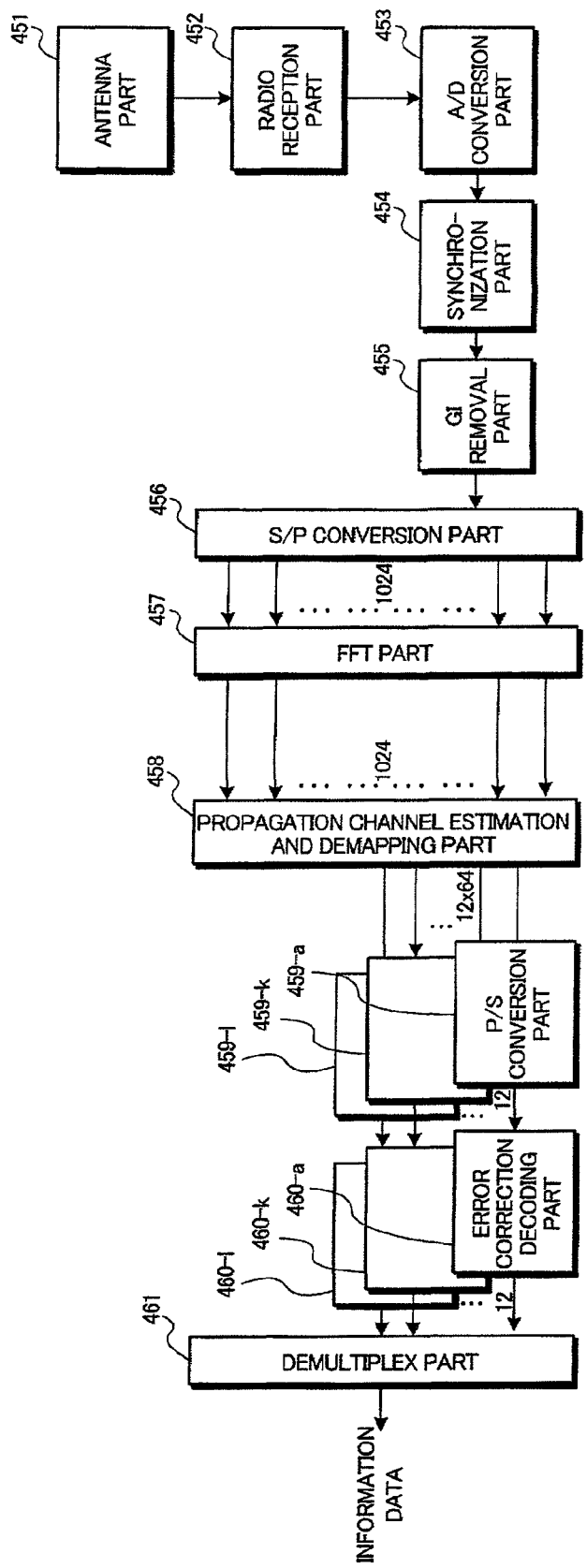
FIG. 44 is a diagram showing a general configuration of a mobile station apparatus.
Figure 45:
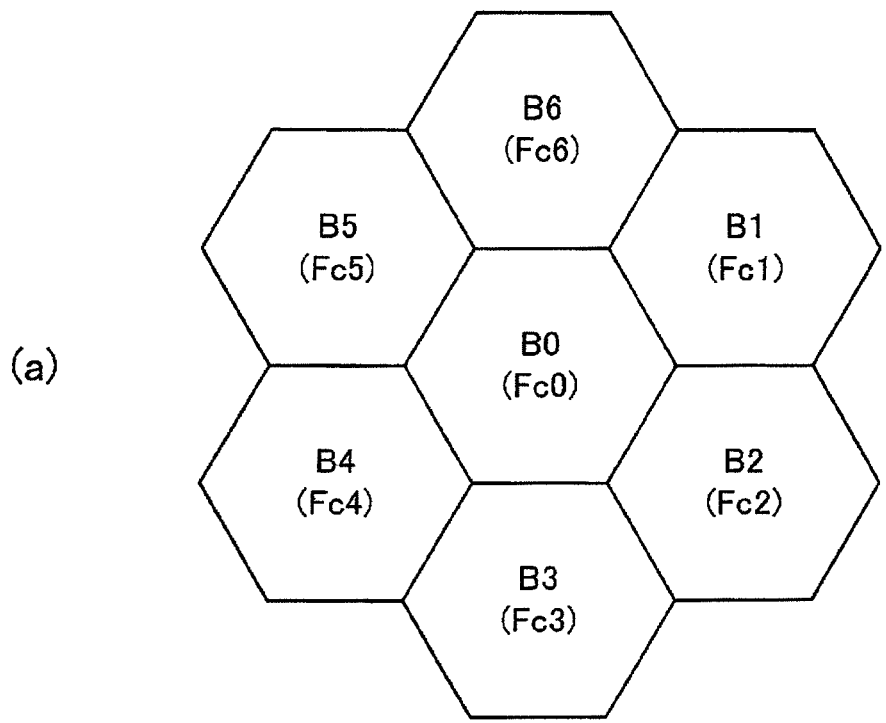
FIG. 45(a) is a diagram showing an example of a cell arrangement and FIG. 45(b) is a diagram showing an example of a cell arrangement.
Figure 45:
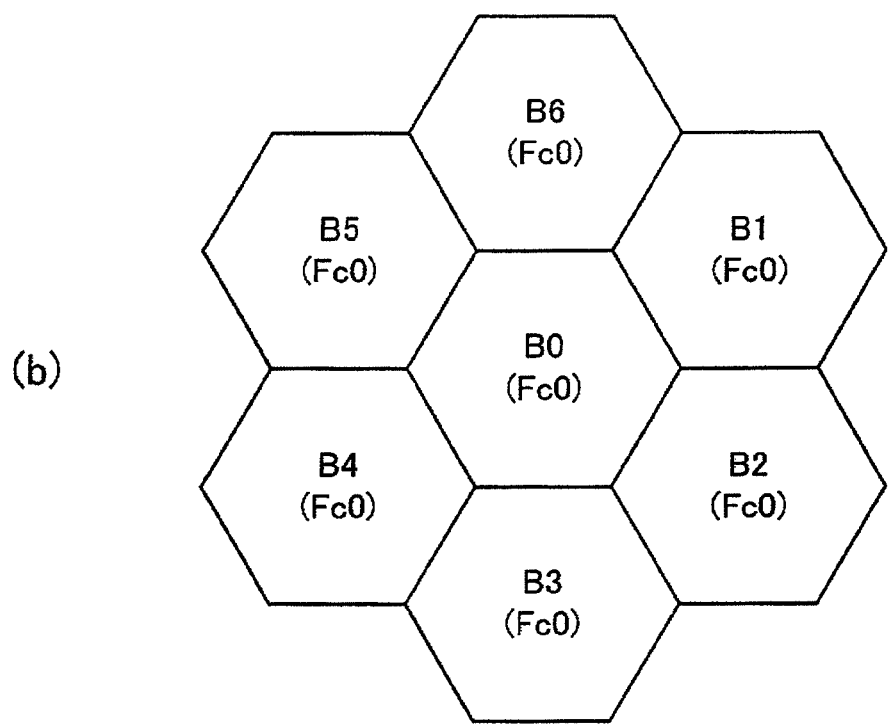
Figure 46:
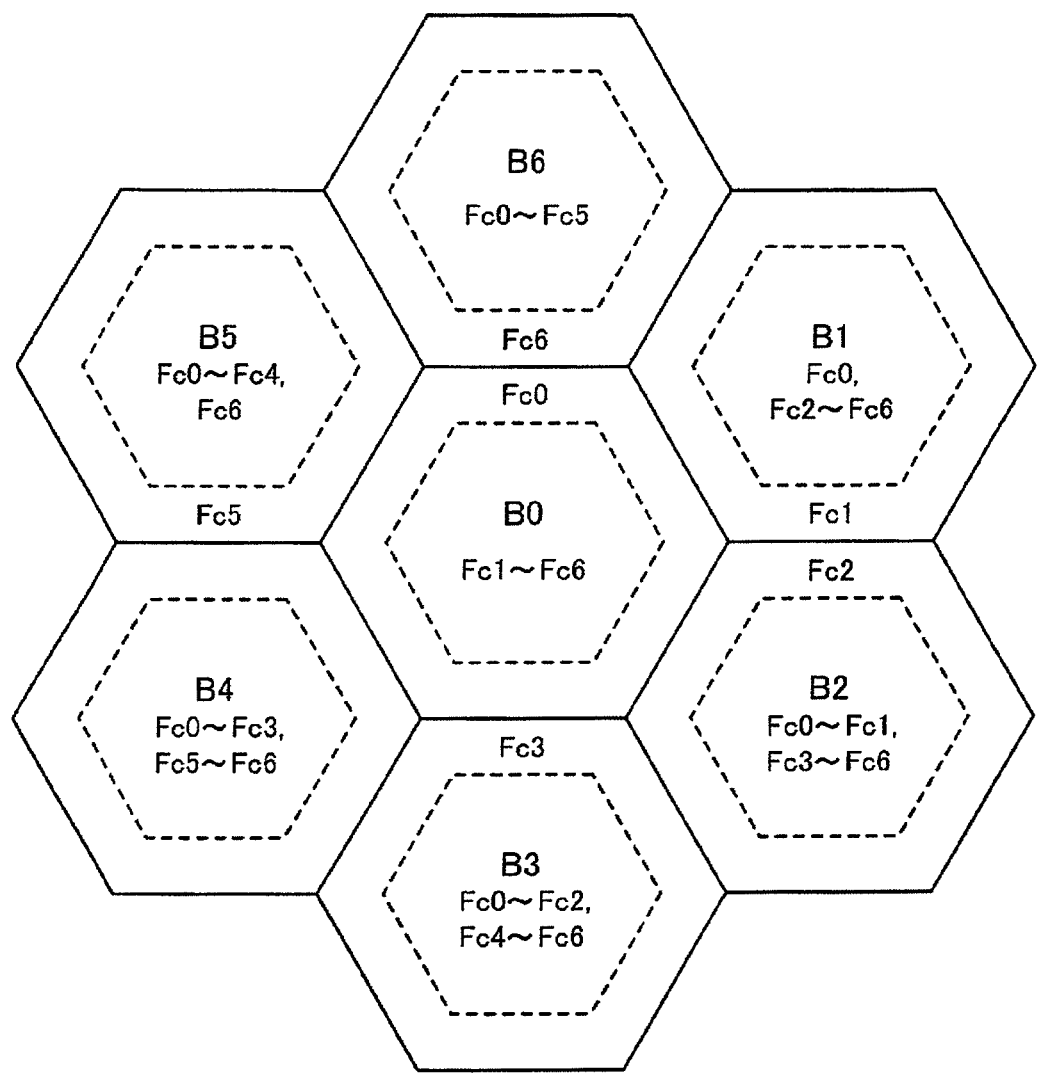
FIG. 46 is a diagram showing an example of a cell arrangement.
Figure 47:
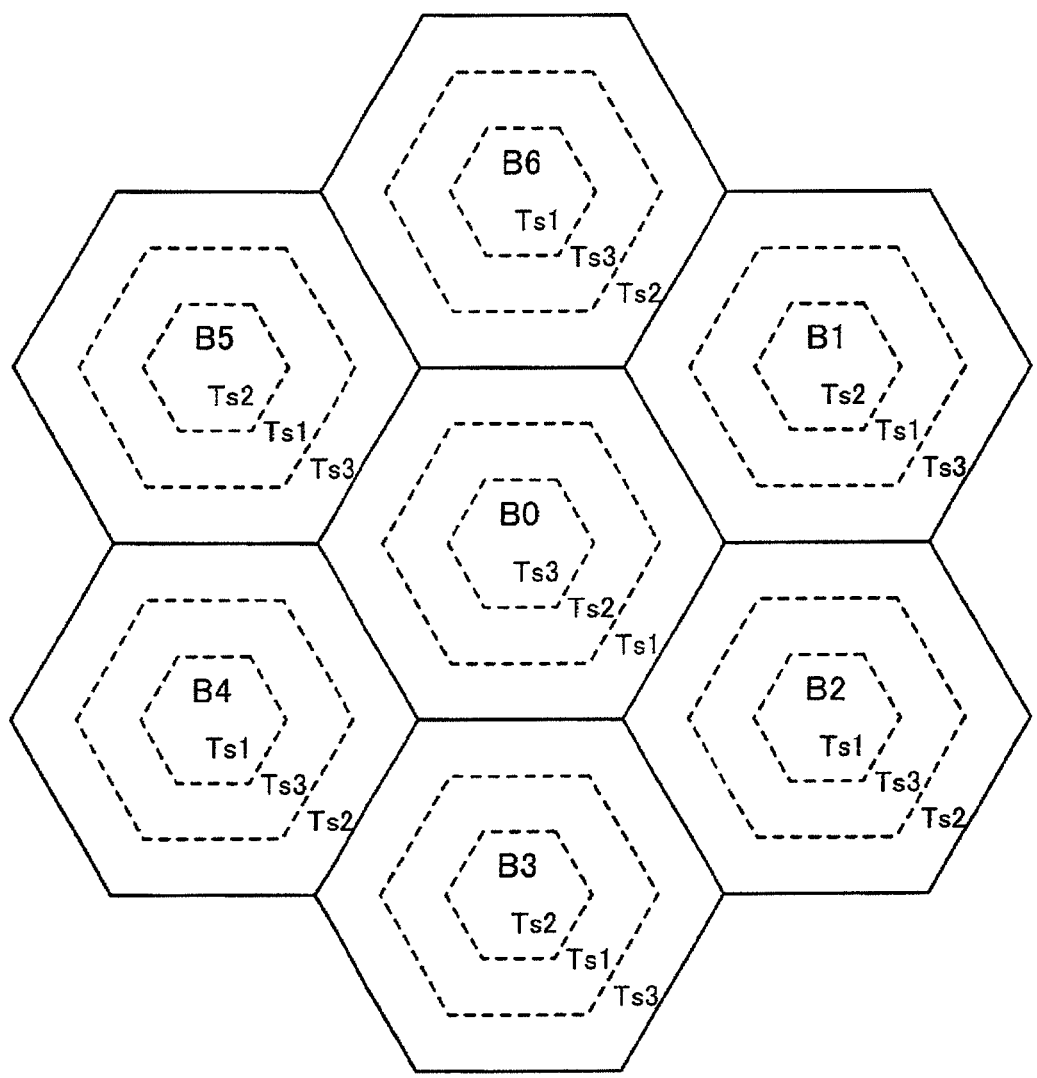
FIG. 47 is a diagram showing an example of a cell arrangement.

In a fourth embodiment, the operation of the terminal may also be quite the same as that in the above-described second embodiment. The operation of the base station is also the same basically. However, part of the contents of the step of the allocation of sub-channel that can be used (FIG. 26, S2001) is changed as in the third embodiment described immediately above. A flow chart is shown in FIG. 41.

In the first step S2801, the number of interfered sub-channels is checked. A means for checking the number of interfered sub-channels is not specified in particular. For example, a method suggests itself, in which the SINR of each sub-channel obtained from all of the terminals is checked and a sub-channel in which the SINR is below a predetermined value at any one of terminals is handled as an interfered sub-channel. In the next step S2802, the number of sub-channels to be allocated to a group with transmission power that reaches the cell edge is calculated. It is assumed that this number is (total number of sub-channels that can be used−currently interfered sub-channels), however, when this number exceeds half the total number of sub-channels that can be used (here, half is used, however, not limited to half), this number is half the total number of sub-channels that can be used. This is in order to cope with a case where the number of interfered sub-channels is calculated as a number less than the correct number and to leave the margin to allocate a sub-channel to a group that does not affect the adjacent cells in the cell of its own. In the next step S2803, a group with transmission power that reaches the cell edge is focused on. In the next step S2804, a sub-channel is allocated to the focused-on group with transmission power that reaches the cell edge.

At this time, the most recent minimum SINR for each sub-channel collected by the base station is checked and allocation is carried out in the descending order of the minimum SINR. In the next step S2805, whether or not there is a transmission power group to which a sub-channel has not been allocated yet is determined and when there is an unallocated group, the procedure proceeds to S2806 and when there is no unallocated group, the step of the allocation of sub-channel that can be used is terminated. In step S2806, a group with transmission power second in magnitude to that of the transmission power currently focused on is focused on. In the next S2807 step, the number of sub-channels to be allocated to the focused-on group is calculated. Here, it is assumed that when the number of groups to which a sub-channel is not allocated is one, that is, when the unallocated group is only the group currently focused on, the number is the total number of remaining sub-channels, and when the number of groups to which a sub-channel has not been allocated yet is more than one, the number is ((number of unallocated sub-channels)/(number of groups to which the number of sub-channels is not allocated)) (decimal fraction is rounded up). In the next step S2808, the number of sub-channels calculated in step S2807 is allocated to the focused-on group. After that, the procedure returns to step S2805, in which evaluation of the remaining groups is continued.

By thus controlling and by increasing or decreasing the number of sub-channels to be allocated to the group with transmission power that reaches the adjacent cells depending on the magnitude of the interference from the adjacent cells, it is made possible to allocate more sub-channels to the group with transmission power that reaches the adjacent cells. In this case, even when many sub-channels are allocated to the group with transmission power that reaches the adjacent cells, if the amount of communication of this group is small, it is also possible to allocate communication of a group with smaller transmission power, and therefore, communication is performed almost without a decrease in the efficiency in the cell.

In the above embodiments, control is performed in units of sub-channels, a collection of sub-carriers, however, control can be performed similarly in units of sub-carriers.

Fifth Embodiment

Next, a grouping method of terminals by a control station (base station) when the quality of targeted communication differs from group to group in a grouping method of terminals by the control station according to distances from the terminals and the control station etc. is explained. This corresponds to a system in which communication of high speed is performed with a terminal that is near the control station, that is, a terminal the reception SNR of which can be thought to be high, and on the other hand, communication of low speed is performed with a terminal that is at the cell edge, that is a terminal the reception SNR (or SINR) of which can be thought to be low.

When an adaptive modulation is used in the above-mentioned system, there is a problem in that the communication speed of a terminal having a subtle value with respect to the reference of grouping is not constant or the communication speed needs to be changed frequently.

Figure 48:
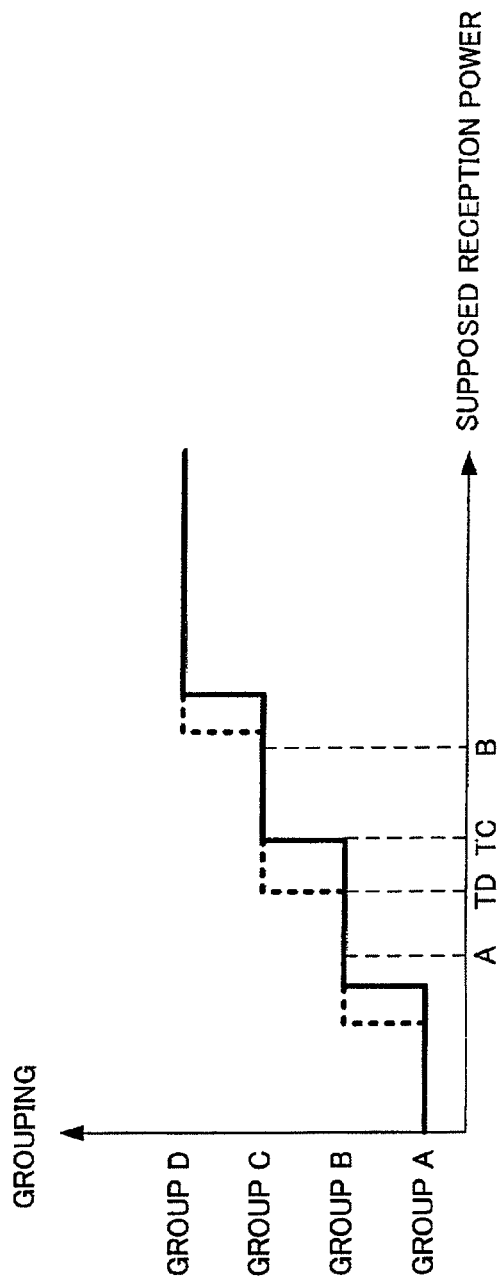
FIG. 48 is a diagram showing how to give hysteresis to grouping.

In a fifth embodiment, therefore, a method for giving the nature of hysteresis to grouping is explained. Using FIG. 48, the grouping method is explained by an example. The horizontal axis in FIG. 48 represents the transmission power level supposed to be required by the respective terminals for reception (referred to a supposed reception power) and the vertical axis represents the destination of grouping according to the individual supposed reception power. In the fifth embodiment, it follows that all of the terminals are grouped into four groups. The solid line in FIG. 48 indicates the reference value of grouping in the case of movement in the increasing direction of the supposed reception power (in the rightward direction in the graph) and the dotted line indicates the reference value of grouping in the case of movement in the decreasing direction thereof (in the leftward direction in the graph).

Here, for example, when the supposed reception power of a terminal changes A to B, it follows that the terminal moves from group B to group C when the supposed reception power is TC and when the supposed reception power of a terminal from B to A, it follows that the terminal moves from group C to group B moves when the supposed reception power is TD. By performing such control, it is possible to solve a problem in that the communication speed is not constant and a problem in that the communication speed needs to be changed frequently.

In addition, there may be a case where regrouping of connected terminals is performed when a call is made to a new terminal etc. At this time, by performing grouping of terminals having supposed reception power in the hysteresis loop (In FIG. 48, for example, where the supposed reception power is between TD and TC) last, it is made possible to perform efficient regrouping even in the case of crowded terminals. When there arises a need of regrouping, the base station groups terminals in accordance with the dotted line in FIG. 48. Following the dotted line results in grouping that attains a transmission rate as high as possible. If there remains unevenness in grouping after it is performed in accordance with the dotted line, it is made possible to reduce the unevenness by exchanging the terminals having the supposed reception power on the dotted line. This utilizes the fact that communication is possible even when the terminals in the hysteresis loop belong to whichever group. By the way, after once grouped, movement is made between groups as shown at the beginning of the fifth embodiment.

As described above, according to the fifth embodiment, it is also made possible to efficiently perform regrouping by setting the hysteresis loop.

Sixth Embodiment

The grouping in the first to fifth embodiments premise that the transmission power of the base station is controlled so that the reception power is approximately constant irrespective of the distance from the base station to the terminal.

However, when the transmission power control of the base station as described above is performed, it follows that the largest transmission power is allocated to the terminal near the cell boundary. If it is assumed that the terminals are distributed uniformly in the cell, the ratio of the terminals near the cell boundary is large and therefore large transmission power is allocated to many terminals and the interference power affecting the adjacent cells increases as a result.

In the present embodiment, it is not required necessarily for the reception power at the terminal to be constant. In a sixth embodiment, a case is shown, where a plurality of values are used as reception power at a terminal at the time of grouping according to the propagation loss.

Figure 50:
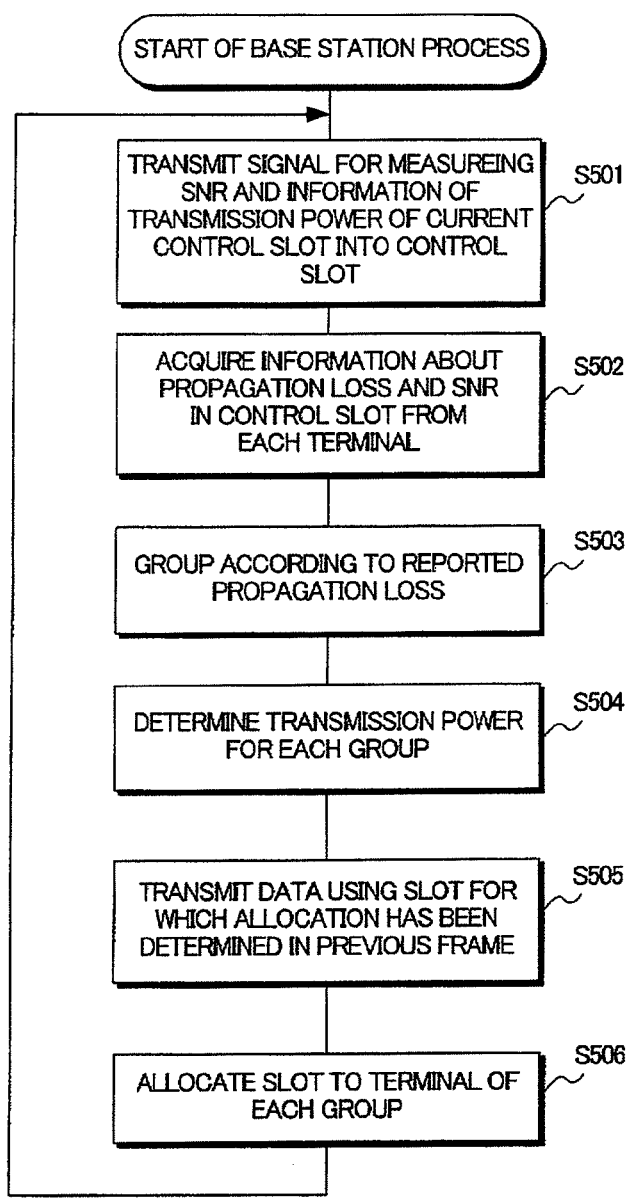
FIG. 50 is a flow chart showing the operation of a base station.
Figure 51:
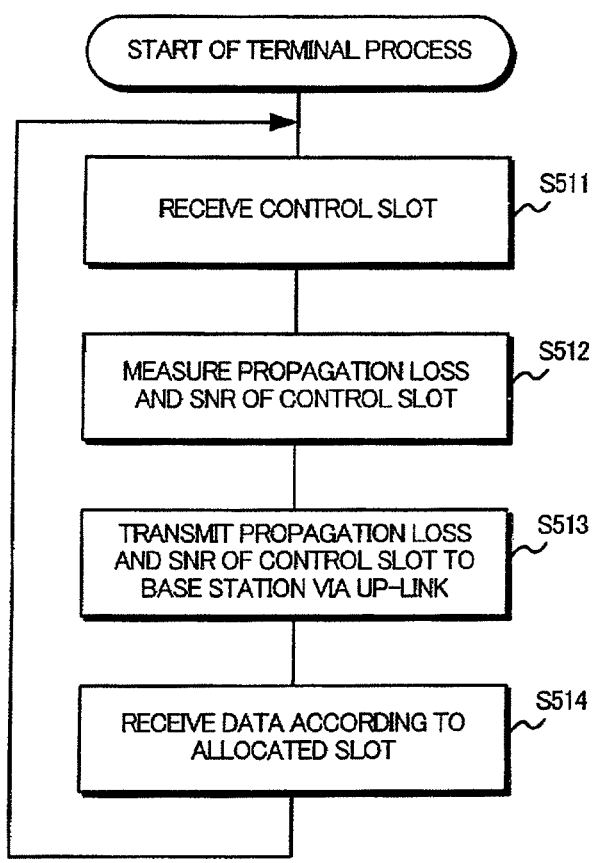
FIG. 51 is a flow chart showing the operation of a terminal.

FIG. 49 shows an example of the grouping condition. In this example, the whole is divided into five groups using the propagation loss including the influence of the variation in the propagation channel, such as fading, and three kinds of reception target SNR are set for the respective groups. A control flow of a base station is shown in FIG. 50 and a control flow of a terminal is shown in FIG. 51 when grouping is performed in the above-described manner.

First, the control flow of a base station is explained in detail. By the way, the same frame format is used as that in FIG. 21.

First, in step S501, a signal for measuring SNR and information of transmission power of the current control slot are transmitted using the control slot. Any signal for measuring SNR may be used. For example, a known signal may be used, in which part of the OFDM sub-carrier is null carrier. In this case, it is possible to find the SNR by comparing the strength of the transmitted carrier and the null carrier on the reception side. Next, in step S502, the propagation loss and information of SNR of the control signal are acquired from each terminal via the Up-link. Next, in step S503, the respective terminals are grouped according to the propagation loss notified from each terminal. At this time, it is assumed that the grouping in FIG. 49 is obeyed.

Next, in step S504, transmission power to be allocated to each of the grouped terminals is determined. It is assumed that the transmission power is a value determined in advance based on the worst SNR in its group. After that, in step S505, Down-link data is transmitted to each terminal using the slot for which allocation has been determined in the previous frame. After that, in step S506, the allocation of the slot to be used in the next frame is determined as well as that of the transmission power found in step S504 and the setting is so made that the contents are transmitted using the next control slot. When the adaptive modulation is performed, it is possible to set a modulation parameter by referring to the SNR information obtained from the terminal when the allocation is determined.

After that, the flow returns to step S501, where the above procedure from the transmission of the control slot is repeated.

Next, the control flow of a terminal is explained in detail. First, in step S511, the control slot transmitted from the base station is received. Next, in step S512, the propagation loss from the base station to the terminal and the SNR of the received control slot are measured. Any method for finding the propagation loss and SNR may be used. For example, it is possible to use a value as the propagation loss, which is the transmission power of the control slot at the base station included in the control slot minus RSSI. To be precise, this value is not the propagation loss, however, since the relative value between terminals can be known if the same measurement is performed at all of the terminals, it is possible to use this value as the propagation loss. In addition, it is possible to measure the SNR by transmitting a known signal in which part of sub-carrier is null carrier to the base station and by finding the transmission power ratio between a certain carrier and the null carrier of the signal.

Next, the information of the propagation loss and SNR measured in step S513 is transmitted to the base station via the Up-link. After that, in step S514, the data is received based on the allocated information included in the control slot. After that, the flow returns to step S511 and the procedure from the reception of the control slot is repeated.

Due to the above operation of the base station and the terminal, the allocation of slot in accordance with the parameters determined as shown in FIG. 49 and the transmission power control are performed. By the way, the allocation of slot may be carried out in the direction of time channel or in the direction of frequency channel and it is possible to carry out by combining each of the above-mentioned embodiments.

Seventh Embodiment

In the first to sixth embodiments, a configuration based on the OFDM is employed. However, the present invention can be applied to other than the OFDM. For example, in the case of SS (Spread Spectrum), it is not possible to perform group control by the frequency channel, however, group control can be performed by the time channel and it is made possible to perform the present invention.

INDUSTRIAL APPLICABILITY

Explanations of Letters or Numerals

100 antenna part
101 radio reception part
102 A/D conversion part
103 synchronization part
104 guard interval removal part
105 S/P conversion part
106 FFT part
107 propagation channel estimation and demapping part
108-*a* to 108-*l* P/S conversion part
109-*a* to 109-*l* error correction decoding part
110 demultiplex part
111 A/D conversion part
112 RSS measurement part
113 interference power measurement part
114 control part
115 Up-link transmission part
120 scheduling part
121 multiplex part
122-*a* to 122-*l* error correction encoding part
123-*a* to 123-*l* S/P conversion part
124 mapping part
125 transmission power control part
126 IFFT part
127 P/S conversion part
128 guard interval insertion part
129 D/A conversion part
130 radio transmission part
131 antenna part
181 antenna part
182 radio reception part
183 A/D conversion part
184 synchronization part
185 guard interval removal part
186 S/P conversion part
187 FFT part
188 propagation channel estimation and demapping part
189-*a* to 189-*l* P/S conversion part
190-*a* to 190-*l* error correction decoding part
191 demultiplex part
192 SINR measurement part
193 RSS measurement part
194 control part
195 Up-link transmission part
260 scheduling part
261 multiplex part
262-*a* to 262-*l* error correction encoding part
263-*a* to 263-*l* S/P conversion part
264 mapping part
265 transmission power control part
267 IFFT part
267 P/S conversion part
268 guard interval insertion part
269 D/A conversion part
270 radio transmission part
271 antenna part
272 Up-link reception part

The invention claimed is:

1. A mobile station apparatus used in a wireless communication system, said mobile station apparatus comprising:
a communication unit which communicates with a base station apparatus utilizing communication resources configured by arranging a plurality of first regions defined by frequency and times axes;
an processing unit which, in response to communicating with the base station apparatus, generates a indicator corresponding to at least one second region which is configured by arranging the first regions according to a predetermined rule,
wherein the indicator is information which is concerned with at least a level of transmission power to be used in the second region by a base station other than the base station.

2. The mobile station apparatus according to claim 1, wherein
the each second region is configured by arranging the first regions in the frequency direction.

3. The mobile station apparatus according to claim 1, wherein the each second region is configured by arranging the first regions in the time direction.

4. The mobile station apparatus according to claim 2, wherein the each second region is configured by arranging the first regions in the time direction.

5. The mobile station apparatus according to claim 1, wherein the transmission of the indicator to the base station from the mobile station is carried out prior to performing scheduling one or more of the first regions to be used in the communication from the communication resources at the base station.

6. The mobile station apparatus according to claim 2, wherein the transmission of the indicator to the base station from the mobile station is carried out prior to performing scheduling one or more of the first regions to be used in the communication from the communication resources at the base station.

7. A base station apparatus used in a wireless communication system, said base station apparatus comprising:
a communication unit which communicates with a mobile station apparatus utilizing communication resources configured by arranging a plurality of first regions defined by frequency and times axes;
an processing unit which, in response to communicating with the mobile station apparatus, generates a indicator corresponding to at least one second region which is configured by arranging the first regions according to a predetermined rule,
wherein
the indicator is information which is concerned with at least a level of transmission power to be used in the second region by a base station other than the base station.

8. The base station apparatus according to claim 7, wherein the each second region is configured by arranging the first regions in the frequency direction.

9. The base station apparatus according to claim 7, wherein the each second region is configured by arranging the first regions in the time direction.

10. The base station apparatus according to claim 8, wherein the each second region is configured by arranging the first regions in the time direction.

11. A processing method of a mobile station apparatus used in a wireless communication system, the processing method comprising:
communicating with a base station apparatus utilizing communication resources configured by arranging a plurality of first regions defined by frequency and times axes;
in response to communicating with the base station apparatus, generating a indicator corresponding to at least one second region which is configured by arranging the first regions according to a predetermined rule,
wherein
the indicator is information which is concerned with at least a level of transmission power to be used in the second region by a base station other than the base station.

12. The processing method according to claim 11, wherein the each second region is configured by arranging the first regions in the frequency direction.

13. The processing method according to claim 11, wherein the each second region is configured by arranging the first regions in the time direction.

14. The processing method according to claim 12, wherein the each second region is configured by arranging the first regions in the time direction.

15. A processing apparatus configured for being implemented in a terminal applicable to wireless communication system, wherein
the processing apparatus causes the terminal to execute the processing method according to claim 13.

16. A processing apparatus configured for being implemented in a terminal applicable to wireless communication system, wherein
the processing apparatus causes the terminal to execute the processing method according to claim 14.

17. A processing method of a base station apparatus used in a wireless communication system, the processing method comprising:
communicating with a mobile station apparatus utilizing communication resources configured by arranging a plurality of first regions defined by frequency and times axes;
in response to communicating with the mobile station apparatus, generating a indicator corresponding to at least one second region which is configured by arranging the first regions according to a predetermined rule,
wherein
the indicator is information which is concerned with at least a level of transmission power to be used in the second region by a base station other than the base station.

18. The processing method according to claim 17, wherein the each second region is configured by arranging the first regions in the frequency direction.

19. The processing method according to claim 17, wherein the each second region is configured by arranging the first regions in the time direction.

20. The processing method according to claim 18, wherein the each second region is configured by arranging the first regions in the time direction.

* * * * *